United States Patent
Lin

(10) Patent No.: US 11,477,734 B2
(45) Date of Patent: Oct. 18, 2022

(54) METHOD AND APPARATUS FOR MONITORING POWER SAVING SIGNAL IN A WIRELESS COMMUNICATION SYSTEM

(71) Applicant: ASUSTek Computer Inc., Taipei (TW)

(72) Inventor: Ko-Chiang Lin, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/919,957

(22) Filed: Jul. 2, 2020

(65) Prior Publication Data

US 2021/0007050 A1    Jan. 7, 2021

Related U.S. Application Data

(60) Provisional application No. 62/870,978, filed on Jul. 5, 2019.

(51) Int. Cl.
*H04W 52/02* (2009.01)
*H04W 76/28* (2018.01)
*H04W 72/04* (2009.01)

(52) U.S. Cl.
CPC ..... *H04W 52/0229* (2013.01); *H04W 72/042* (2013.01); *H04W 72/0446* (2013.01); *H04W 76/28* (2018.02)

(58) Field of Classification Search
CPC ......... H04W 52/0229; H04W 52/0206; H04W 52/0219; H04W 52/0235; H04W 72/0446; H04W 72/042
See application file for complete search history.

(56) References Cited

U.S. PATENT DOCUMENTS

| 10,743,208 B2 * | 8/2020 | Lim ..................... H04L 1/0026 |
| 2009/0239566 A1 * | 9/2009 | Pelletier ............ H04W 56/0075 455/517 |
| 2013/0016614 A1 * | 1/2013 | Suzuki ................. H04W 76/28 370/241 |
| 2014/0254452 A1 * | 9/2014 | Golitschek ........ H04W 52/0219 370/311 |

(Continued)

FOREIGN PATENT DOCUMENTS

| WO | 2018174635 A1 | 9/2018 |
| WO | 2020046733 A1 | 3/2020 |
| WO | 2020060890 A1 | 3/2020 |

OTHER PUBLICATIONS

Corresponding European Patent Application No. 20183591.5, Extended European Search Report dated Nov. 25, 2020.

(Continued)

*Primary Examiner* — Brenda H Pham
(74) *Attorney, Agent, or Firm* — Cooper Legal Group

(57) ABSTRACT

A method and apparatus are disclosed. In an example from the perspective of a User Equipment (UE), the UE receives an indication from a base station, wherein the indication is indicative of monitoring a power saving signal in one or more monitoring occasions and at least one monitoring occasion of the one or more monitoring occasions is associated with a Discontinuous Reception (DRX) ON duration and is within Active Time associated with the UE. The UE does not monitor and/or skips monitoring the power saving signal in the at least one monitoring occasion. The UE monitors Physical Downlink Control Channel (PDCCH) during the DRX ON duration.

23 Claims, 10 Drawing Sheets

(56) References Cited

U.S. PATENT DOCUMENTS

| | | | |
|---|---|---|---|
| 2016/0198408 A1* | 7/2016 | Jhang | H04W 76/28 370/311 |
| 2017/0019948 A1* | 1/2017 | Baghel | H04W 52/0203 |
| 2019/0297577 A1* | 9/2019 | Lin | H04W 52/0235 |
| 2020/0178172 A1* | 6/2020 | Thangarasa | H04W 52/02 |
| 2020/0351786 A1* | 11/2020 | Koskela | H04W 68/02 |
| 2021/0377864 A1* | 12/2021 | Li | H04W 52/0219 |

OTHER PUBLICATIONS

HiSilicon Huawei, "Design of Power Saving Signal", 3GPP TSG RAN WG1 Meeting #95, R1-1812232, Agenda Item 7.2.9.2.2, Document for Discussion and Decision, Nov. 12-16, 2018, Spokane, USA.

Catt, "PDCCH-Based PowerSaving Signal/Channel Design", 3GPP TSG RAN WG1 Meeting #97, R1-1906350, Agenda Item 7.2.9.1, Document for Discussion and Decision, May 13-17, 2019, Reno USA.

Ericsson, "Design of PDCCH-Based Power Saving Signal/Channel", 3GPP TSG-RAN WG1 Meeting #97, Tdoc R1-1907322, Agenda Item 7.2.9.1, Document for Discussion and Decision, May 13-17, 2019, Reno USA.

Technical Report, "Study on User Equipment (UE) Power Saving in NR", 3G99 TR 38.840, Technical Specification Group Radio Access Network, Release 16, v.16.0.0, Jun. 2019, pp. 1-74.

Apple Inc., "PDCCH Based Power Saving Channel Design for UE Power Saving", 3GPP TSG RAN WG1 #98, R1-1909457, Agenda Item 7.2.9.1, Document for Discussion, Decision, Aug. 26-30, 2019, Prague, Czech.

Samsung, "PDCCH-based Power Saving Signal/Channel", 3GPP TSG RAN WG1 #98bis, R1-1910497, Agenda Item 7.2.9.1, Document for Discussion and Decision, Oct. 14-18, 2019, Chongqing, China.

Corresponding Korean Patent Application No. 10-2020-0081614, Office Action dated Apr. 7, 2021. English Translation.

Catt, Summary of PDCCH-based Power Saving Signal/Channel, 3GPP TSG RAN WG1 #97, R1-1907809, Agenda Item 7.2.9.1, Document for Discussion, May 13-17, 2019, Reno, China.

Corresponding Japanese Patent Application No. 2020-115010, Office Action dated Aug. 10, 2021. English Translation.

* cited by examiner

US 11,477,734 B2

METHOD AND APPARATUS FOR MONITORING POWER SAVING SIGNAL IN A WIRELESS COMMUNICATION SYSTEM

CROSS-REFERENCE TO RELATED APPLICATIONS

The present application claims the benefit of U.S. Provisional Patent Application Ser. No. 62/870,978 filed on Jul. 5, 2019, the entire disclosure of which is incorporated herein in its entirety by reference.

FIELD

This disclosure generally relates to wireless communication networks, and more particularly, to a method and apparatus for monitoring a power saving signal in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

In accordance with the present disclosure, one or more devices and/or methods are provided. In an example from the perspective of a User Equipment (UE), the UE receives an indication from a base station, wherein the indication is indicative of monitoring a power saving signal in one or more monitoring occasions and at least one monitoring occasion of the one or more monitoring occasions is associated with a Discontinuous Reception (DRX) ON duration and is within Active Time associated with the UE. The UE does not monitor and/or skips monitoring the power saving signal in the at least one monitoring occasion. The UE monitors Physical Downlink Control Channel (PDCCH) during the DRX ON duration.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), $3^{rd}$ Generation Partnership Project (3GPP) LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio) wireless access for 5G, or some other modulation techniques.

In particular, the exemplary wireless communication systems devices described below may be designed to support one or more standards such as the standard offered by a consortium named "3rd Generation Partnership Project" referred to herein as 3GPP, including: R1-1803543, "draft CR to 38.211 capturing the Jan18 ad-hoc and RAN1 #92 meeting agreements", Ericsson; RP-190727, "New WID: UE Power Saving in NR", CATT, CAICT; R1 #96bis RAN1 Chairman's note; R1 #97 RAN1 Chairman's note; 3GPP TS 38.213 V15.6.0, "NR Physical layer procedures for control"; 3GPP TS 38.321 V15.6.0, "NR MAC protocol specification". The standards and documents listed above are hereby expressly incorporated by reference in their entirety.

Figure 1:
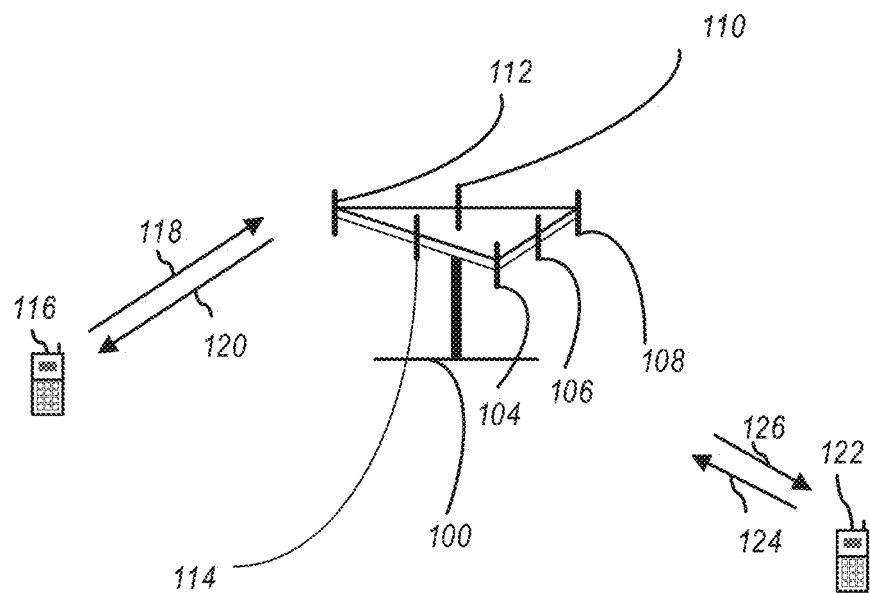
FIG. 1 shows a diagram of a wireless communication system according to one exemplary embodiment.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to its access terminals.

An access network (AN) may be a fixed station or base station used for communicating with the terminals and may also be referred to as an access point, a Node B, a base station, an enhanced base station, an eNodeB (eNB), a Next Generation NodeB (gNB), or some other terminology. An access terminal (AT) may also be called user equipment (UE), a wireless communication device, terminal, access terminal or some other terminology.

Figure 2:
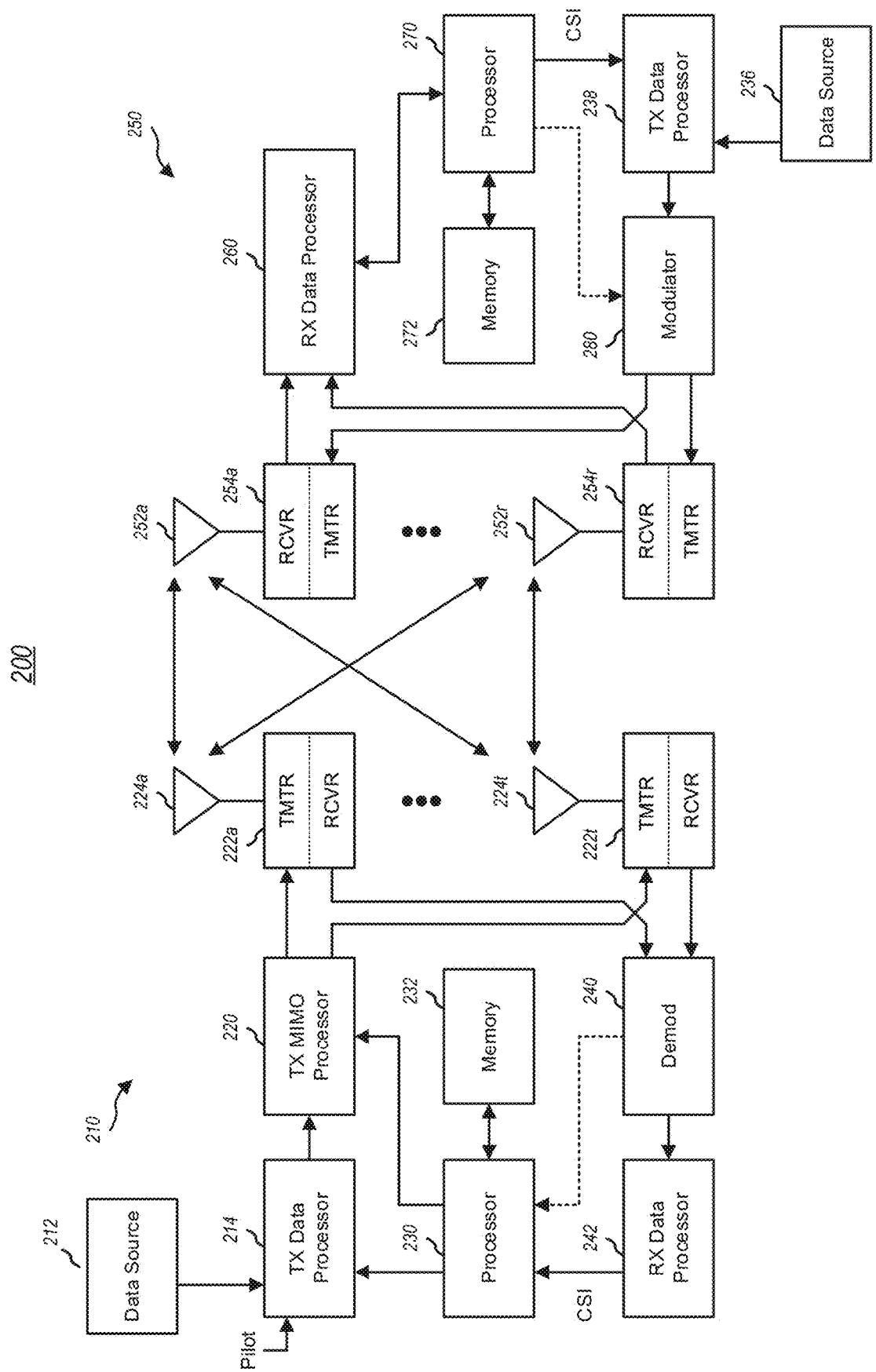
FIG. 2 is a block diagram of a transmitter system (also known as access network) and a receiver system (also known as user equipment or UE) according to one exemplary embodiment.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using orthogonal frequency-division multiplexing (OFDM) techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 receives and processes a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals are received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and/or further process the samples to provide a corresponding "received" symbol stream.

An RX data processor 260 then receives and/or processes the $N_R$ received symbol streams from $N_R$ receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 formulates a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 may then determine which pre-coding matrix to use for determining the beamforming weights and may then process the extracted message.

Figure 3:
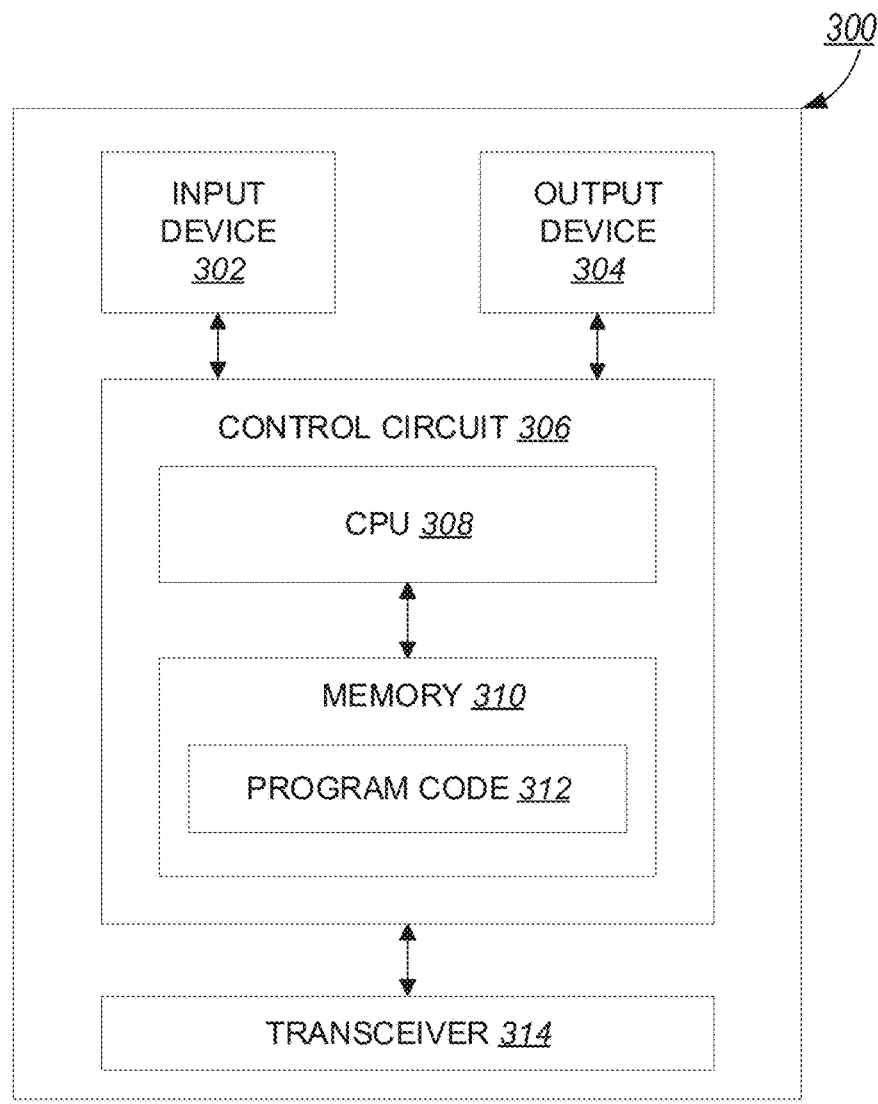
FIG. 3 is a functional block diagram of a communication system according to one exemplary embodiment.

FIG. 3 presents an alternative simplified functional block diagram of a communication device according to one embodiment of the disclosed subject matter. As shown in FIG. 3, the communication device 300 in a wireless communication system can be utilized for realizing the UEs (or ATs) 116 and 122 in FIG. 1 or the base station (or AN) 100 in FIG. 1, and the wireless communications system may be the LTE system or the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
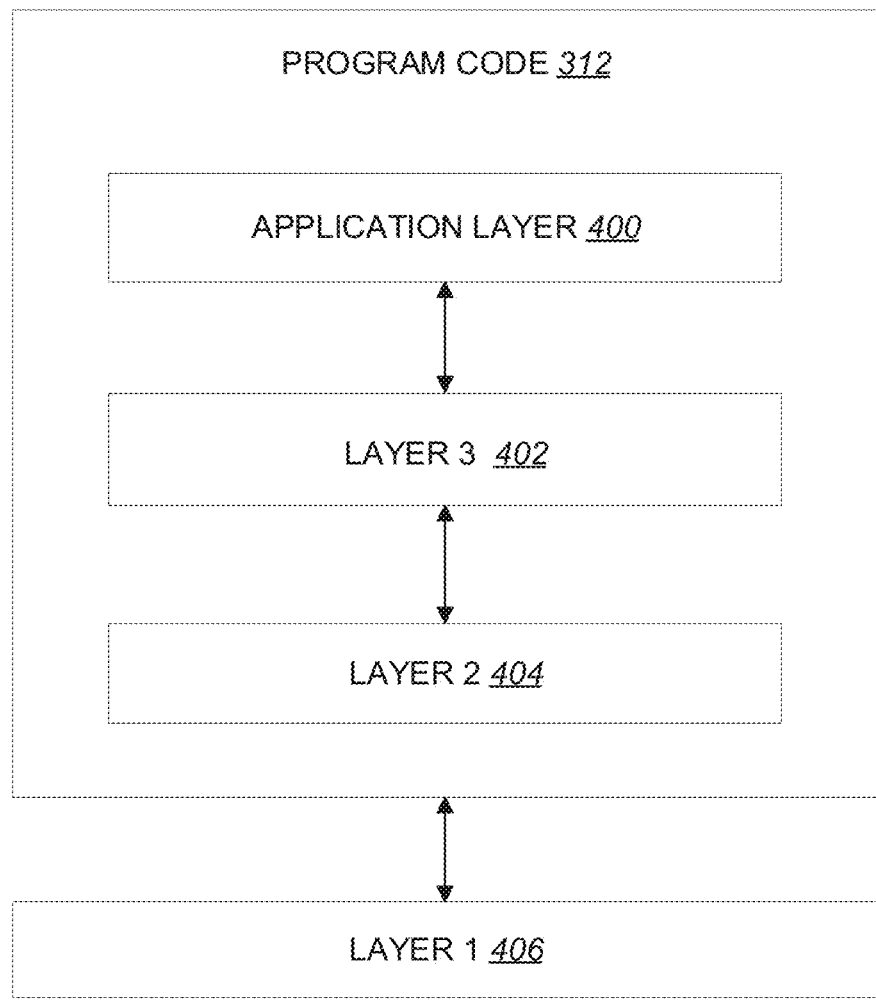
FIG. 4 is a functional block diagram of the program code of FIG. 3 according to one exemplary embodiment.

FIG. 4 is a simplified block diagram of the program code 312 shown in FIG. 3 in accordance with one embodiment of the disclosed subject matter. In this embodiment, the program code 312 includes an application layer 400, a Layer 3 portion 402, and a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

Frame structure may be used in New RAT (NR) for 5G, such as to accommodate various types of requirements (such as those discussed in R1-1803543) for one or more time and frequency resources (e.g., from ultra-low latency (~0.5 ms) to delay-tolerant traffic for Machine Type Communication (MTC), from high peak rate for enhanced Mobile Broadband (eMBB) to very low data rate for MTC, etc.).

Figure 5:
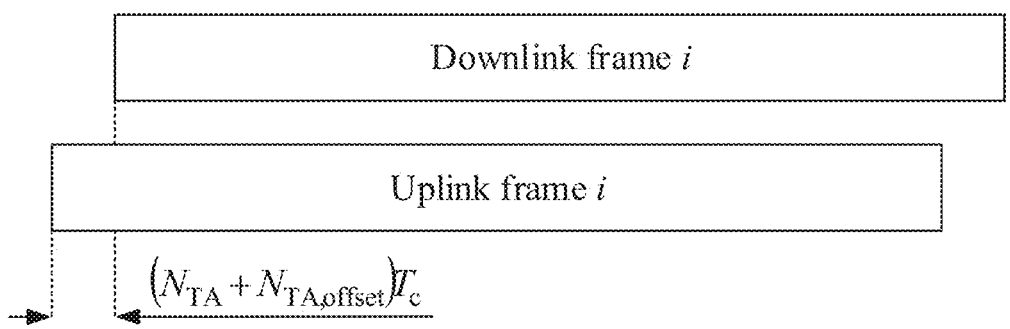
FIG. 5 is a diagram associated with an uplink-downlink timing relation according to one exemplary embodiment.

Parts of R1-1803543 with details of NR frame structure, channel and numerology design are quoted below. Notably, FIG. 4.3.1-1 of section 4.3.1 of R1-1803543, entitled "Uplink-downlink timing relation", is reproduced herein as FIG. 5.

4.3 Frame Structure 4.3.1 Frames and Subframes

Downlink and uplink transmissions are organized into frames with $T_f=(\Delta f_{max}N_f/100)=10$ ms duration, each consisting of ten subframes of $T_{sf}=(\Delta f_{max} N_f/1000)\cdot T_c=1$ ms duration. The number of consecutive OFDM symbols per subframe is $N_{symb}^{subframe,\mu}=N_{symb}^{slot}N_{slot}^{subframe,\mu}$. Each frame is divided into two equally-sized half-frames of five subframes each with half-frame 0 consisting of subframes 0-4 and half-frame 1 consisting of subframes 5-9.

There is one set of frames in the uplink and one set of frames in the downlink on a carrier.

Uplink frame number i for transmission from the UE shall start $T_{TA}=(N_{TA}+N_{TA,offset})T_c$ before the start of the corresponding downlink frame at the UE where $N_{TA,offset}$ depends on the frequency band according to [38.133].

FIG. 4.3.1-1: Uplink-Downlink Timing Relation 4.3.2 Slots

For subcarrier spacing configuration μ, slots are numbered $n_s^\mu \in \{0, \ldots, N_{slot}^{subframe,\mu}-1\}$ frame, in increasing order within a subframe and $n_{s,f}^\mu \in \{0, \ldots, N_{slot}^{frame,\mu}-1\}$ in increasing order within a frame. There are $N_{slot}^{symb}$ consecutive OFDM symbols in a slot where $N_{symb}^{slot}$ depends on the cyclic prefix as given by Tables 4.3.2-1 and 4.3.2-2. The start of slot $n_s^\mu$ in a subframe is aligned in time with the start of OFDM symbol $n_s^\mu N_{symb}^{slot}$ in the same subframe.

OFDM symbols in a slot can be classified as 'downlink' (denoted 'D' in Table 4.3.2-3), 'flexible' (denoted 'X'), or 'uplink' (denoted 'U'). Table 4.3.2-3 is used when the SFI-RNTI is used for slot format indication as described in clause 11.1.1 of [5, TS 38.213].

In a slot in a downlink frame, the UE shall assume that downlink transmissions only occur in 'downlink' or 'flexible' symbols.

In a slot in an uplink frame, the UE shall only transmit in 'uplink' or 'flexible' symbols.

Signaling of slot formats is described in clause 11.1 of [5, TS 38.213].

Power consumption is one major challenge for initial commercial use for 5G. Larger bandwidth, shorter latency and/or operation of antenna array (e.g., beam) are some aspects of 5G leading to high power consumption. Therefore, mechanisms to save power are under development in 3GPP.

A power saving signal can be used to configure and/or adapt power consumption of a UE. A power saving signal may be associated with one or more power saving techniques. For example, a power saving signal can be used to turn-on or turn-off one or more power saving techniques associated with the power saving signal. If a power saving technique can be adjusted with a plurality of power consumption levels (e.g., turn-on and turn-off can be considered as a special case of two levels), a power saving signal associated with the power saving technique can indicate which operation (or technique) with which level is to be applied, performed and/or conducted by the UE. In an example, a power saving technique may be wake up operation and a power saving signal may be used to wake up a UE (and/or to indicate to and/or instruct the UE to go to sleep). Another example of power saving technique is cross-slot scheduling. Cross-slot scheduling with different minimum values of scheduling delay may result in different levels of UE power saving and/or different levels of UE power consumption. In an example, a scheduling delay with minimum value 0 slot could consume the most power, a scheduling delay with minimum value 1 slot could consume medium power and a scheduling delay with minimum value 2 slot could consume the least power. A power saving signal may indicate to the UE a minimum value the UE should apply and/or assume. Power consumption characteristics associated with power saving techniques may be applied based on one or more indications in the power saving signal. Accordingly, power consumption of a UE may be adjusted and/or regulated using a power saving signal. There are several discussions regarding how a power saving signal could be indicated from a base station to a UE. For example, a Downlink Control Information (DCI) (e.g., one DCI) may indicate a power saving signal for a UE and/or a group of UEs. A DCI (e.g., one DCI) may be divided into several portions and/or fields wherein a UE could read and apply a corresponding portion and/or field of the DCI (associated with the UE). The power saving signal may be carried on a scheduling DCI, with addition of one or more new fields and/or modifications of interpretation of one or more existing fields. The power saving signal could be carried on a DCI for power saving purpose. A UE may read power saving related information from a DCI for power saving purpose. A UE may not read other information from a DCI for power saving purpose. More details regarding power saving signal and its corresponding design could be found in R1 #96bis RAN1 Chairman's note and R1 #97 RAN1 Chairman's note. Parts of R1 #96bis RAN1 Chairman's note comprising details regarding power saving signal and/or its corresponding design are quoted below:

Agreements:
  The PDCCH-based power saving signal/channel is UE-specifically configured.
  The DCI format(s) contain information for (including potential down-selection, which may or may not depend on power saving techniques/scenarios):
    Alt 1: triggering a single UE only
    Alt 2: triggering UE(s) within a group
      FFS whether to always trigger all UEs in a group or a subset of it
    Alt 3: Alt 1 & Alt 2

Agreements:
  The assumptions of the DCI design of the PDCCH-based power saving signal/channel include:
    No increase of DCI format size budget
      FFS whether or not the same or different sets of DCI format sizes for Active time vs. out of Active time
    Working assumption: no increase of UE BD/non-overlapping CCE limit Agreements:
  Possible candidates of DCI format design for the PDCCH-based power saving signal/channel (including potential down-selection, which may or may not depend on power saving techniques/scenarios):

New DCI format(s)
  The size of new DCI format may or may not be the same size as the existing DCI size
Enhancement of existing DCI. E.g.:
  Additional new field(s)
  Using the existing DCI format for the power saving purpose
    Re-purpose field(s) in the DCI
    The detection of existing DCI format as the indication for the power saving technique
Agreements:
The DCI format(s) of the PDCCH-based power saving signal/channel is designed to provide:
  Indication of one or more power saving associated operations.
  Supporting configurability (e.g., 0, 1, 2, . . . bits, etc.), if needed, for one or more information fields in the DCI at least for one DCI format
Agreements:
Potential DCI contents in DCI format(s), to be further investigated:
  Power saving technique associated with C-DRX—
    Essential for UE function for the C-DRX
      Wakeup—
        UE is indicated to transition from outside Active Time to Active Time
        UE is indicated to stay at Active Time
      Go to sleep—
        UE is indicated to transition from Active Time to outside Active Time.
        UE is indicated to stay outside Active Time
        FFS: The time of receiving the wakeup and go-to-sleep indication inside or outside Active Time.
  Cross-slot scheduling
  Triggering RS transmission
  CSI report
  Single vs. multi-cell operation
  BWP/SCell
    BWP & SCell together
    BWP and SCell have separated fields
  MIMO layer adaptation/number of Anenna adaptation
    May further depend on RAN4's work
  Indication of CORESET/search space/candidate of subsequent PDCCH decoding
  PDCCH monitoring periodicity
  PDCCH skipping (skipping duration)—
    PDCCH skipping—UE is indicated to skip number of the PDCCH monitoring occasions and stays in the Active Time
  Skipping number of DRX monitoring
  SPS activation
  DRX configuration
Agreements:
  The design of the DCI format(s) and size needs to account for one or more of the following aspects
    Within or outside Active Time
    DCI format size for the power saving signal/channel to fit the DCI format size budget
  Including aspects whether or not it is necessary to align it with existing DCI format size
Agreements:
  Support at least one CORESET with configured search space(s) for the power saving signal/channel
    FFS separate vs. shared with a CORESET (and/or search space(s)) configured for other purposes (when applicable)
Agreements:
  For PDCCH-based power saving signal/channel,
    The set of AL(s) is configured
    The number of PDCCH candidate(s) for each AL is configured
  Parts of R1 #97 RAN1 Chairman's note comprising details regarding power saving signal and/or its corresponding design is quoted below:
Agreements:
  The monitoring occasion(s) of the power saving signal/channel outside the Active Time is "indicated" to the UE by the gNB with an offset before the DRX ON
    "Indicated" implies the explicit signalling by higher layer signalling or implicit through the CORESET/search space
    FFS: The value and the range of offset
Agreements:
  For power saving signal/channel configured outside Active Time, introduce a new DCI format for a UE, where the UE is configured to monitor the DCI format, with the power saving information for the UE in the DCI configurable by RRC
    FFS whether the DCI is in UESS or CSS or both
    FFS detailed configuration of the power saving information
    FFS the new DCI format
    Note: the same DCI may carry power saving information for one or more UEs
Agreements:
  The indication of at least one power saving technique(s) is supported at least by the enhancement of existing scheduling DCI formats with additional field(s), if any, and/or repurposing the existing field(s), if identified, when UE is in the Active Time.
    It applies to UE-specific search space.
    It is FFS for the common search space.
    The at least one power saving technique(s) includes at least "Cross-slot scheduling"
    FFS: Which existing DCI formats includes the power saving information
      Whether power saving information is not included in the fallback DCI(s) (e.g., DCI format 0_0, DCI format 1_0)
      Use of non-scheduling DCI formats.
    It is FFS which field(s) is used to be repurposed for the indication of the power saving technique if the repurpose of existing field(s) is used.
    FFS: New DCI format with size aligned with existing DCI format
Agreements:
  A new RNTI (e.g., PS-RNTI) is introduced for the PDCCH-based power saving signal/channel decoding at least outside Active Time, UE-specifically configured
    FFS how to use the PS-RNTI for scrambling of the PDCCH-based power saving signal/channel
Agreements:
  Support UE-specific configuration of the search space set(s) dedicated to the PDCCH-based power saving signal/channel for UE to monitor outside Active Time
    Following the principle of Rel-15 search space configuration
    FFS: the corresponding UE behaviour in monitoring the power saving signal/channel outside Active Time
    FFS whether UE can further monitor the search space set(s) inside Active Time Agreements:
The CORESET for the PDCCH-based power saving signal/channel outside Active Time can be configured to index to at least one of the CORESET(S) configured for other PDCCH monitoring
  FFS whether the indexed CORESET can be exclusively used by the PDCCH-based power saving signal/channel (i.e., not be used for other PDCCH monitoring)
  FFS whether or not to increase the number of CORESETs relative to that in Rel-15
  FFS whether or not a BWP is dedicated for PDCCH-based power saving signal/channel Agreements:
One or more PDCCH monitoring occasion of PDCCH-based power saving signal/channel is supported outside Active Time
  FFS: Whether the monitoring occasions of the PDCCH-based power saving signal/channel in the same slot or not for multiple monitoring occasions
  FFS: whether the monitoring occasions are via search space set(s), CORESET(s), a combination thereof, etc.

Agreements:
For outside Active Time, up to [3] CORESETs per BWP is supported for the power saving signal/channel outside Active Time with each CORESET associated with its TCI state and QCL assumption
  FFS details
  FFS whether any other additional handling is necessary for FR2 w.r.t. TCI state, and if so, how Agreements:
Outside Active Time, the PDCCH-based power saving signal/channel is configured for triggering UE to or not to monitor the subsequent ON duration(s)
  FFS a single vs. multiple durations, particularly checking consistency with RAN2 agreements Further study in the new DCI how to potentially indicate at least the following techniques (subject to further WID update):
  Indicating UE to use the aperiodic RS
    Aperiodic CSI-RS
    Aperiodic SRS
    TRS
  Triggering aperiodic CSI report
  Cross-slot scheduling
  Rel-15 DCI-based BWP switching The power saving techniques can be explicitly included in the DCI contents or implicitly indicated by other techniques (e.g., BWP switching).

To reduce power consumption, Discontinuous Reception (DRX), and/or Connected mode-DRX (C-DRX) are introduced to avoid continuous reception, such as in association with Physical Downlink Control Channel (PDCCH) (e.g., unicast and/or UE-specific PDCCH), which could be used for scheduling uplink and/or downlink data traffic for the UE. Under the framework of DRX, Active Time may be defined and/or counted by a UE. A UE may be required and/or configured to monitor PDCCH during Active Time. Outside Active Time, such as during in-active time and/or non-active time, a UE may not monitor PDCCH so that power could be saved. Several timers and/or procedures are developed, which allow UE to determine and/or realize when Active Time is, (e.g., for various purposes such as at least one of initial traffic, bursty traffic, retransmission, random access, receiving an uplink grant, etc. More details of DRX may be found in the following quotation from 3GPP TS 38.321 V15.6.0:

5.7 Discontinuous Reception (DRX)
The MAC entity may be configured by RRC with a DRX functionality that controls the UE's PDCCH monitoring activity for the MAC entity's C-RNTI, CS-RNTI, INT-RNTI, SFI-RNTI, SP-CSI-RNTI, TPC-PUCCH-RNTI, TPC-PUSCH-RNTI, and TPC-SRS-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

RRC controls DRX operation by configuring the following parameters:
  drx-onDurationTimer: the duration at the beginning of a DRX Cycle;
  drx-SlotOffset: the delay before starting the drx-onDurationTimer;
  drx-InactivityTimer: the duration after the PDCCH occasion in which a PDCCH indicates a new UL or DL transmission for the MAC entity;
  drx-RetransmissionTimerDL (per DL HARQ process except for the broadcast process): the maximum duration until a DL retransmission is received;
  drx-RetransmissionTimerUL (per UL HARQ process): the maximum duration until a grant for UL retransmission is received;
  drx-LongCycleStartOffset: the Long DRX cycle and drx-StartOffset which defines the subframe where the Long and Short DRX Cycle starts;
  drx-ShortCycle (optional): the Short DRX cycle;
  drx-ShortCycleTimer (optional): the duration the UE shall follow the Short DRX cycle;
  drx-HARQ-RTT-TimerDL (per DL HARQ process except for the broadcast process): the minimum duration before a DL assignment for HARQ retransmission is expected by the MAC entity;
  drx-HARQ-RTT-TimerUL (per UL HARQ process): the minimum duration before a UL HARQ retransmission grant is expected by the MAC entity.

When a DRX cycle is configured, the Active Time includes the time while:
  drx-onDurationTimer or drx-Inactivity Timer or drx-RetransmissionTimerDL or drx-RetransmissionTimerUL or ra-ContentionResolutionTimer (as described in clause 5.1.5) is running; or
  a Scheduling Request is sent on PUCCH and is pending (as described in clause 5.4.4); or
  a PDCCH indicating a new transmission addressed to the C-RNTI of the MAC entity has not been received after successful reception of a Random Access Response for the Random Access Preamble not selected by the MAC entity among the contention-based Random Access Preamble (as described in clause 5.1.4).

When DRX is configured, the MAC entity shall:
1> if a MAC PDU is received in a configured downlink assignment:
  2> start the drx-HARQ-RTT-TimerDL for the corresponding HARQ process in the first symbol after the end of the corresponding transmission carrying the DL HARQ feedback;
  2> stop the drx-RetransmissionTimerDL for the corresponding HARQ process.

1> if a MAC PDU is transmitted in a configured uplink grant:
  2> start the drx-HARQ-RTT-TimerUL for the corresponding HARQ process in the first symbol after the end of the first repetition of the corresponding PUSCH transmission;
  2> stop the drx-RetransmissionTimerUL for the corresponding HARQ process.
1> if a drx-HARQ-RTT-TimerDL expires:
  2> if the data of the corresponding HARQ process was not successfully decoded:
    3> start the drx-RetransmissionTimerDL for the corresponding HARQ process in the first symbol after the expiry of drx-HARQ-RTT-TimerDL.
1> if a drx-HARQ-RTT-TimerUL expires:
  2> start the drx-RetransmissionTimerUL for the corresponding HARQ process in the first symbol after the expiry of drx-HARQ-RTT-TimerUL.
1> if a DRX Command MAC CE or a Long DRX Command MAC CE is received:
  2> stop drx-onDurationTimer;
  2> stop drx-InactivityTimer.
1> if drx-InactivityTimer expires or a DRX Command MAC CE is received:
  2> if the Short DRX cycle is configured:
    3> start or restart drx-ShortCycleTimer in the first symbol after the expiry of drx-InactivityTimer or in the first symbol after the end of DRX Command MAC CE reception;
    3> use the Short DRX Cycle.
  2> else:
    3> use the Long DRX cycle.
1> if drx-ShortCycleTimer expires:
  2> use the Long DRX cycle.
1> if a Long DRX Command MAC CE is received:
  2> stop drx-ShortCycleTimer;
  2> use the Long DRX cycle.
1> if the Short DRX Cycle is used, and [(SFN×10)+ subframe number] modulo (drx-ShortCycle)=(drx-StartOffset) modulo (drx-ShortCycle); or
1> if the Long DRX Cycle is used, and [(SFN×10)+ subframe number] modulo (drx-LongCycle)=drx-StartOffset:
  2> start drx-onDurationTimer after drx-SlotOffset from the beginning of the subframe.
1> if the MAC entity is in Active Time:
  2> monitor the PDCCH as specified in TS 38.213 [6];
  2> if the PDCCH indicates a DL transmission:
    3> start the drx-HARQ-RTT-TimerDL for the corresponding HARQ process in the first symbol after the end of the corresponding transmission carrying the DL HARQ feedback;
    3> stop the drx-RetransmissionTimerDL for the corresponding HARQ process.
  2> if the PDCCH indicates a UL transmission:
    3> start the drx-HARQ-RTT-TimerUL for the corresponding HARQ process in the first symbol after the end of the first repetition of the corresponding PUSCH transmission;
    3> stop the drx-RetransmissionTimerUL for the corresponding HARQ process.
  2> if the PDCCH indicates a new transmission (DL or UL):
    3> start or restart drx-Inactivity Timer in the first symbol after the end of the PDCCH reception.
1> in current symbol n, if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:
  2> not transmit periodic SRS and semi-persistent SRS defined in TS 38.214 [7].
1> if CSI masking (csi-Mask) is setup by upper layers:
  2> in current symbol n, if drx-onDurationTimer would not be running considering grants/assignments/DRX Command MAC CE/Long DRX Command MAC CE received until 4 ms prior to symbol n when evaluating all DRX Active Time conditions as specified in this clause:
    3> not report CSI on PUCCH.
1> else:
  2> in current symbol n, if the MAC entity would not be in Active Time considering grants/assignments/DRX Command MAC CE/Long DRX Command MAC CE received and Scheduling Request sent until 4 ms prior to symbol n when evaluating all DRX Active Time conditions as specified in this clause:
    3> not report CSI on PUCCH and semi-persistent CSI on PUSCH.

Regardless of whether the MAC entity is monitoring PDCCH or not, the MAC entity transmits HARQ feedback, aperiodic CSI on PUSCH, and aperiodic SRS defined in TS 38.214 [7] when such is expected. The MAC entity needs not to monitor the PDCCH if it is not a complete PDCCH occasion (e.g. the Active Time starts or ends in the middle of a PDCCH occasion).

< . . . >

5.4.1 UL Grant Reception

Uplink grant is either received dynamically on the PDCCH, in a Random Access Response, or configured semi-persistently by RRC. The MAC entity shall have an uplink grant to transmit on the UL-SCH. To perform the requested transmissions, the MAC layer receives HARQ information from lower layers.

If the MAC entity has a C-RNTI, a Temporary C-RNTI, or CS-RNTI, the MAC entity shall for each PDCCH occasion and for each Serving Cell belonging to a TAG that has a running timeAlignmentTimer and for each grant received for this PDCCH occasion:
1> if an uplink grant for this Serving Cell has been received on the PDCCH for the MAC entity's C-RNTI or Temporary C-RNTI; or
1> if an uplink grant has been received in a Random Access Response:
  1> else if an uplink grant for this PDCCH occasion has been received for this Serving Cell on the PDCCH for the MAC entity's CS-RNTI:

When a UE has uplink data arrival, the UE may try to request an uplink grant. A UE may send a scheduling request (SR) to a base station. The scheduling request may be sent via a physical uplink control channel (PUCCH) and/or via a random access procedure. Responsive to the scheduling request, the base station may send an uplink grant to the UE. The UE may send a buffer status report (BSR) to the base station with the uplink grant. The buffer status report may inform the base station of an amount of uplink data to be transmitted. For example, the UE may send a buffer status report if there is still uplink data left which could not be accommodated in the uplink grant. The base station may determine and/or realize how to schedule uplink data with the assistance of a buffer status report. More details could be found in the following quotation from 3GPP TS 38.321 V15.6.0:

5.4.4 Scheduling Request

The Scheduling Request (SR) is used for requesting UL-SCH resources for new transmission.

The MAC entity may be configured with zero, one, or more SR configurations. An SR configuration consists of a set of PUCCH resources for SR across different BWPs and cells. For a logical channel, at most one PUCCH resource for SR is configured per BWP.

. . .

Only PUCCH resources on a BWP which is active at the time of SR transmission occasion are considered valid.
As long as at least one SR is pending, the MAC entity shall for each pending SR:

1> if the MAC entity has no valid PUCCH resource configured for the pending SR:
        2> initiate a Random Access procedure (see subclause 5.1) on the SpCell and cancel the pending SR.
    1> else, for the SR configuration corresponding to the pending SR:

. . .

4> instruct the physical layer to signal the SR on one valid PUCCH resource for SR;

5.4.5 Buffer Status Reporting

The Buffer Status reporting (BSR) procedure is used to provide the serving gNB with information about UL data volume in the MAC entity.

The MAC entity determines the amount of UL data available for a logical channel according to the data volume calculation procedure in TSs 38.322 [3] and 38.323 [4].

A BSR shall be triggered if any of the following events occur:

UL data, for a logical channel which belongs to an LCG, becomes available to the MAC entity; and either
        this UL data belongs to a logical channel with higher priority than the priority of any logical channel containing available UL data which belong to any LCG; or
        none of the logical channels which belong to an LCG contains any available UL data.
    in which case the BSR is referred below to as 'Regular BSR';

A random access procedure may be triggered and/or initiated due to several causes (e.g., at least one of handover, beam failure, uplink data arrival, system information (SI) request, connection (re-)establishment, PDCCH order (e.g., DL data arrival), etc.). Some of them, e.g., handover and/or PDCCH, may be initiated by a base station. Some of them, e.g., beam failure, uplink data arrival, system information (SI) request, connection (re-)establishment, etc. may be initiated by a UE. The random access procedure may be categorized into two types: contention based and non-contention based. A contention based random access procedure involves four steps (Msg1~Msg4). Msg1 of contention based random access procedure is selected from a group of preambles shared by a plurality of UEs, so Msg3 with UE identity information is required to identify the UE and a contention resolution (Msg4) is used to complete the random access procedure. A non-contention based random access procedure involves two steps (Msg1~Msg2) (e.g., there could be another step Msg 0 to initiate the procedure). Msg1 of non-contention based random access procedure is dedicated to a UE in one or more allocated Physical Random Access Channel (PRACH) resources. Thus, Msg1 in a non-contention based random access procedure may be sufficient to identify a UE and a Msg2 may be used to complete the non-contention based random access procedure. More details of random access procedure are quoted from 3GPP TS 38.321 V15.6.0:

5.1 Random Access Procedure

. . .

5.1.3 Random Access Preamble Transmission

The MAC entity shall, for each Random Access Preamble:

. . .

1> instruct the physical layer to transmit the Random Access Preamble using the selected PRACH occasion, corresponding RA-RNTI (if available), PREAMBLE_INDEX and PREAMBLE_RECEIVED_TARGET POWER.

5.1.4 Random Access Response Reception

Once the Random Access Preamble is transmitted and regardless of the possible occurrence of a measurement gap, the MAC entity shall:

. . .

4> if the Random Access Preamble was not selected by the MAC entity among the contention-based Random Access Preamble(s):
        5> consider the Random Access procedure successfully completed.
    4> else:
        5> set the TEMPORARY C-RNTI to the value received in the Random Access Response;
        5> if this is the first successfully received Random Access Response within this Random Access procedure:
            6> if the transmission is not being made for the CCCH logical channel:
                7> indicate to the Multiplexing and assembly entity to include a C-RNTI MAC CE in the subsequent uplink transmission.
            6> obtain the MAC PDU to transmit from the Multiplexing and assembly entity and store it in the Msg3 buffer.

. . .

5.1.5 Contention Resolution

Once Msg3 is transmitted, the MAC entity shall:
    1> start the ra-ContentionResolutionTimer and restart the ra-ContentionResolutionTimer at each HARQ retransmission in the first symbol after the end of the Msg3 transmission;
    1> monitor the PDCCH while the ra-ContentionResolutionTimer is running regardless of the possible occurrence of a measurement gap;

A Physical Downlink Control Channel (PDCCH) is used to carry downlink physical control information. Physical control information may comprise several types (e.g., scheduling information, a command from a base station, slot format related information, etc. A UE may not be able to predict whether there is a PDCCH (e.g., a PDCCH for scheduling data) from a base station to the UE. Therefore, the UE may have to monitor PDCCH in some occasions (e.g., monitoring occasions) indicated by the base station. For example, a UE may try to decode a plurality of PDCCH candidates. PDCCH in a slot may or may not comprise a PDCCH for the UE. This is known as PDCCH blind decoding. UE blindly decodes and/or checks a plurality of resources with a plurality of DCI formats. Once PDCCH for the UE is detected, the UE may take corresponding action accordingly (e.g., perform data-related processing if the detected PDCCH carrying scheduling information). To perform such blind decoding or searching, the number of candidates and/or the type of candidates that could be decoded by a UE within a duration may be subject to some constraints (e.g., a UE capability of the UE). For example, a number of PDCCH candidates that may be decoded by a UE in a slot is limited. The limitation could depend on a numerology and/or a subcarrier spacing. Slot length itself may depend on numerology and/or subcarrier spacing. A number of non-overlapping Control Channel Elements (CCE) may also be limited since the number of non-overlapping CCEs corresponds to a number of channel estimations to be performed by a UE. The number of channel estimations to be performed in one slot could be proportional to a UE's complexity. Another example of limitation is a number of DCI sizes to be decoded in one slot. If the number of DCI sizes to be decoded in one slot exceeds a certain threshold, the UE may align sizes of different DCI formats to fit within such limitation. A number of control resource set (CORESET) and/or a number of search space in a given bandwidth part (BWP) are limited, e.g. 3 CORESETs per BWP and 10 search spaces or 10 search space sets per BWP. More details of PDCCH monitoring are quoted below from 3GPP TS 38.213 V15.6.0:

10 UE Procedure for Receiving Control Information

A UE monitors a set of PDCCH candidates in one or more CORESETs on the active DL BWP on each activated serving cell configured with PDCCH monitoring according to corresponding search space sets where monitoring implies decoding each PDCCH candidate according to the monitored DCI formats.

. . .

10.1 UE Procedure for Determining Physical Downlink Control Channel Assignment

A set of PDCCH candidates for a UE to monitor is defined in terms of PDCCH search space sets. A search space set can be a CSS set or a USS set. A UE monitors PDCCH candidates in one or more of the following search spaces sets
- a Type0-PDCCH CSS set configured by pdcch-ConfigSIB1 in MIB or by searchSpaceSIB1 in PDCCH-ConfigCommon or by searchSpaceZero in PDCCH-ConfigCommon for a DCI format with CRC scrambled by a SI-RNTI on the primary cell of the MCG
- a Type0A-PDCCH CSS set configured by searchSpaceOtherSystemInformation in PDCCH-ConfigCommon for a DCI format with CRC scrambled by a SI-RNTI on the primary cell of the MCG
- a Type1-PDCCH CSS set configured by ra-SearchSpace in PDCCH-ConfigCommon for a DCI format with CRC scrambled by a RA-RNTI or a TC-RNTI on the primary cell
- a Type2-PDCCH CSS set configured by paging-SearchSpace in PDCCH-ConfigCommon for a DCI format with CRC scrambled by a P-RNTI on the primary cell of the MCG
- a Type3-PDCCH CSS set configured by SearchSpace in PDCCH-Config with searchSpaceType=common for DCI formats with CRC scrambled by INT-RNTI, SFI-RNTI, TPC-PUSCH-RNTI, TPC-PUCCH-RNTI, or TPC-SRS-RNTI and, only for the primary cell, C-RNTI, MCS-C-RNTI, or CS-RNTI(s), and
- a USS set configured by SearchSpace in PDCCH-Config with searchSpaceType=ue-Specific for DCI formats with CRC scrambled by C-RNTI, MCS-C-RNTI, SP-CSI-RNTI, or CS-RNTI(s).

. . .

For each DL BWP configured to a UE in a serving cell, a UE can be provided by higher layer signalling with P≤3 CORESETs. For each CORESET, the UE is provided the following by ControlResourceSet:

- a CORESET index p, 0≤p<12, by controlResourceSetId;
- a DM-RS scrambling sequence initialization value by pdcch-DMRS-ScramblingID;
- a precoder granularity for a number of REGs in the frequency domain where the UE can assume use of a same DM-RS precoder by precoderGranularity;
- a number of consecutive symbols provided by duration;
- a set of resource blocks provided by frequencyDomainResources;
- CCE-to-REG mapping parameters provided by cce-REG-MappingType;
- an antenna port quasi co-location, from a set of antenna port quasi co-locations provided by TCI-State, indicating quasi co-location information of the DM-RS antenna port for PDCCH reception in a respective CORESET;
- an indication for a presence or absence of a transmission configuration indication (TCI) field for DCI format 1_1 transmitted by a PDCCH in CORESET p, by TCI-PresentInDCI.

. . .

For each DL BWP configured to a UE in a serving cell, the UE is provided by higher layers with S≤10 search space sets where, for each search space set from the S search space sets, the UE is provided the following by SearchSpace:
- a search space set index s, 0≤s<40, by searchSpaceId
- an association between the search space set s and a CORESET p by controlResourceSetId
- a PDCCH monitoring periodicity of $k_s$ slots and a PDCCH monitoring offset of $o_s$ slots, by monitoringSlotPeriodiciyAndOffset
- a PDCCH monitoring pattern within a slot, indicating first symbol(s) of the CORESET within a slot for PDCCH monitoring, by monitoringSymbolsWithinSlot
- a duration of $T_s < k_s$ slots indicating a number of slots that the search space set s exists by duration
- a number of PDCCH candidates $N_s^{(L)}$ per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively
- an indication that search space set s is either a CSS set or a USS set by searchSpaceType

. . .

- if search space set s is a USS set, an indication by dci-Formats to monitor PDCCH candidates either for DCI format 0_0 and DCI format 1_0, or for DCI format 0_1 and DCI format 1_1

. . .

A UE determines a PDCCH monitoring occasion on an active DL BWP from the PDCCH monitoring periodicity, the PDCCH monitoring offset, and the PDCCH monitoring pattern within a slot. For search space set s, the UE determines that a PDCCH monitoring occasion(s) exists in a slot with number $n_{s,f}^\mu$ [4, TS 38.211] in a frame with number $n_f$ if $(n_f N_{slot}^{frame,\mu} + n_{s,f}^\mu - o_s) \mod k_s = 0$. The UE monitors PDCCH candidates for search space set s for $T_s$ consecutive slots, starting from slot $n_{s,f}^\mu$, and does not monitor PDCCH candidates for search space set s for the next $k_s - T_s$ consecutive slots.

. . .

For a search space set s associated with CORESET p, the CCE indexes for aggregation level L corresponding to PDCCH candidate $m_{s,n_{CI}}$ of the search space set in slot $n_{s,f}^\mu$ for an active DL BWP of a serving cell corresponding to carrier indicator field value $n_{CI}$ are given by $$L \cdot \left\{ \left( Y_{p,n_{s,f}^\mu}^\mu + \left\lfloor \frac{m_{s,n_{CI}} \cdot N_{CCE,p}}{L \cdot M_{s,max}^{(L)}} \right\rfloor + n_{CI} \right) \mathrm{mod} \lfloor N_{CCE,p}/L \rfloor \right\} + i \ldots$$

A UE expects to monitor PDCCH candidates for up to 4 sizes of DCI formats that include up to 3 sizes of DCI formats with CRC scrambled by C-RNTI per serving cell. The UE counts a number of sizes for DCI formats per serving cell based on a number of configured PDCCH candidates in respective search space sets for the corresponding active DL BWP.

A PDCCH candidate with index $n_{s_j,n_{CI}}$ for a search space set $s_j$ using a set of CCEs in a CORESET p on the active DL BWP for serving cell $n_{CI}$ is not counted for monitoring if there is a PDCCH candidate with index $m_{s_i,n_{CI}}$ for a search space set $s_i < s_j$, or if there is a PDCCH candidate with index $n_{s_j,n_{CI}}$ and $n_{s_j,n_{CI}} < m_{s_j,n_{CI}}$, in the CORESET p on the active DL BWP for serving cell $n_{CI}$ using a same set of CCEs, the PDCCH candidates have identical scrambling, and the corresponding DCI formats for the PDCCH candidates have a same size; otherwise, the PDCCH candidate with index $n_{s_j,n_{CI}}$ is counted for monitoring.

. . .

Table 10.1-3 provides the maximum number of non overlapped CCEs, $C_{PDCCH}^{max,slot,\mu}$ for a DL BWP with SCS configuration $\mu$ that a UE is expected to monitor corresponding PDCCH candidates per slot for operation with a single serving cell.

CCEs for PDCCH candidates are non-overlapped if they correspond to different CORESET indexes, or different first symbols for the reception of the respective PDCCH candidates.

. . .

For each scheduled cell, the UE is not required to monitor on the active DL BWP with SCS configuration $\mu$ of the scheduling cell more than $\min(M_{PDCCH}^{max,slot,\mu}, M_{PDCCH}^{total,slot,\mu})$ PDCCH candidates or more than $\min(C_{PDCCH}^{max,slot,\mu}, C_{PDCCH}^{total,slot,\mu})$ non-overlapped CCEs per slot.

A UE does not expect to be configured CSS sets that result to corresponding total, or per scheduled cell, numbers of monitored PDCCH candidates and non-overlapped CCEs per slot that exceed the corresponding maximum numbers per slot.

. . .

For the CSS sets, a UE monitors $$M_{PDCCH}^{CSS} = \sum_{i=0}^{I_{css}-1} \sum_L M_{S_{css}(i)}^{(L)}$$

PDCCH candidates requiring a total of $C_{PDCCH}^{CSS}$ non-overlapping CCEs in a slot.

The UE allocates PDCCH candidates for monitoring to USS sets for the primary cell having an active DL BWP with SCS configuration $\mu$ in slot n according to the following pseudocode. A UE does not expect to monitor PDCCH in a USS set without allocated PDCCH candidates for monitoring.

Figure 6:
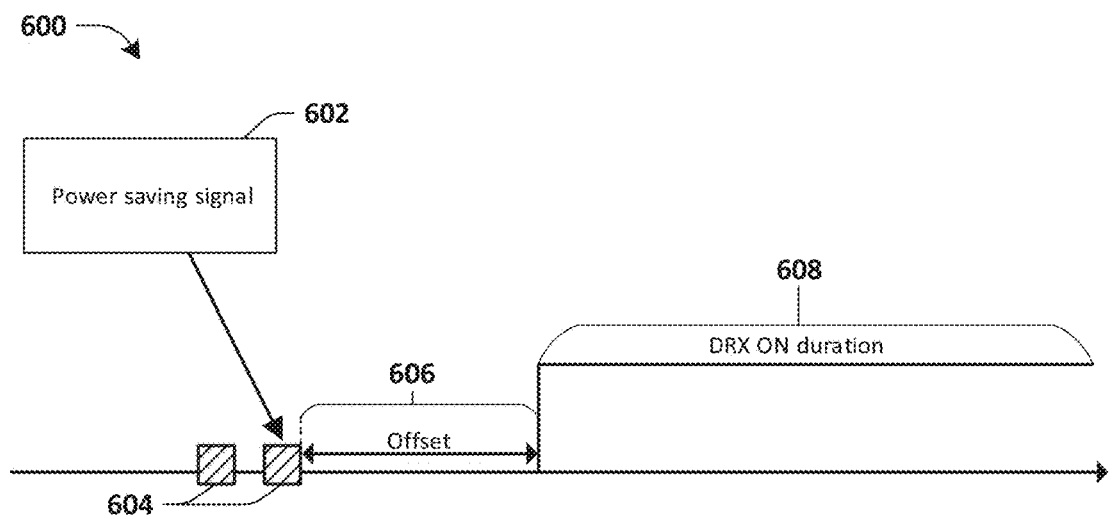
FIG. 6 is a diagram illustrating an exemplary scenario associated with one or more monitoring occasions for a power saving signal according to one exemplary embodiment.

As mentioned in the foregoing description, a UE may monitor a power saving signal before a DRX ON duration. There may be an offset, signaled to the UE, indicating one or more monitoring occasions for the power saving signal. FIG. 6 illustrates an exemplary scenario 600 associated with the one or more monitoring occasions (shown with reference number 604) for the power saving signal (shown with reference number 602). In some embodiments, the power saving signal 602 may be transmitted and/or received at a monitoring occasion of the one or more monitoring occasions 604. The UE may monitor the power saving signal 602 at the one or more monitoring occasions 604 (e.g., the UE may detect and/or receive the power saving signal 602 while monitoring for the power saving signal 602 during a monitoring occasion of the one or more monitoring occasions 604). There may be an offset 606 between the one or more monitoring occasions and the DRX ON duration (shown with reference number 608).

In some embodiments, the power saving signal may be carried on Physical Downlink Control Channel (PDCCH) (e.g., with a new format and/or a new Radio Network Temporary Identifier (RNTI)). In some embodiments, the power saving signal is for a group of UEs (e.g., multiple UEs comprising the UE). The power saving signal may be carried on a group common PDCCH. In some embodiments, the PDCCH (e.g., the group common PDCCH) is not a scheduling Downlink Control Information (DCI). The PDCCH may be monitored in a specific search space and/or a specific Control Resource set (CORESET) and/or one or more separate search spaces and/or one or more separate CORESETs. However, Active Time may span across at least some of the one or more monitoring occasions for the power saving signal. In an example, the Active Time may be initiated due to uplink data arrival. In some embodiments, the Active Time comprises one or more times when a scheduling request is sent on Physical Uplink Control Channel (PUCCH) and/or when waiting for a contention resolution after receiving a Random Access Response (RAR). The Active Time may cover at least some of the one or more monitoring occasions of the power saving signal that indicates the offset to the DRX ON duration.

Figure 7:
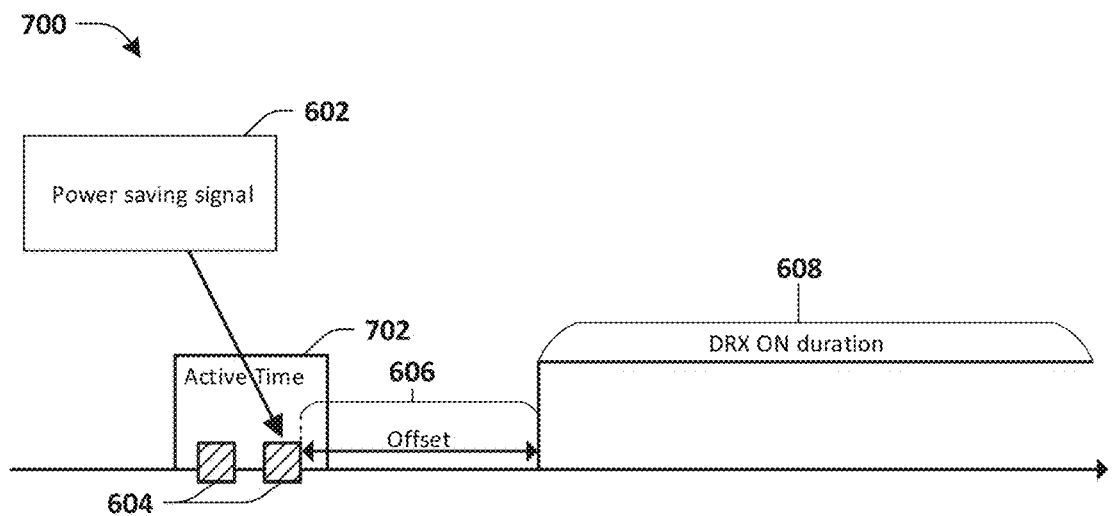
FIG. 7 is a diagram illustrating an exemplary scenario associated with one or more monitoring occasions for a power saving signal according to one exemplary embodiment.

FIG. 7 illustrates an exemplary scenario 700 associated with the one or more monitoring occasions 604 for the power saving signal 602. In the exemplary scenario 700, the one or more monitoring occasions 604 may be within the Active Time (shown with reference number 702) associated with the UE (e.g., the Active Time 702 may cover and/or span across the one or more monitoring occasions 604).

In a scenario in which the Active Time spans across the one or more monitoring occasions for the power saving signal (such as the exemplary scenario 700), the UE may need to resolve a conflict between monitoring PDCCH for the power saving signal and monitoring PDCCH with other types (e.g., monitoring PDCCH for other types of signals and/or information other than the power saving signal, such as a scheduling DCI). Alternatively and/or additionally, if the Active Time is due to a scheduling request or contention based random access (e.g., if the Active Time is initiated due to the scheduling request and/or the contention based random access), a base station may not be aware of the Active Time (e.g., the base station may not be aware of the Active Time of the UE during at least some of the Active Time, such as in the beginning of the Active time during which the base station does not receive a scheduling request). Accordingly, the base station may not determine and/or realize the conflict of the UE (e.g., the conflict between monitoring PDCCH for the power saving signal and monitoring PDCCH for other types of signals and/or information other than the power saving signal). The base station may not be able to resolve the conflict (such as due to the base station not determining and/or realizing the conflict). In some embodiments, the conflict may arise as a result of monitoring PDCCH for the power saving signal and monitoring PDCCH for other types of signals and/or information exceeding a UE capability of the UE (e.g., a UE capability for PDCCH monitoring). For example, the UE may not be able to perform both monitoring PDCCH for the power saving signal and monitoring PDCCH for the other types of signals and/or information. For example, a total quantity of PDCCH candidates in a slot for both the power saving signal and one or more other types of PDCCH (e.g., a scheduling DCI and/or one or more other types of PDCCH) may exceed a quantity of PDCCH candidates that can be monitored by the UE (e.g., the UE capability of the UE may correspond to the quantity of PDCCH candidates that can be monitored by the UE). Alternatively and/or additionally, a total quantity of non-overlapped Control Channel Elements (CCE) in a slot for both the power saving signal and the one or more other types of PDCCH may exceed a maximum value of non-overlapped CCEs (such as corresponding to the UE capability of the UE). Alternatively and/or additionally, a total quantity of DCI format sizes in a slot for both the power saving signal and the one or more other types of PDCCH may exceed a maximum value of DCI format sizes (such as corresponding to the UE capability of the UE). Alternatively and/or additionally, Transmission Configuration Indication (TCI) states or beams for both the power saving signal and the one or more other types of PDCCH may not be monitored simultaneously and/or concurrently (e.g., the UE may not be capable of monitoring (and/or configured to monitor) TCI states or beams for both the power saving signal and the one or more other types of PDCCH simultaneously and/or concurrently). Alternatively and/or additionally, a total quantity of CORESETs to be monitored for both the power saving signal and the one or more other types of PDCCH may exceed a maximum value of CORESETs (such as corresponding to the UE capability of the UE). Alternatively and/or additionally, a total quantity of search spaces to be monitored for both the power saving signal and the one or more other types of PDCCH may exceed a maximum value of search spaces (such as corresponding to the UE capability of the UE). Alternatively and/or additionally, overlapping and/or conflict between Active Time and at least some of the one or more monitoring occasions for the power saving signal corresponds to continuous data traffic. In some embodiments where there is continuous data traffic from a last DRX ON duration (e.g., a previous and/or most recent DRX ON duration), one or more DRX timers (e.g., at least one of DRX inactivity timer, DRX retransmission timer, etc.) may be running such that there is Active Time for the UE after the last DRX ON duration. The Active Time may cover and/or span across at least some of the one or more monitoring occasions of the power saving signal (e.g., the power saving signal indicating the offset to a DRX ON duration, such as a next DRX ON duration). In some embodiments, a difference between continuous data traffic (and/or contiguous data traffic) and uplink data arrival is that the base station may realize and/or determine that there is continuous data traffic (and/or contiguous data traffic) (e.g., whereas the base station may not be able to realize and/or determine that there is uplink data arrival and/or Active Time of the UE due to uplink data arrival). Accordingly, a base station may resolve a conflict associated with one or more monitoring occasions for the power saving signal and/or Active Time that is due to continuous data traffic (and/or contiguous data traffic).

A first general concept of the present disclosure is that a UE may not monitor a PDCCH for a power saving signal in one or more monitoring occasions if the one or more monitoring occasions are within Active Time. Alternatively and/or additionally, the UE may skip monitoring a PDCCH for the power saving signal in one or more monitoring occasions if the one or more monitoring occasions are within Active Time.

A second general concept of the present disclosure is that a UE may behave as if one or more specific values in one or more fields are indicated by a power saving signal if the UE skips monitoring for the power saving signal. The UE may not detect and/or receive the power saving signal. The UE may use one or more default values and/or one or more default assumptions corresponding to one or more power consumption characteristics (and/or one or more power saving techniques) indicated by the power saving signal. In an example where a power saving signal indicates one or more values corresponding to one or more power consumption characteristics (and/or one or more power saving techniques, one or more configurations and/or one or more operations), such as whether the UE should wake up, the one or more specific values, the one or more default values and/or the one or more default assumptions correspond to one or more assumed power consumption characteristics (and/or one or more assumed power saving techniques and/or one or more other assumed operations), such as that the UE should wake up (or the UE should not wake up). In an example where the one or more specific values, the one or more default values and/or the one or more default assumptions indicate that the UE should wake up, the UE may wake up if the UE skips monitoring a power saving signal that indicates to (and/or instructs) the UE to wake up or not to wake up. One or more criteria may be used to determine the one or more specific values, the one or more default values and/or the one or more default assumptions (and/or to select the one or more specific values, the one or more default values and/or the one or more default assumptions).

A third general concept of the present disclosure is that a base station may instruct (and/or indicate to) a UE not to monitor one or more monitoring occasions for one or more power saving signals. A base station may instruct (and/or indicate to) a UE not to monitor one or more monitoring occasions that overlap with Active Time.

A fourth general concept of the present disclosure is that a UE may solve a conflict (such as a conflict described in the foregoing description) by using a priority to select a PDCCH, one or more PDCCH candidates and/or a DCI format to be monitored if one or more monitoring occasions for a power saving signal overlaps with Active Time. The selection may be performed and/or used when required (and/or configured) PDCCH monitoring of the UE exceeds a UE capability of the UE.

Some and/or all of the four general concepts of the present disclosure can be combined to form to a concept.

Behavior and/or operations described throughout the present disclosure may be applied to a single serving cell and/or multiple serving cells, unless otherwise noted.

Throughout the present disclosure, the term "base station" may refer to a base station, a network, a network node and/or a gNB. These terms may be used interchangeably.

In a first embodiment, a UE receives an indication from a base station to monitor a power saving signal. The UE may determine whether to monitor the power saving signal in a slot based on whether the slot is in Active Time. In some embodiments, the UE may determine whether to skip monitoring of the power saving signal in the slot based on whether the slot is within Active Time. The UE may monitor the power saving signal in the slot if the slot is not within Active Time. Alternatively and/or additionally, the UE may not monitor the power saving signal in the slot if the slot is within Active Time. In some embodiments, the UE may skip monitoring of the power saving signal in the slot if the slot is within Active Time. Alternatively and/or additionally, the UE may not skip monitoring of the power saving signal in the slot if the slot is not within Active Time.

In some embodiments, the UE does not monitor the power saving signal in one or more monitoring occasions if at least one monitoring occasion of the one or more monitoring occasions is within Active Time. The UE may skip monitoring of the power saving signal in the one or more monitoring occasions if at least one monitoring occasion of the one or more monitoring occasions is within Active Time. The UE may not monitor the power saving signal in the one or more monitoring occasions if (all monitoring occasions of) the one or more monitoring occasions are within Active Time. The UE may skip monitoring of the power saving signal in the one or more monitoring occasions if (all monitoring occasions of) the one or more monitoring occasions are within Active Time.

The one or more monitoring occasions may comprise one, some and/or all monitoring occasions within a DRX cycle. The one or more monitoring occasions may comprise one, some and/or all monitoring occasions between two DRX ON durations (e.g., the two DRX ON durations may be two consecutive DRX ON durations). The one or more monitoring occasions may comprise one, some and/or all monitoring occasions before a DRX ON duration (and/or after a preceding DRX ON duration before the DRX ON duration). The one or more monitoring occasions may comprise one, some and/or all monitoring occasions for a power saving signal that indicates information for the DRX ON duration (and/or a different DRX ON duration). The power saving signal may indicate whether the UE should wake up for the DRX ON duration (and/or a different DRX ON duration). The power saving signal may be monitored before the DRX ON duration (and/or a different DRX ON duration). An offset may be indicative of the one or more monitoring occasions of the power saving signal. The offset may be indicative of a time duration between a beginning of a DRX ON duration and the one or more monitoring occasions of the power saving signal.

In some embodiments, the power saving signal is carried on and/or transmitted via a PDCCH. Alternatively and/or additionally, the PDCCH may not comprise scheduling information for the UE. Alternatively and/or additionally, the PDCCH may be for power saving (e.g., the PDCCH may be configured and/or used for power saving signals and/or other signals). Alternatively and/or additionally, the PDCCH may be a group common PDCCH. Alternatively and/or additionally, the PDCCH may be for a group of UEs. Alternatively and/or additionally, the PDCCH may be monitored in a common search space. Alternatively and/or additionally, the PDCCH may be scrambled with a RNTI specific for power saving (e.g., the RNTI may be configured and/or used for power saving signals and/or other signals). Alternatively and/or additionally, the PDCCH may have a new DCI format. Alternatively and/or additionally, the PDCCH may be monitored in a CORESET for power saving (e.g., the CORESET may be configured and/or used for monitoring power saving signals and/or other signals). Alternatively and/or additionally, the PDCCH may be monitored in a BWP for power saving (e.g., the BWP may be configured and/or used for monitoring power saving signals and/or other signals).

In some embodiments, the UE behaves as if the UE detects and/or receives a power saving signal for the UE. Alternatively and/or additionally, the UE may behave as if the UE detects and/or receives a power saving signal for the UE when the UE does not monitor a power saving signal in one or more monitoring occasions. Alternatively and/or additionally, the UE may behave as if the UE detects and/or receives a power saving signal for the UE when the UE skips monitoring of a power saving signal in one or more monitoring occasions associated with the power saving signal. Alternatively and/or additionally, the UE may behave as if the UE detects and/or receives a power saving signal indicating one or more values in one or more fields (of the power saving signal). For example, the UE may apply one or more power saving techniques and/or one or more configurations and/or perform one or more operations in accordance with the one or more values. In an example, responsive to the UE skipping monitoring and/or determining to skip monitoring of a power saving signal in the one or more monitoring occasions, the UE may perform one or more operations and/or apply one or more power saving techniques and/or one or more configurations that the UE is configured to perform and/or apply responsive to receiving a power saving signal indicative of the one or more values in the one or more fields. Alternatively and/or additionally, the UE may behave as if the UE detects and/or receives a power saving signal indicating whether one or more first power saving techniques are applied. In an example, responsive to the UE skipping monitoring and/or determining to skip monitoring of a power saving signal in the one or more monitoring occasions, the UE may perform one or more operations and/or apply one or more power saving techniques and/or one or more configurations that the UE is configured to perform and/or apply responsive to receiving a power saving signal indicating whether the one or more first power saving techniques are applied. Alternatively and/or additionally, the UE may behave as if the UE detects and/or receives a power saving signal indicating how one or more second power saving techniques are applied. In an example, responsive to the UE skipping monitoring and/or determining to skip monitoring of a power saving signal in the one or more monitoring occasions, the UE may perform one or more operations and/or apply one or more power saving techniques and/or one or more configurations that the UE is configured to perform and/or apply responsive to receiving a power saving signal indicating how the one or more second power saving techniques are applied. Alternatively and/or additionally, the UE may behave as if the UE detects and/or receives a power saving signal indicating one or more power consumption characteristics. In an example, responsive to the UE skipping monitoring and/or determining to skip monitoring of a power saving signal in the one or more monitoring occasions, the UE may perform one or more operations and/or apply one or more power saving techniques and/or one or more configurations that the UE is configured to perform and/or apply responsive to receiving a power saving signal indicating the one or more power consumption characteristics. One or more power saving techniques (e.g., the one or more first power saving techniques and/or the one or more second power saving techniques) may be associated with the power saving signal. For example, the power saving signal may comprise information indicative of one or more configurations, one or more power saving techniques and/or one or more operations.

In some embodiments, the UE wakes up for a DRX ON duration if the UE skips monitoring of a power saving signal in one or more monitoring occasions for the DRX ON duration. Alternatively and/or additionally, the one or more monitoring occasions for the DRX ON duration may comprise one, some and/or all monitoring occasions for the DRX ON duration. Alternatively and/or additionally, the UE may wake up for a DRX ON duration or go to sleep for the DRX ON duration based on an indication and/or a configuration from the base station (e.g., the UE may wake up for the DRX ON duration if the indication and/or the configuration indicate to the UE to wake up for the DRX ON duration and/or the UE may go to sleep for the DRX ON duration if the indication and/or the configuration indicate to the UE to go to sleep for the DRX ON duration). Alternatively and/or additionally, the UE may wake up for a DRX ON duration or go to sleep for the DRX ON duration based on an indication and/or a configuration from the base station if the UE skips monitoring of a power saving signal in one or more monitoring occasions for the DRX ON duration. Alternatively and/or additionally, the UE may wake up for a DRX ON duration or go to sleep for the DRX ON duration based on a last power saving signal (e.g., a previously and/or most recently received power saving signal) if the UE skips monitoring of a power saving signal in one or more monitoring occasions for the DRX ON duration (e.g., the UE may wake up for the DRX ON duration if the last power saving signal indicates to the UE to wake up and/or the UE may go to sleep for the DRX ON duration if the last power saving signal indicates to the UE to go to sleep). Alternatively and/or additionally, the UE does not wake up for a DRX ON duration or does not go to sleep for the DRX ON duration if above condition is not fulfilled (e.g., the UE may not wake up for a DRX ON duration or may not go to sleep for the DRX ON duration if the UE does not skip monitoring of a power saving signal in one or more monitoring occasions for the DRX ON duration and/or the power saving signal instructs (and/or indicates to) the UE not to wake up or not to go to sleep). In some embodiments, the power saving signal carries (and/or comprises) an indication to inform the UE to wake up (or not to wake up). The DRX ON duration may be associated with the one or more monitoring occasions. The UE may behave as if the UE detects and/or receives a power saving signal indicating to (and/or instructing) the UE to wake up. For example, the UE may perform one or more operations (e.g., wake up) and/or apply one or more configurations that the UE is configured to perform and/or apply responsive to receiving a power saving signal indicating to (and/or instructing) the UE to wake up.

In some embodiments, the UE disables cross-slot scheduling if the UE skips monitoring of a first power saving signal in one or more monitoring occasions associated with the first power saving signal (e.g., the UE may disable cross-slot scheduling responsive to the UE skipping monitoring and/or determining to skip monitoring of the first power saving signal in the one or more monitoring occasions). Alternatively and/or additionally, the UE enables cross-slot scheduling if above condition is not fulfilled (e.g., the UE may enable cross-slot scheduling if the UE does not skip monitoring of a power saving signal in one or more monitoring occasions for the DRX ON duration and/or the power saving signal instructs (and/or indicates to) the UE to enable cross-slot scheduling). In some embodiments, the first power saving signal carries (and/or comprises) an indication related to cross-slot scheduling. In some embodiments, the UE behaves as if the UE detects and/or receives a power saving signal indicating to (and/or instructing) the UE to disable cross-slot scheduling. In an example, responsive to the UE skipping monitoring and/or determining to skip monitoring of the first power saving signal in the one or more monitoring occasions, the UE may perform one or more operations (e.g., disable cross-slot scheduling) and/or apply one or more configurations that the UE is configured to perform and/or apply responsive to receiving a power saving signal indicating to (and/or instructing) the UE to disable cross-slot scheduling. The UE may disable cross-slot scheduling by setting a minimum applicable value for a scheduling delay to 0. Alternatively and/or additionally, the UE may disable cross-slot scheduling by setting a minimum applicable value for a scheduling delay to a lowest value (e.g., a lowest value of one or more values with which the UE is configured to set the minimum applicable value for the scheduling delay). Alternatively and/or additionally, the UE may disable cross-slot scheduling by setting a minimum applicable value for a scheduling delay to a shortest delay in a time domain resource allocation table (e.g., the scheduling delay may be set to a shortest delay of one or more delays provided in a time domain resource allocation table with which the UE is configured).

In some embodiments, the UE applies a first minimum applicable value for a scheduling delay if the UE skips monitoring of a first power saving signal in one or more monitoring occasions associated with the first power saving signal (e.g., the UE may apply the first minimum applicable value for the scheduling delay responsive to the UE skipping monitoring and/or determining to skip monitoring of the first power saving signal in the one or more monitoring occasions). Alternatively and/or additionally, the UE applies a second minimum applicable value for a scheduling delay if above condition is not fulfilled (e.g., the UE may apply the second minimum applicable value for the scheduling delay if the UE does not skip monitoring of a power saving signal in one or more monitoring occasions for the DRX ON duration and/or the power saving signal instructs (and/or indicates to) the UE to apply the second minimum applicable value for a scheduling delay). The first power saving signal may carry (and/or comprise) an indication related to a minimum applicable value for a scheduling delay. In some embodiments, the UE behaves as if the UE detects and/or receives a power saving signal indicating to (and/or instructing) the UE to use the first minimum applicable value for a scheduling delay. In an example, responsive to the UE skipping monitoring and/or determining to skip monitoring of the first power saving signal in the one or more monitoring occasions, the UE may perform one or more operations and/or apply one or more configurations (e.g., the first minimum applicable value for the scheduling delay) that the UE is configured to perform and/or apply responsive to receiving a power saving signal indicating to (and/or instructing) the UE to use the first minimum applicable value for a scheduling delay.

In some embodiments, the first minimum applicable value corresponds to a minimum applicable value associated with all zeros in a corresponding field of DCI of a power saving signal (e.g., the first minimum applicable value may correspond to a minimum applicable value that is indicated by a corresponding field of DCI, of a power saving signal, that comprises "000"). For example, the corresponding field of DCI of a power saving signal may be used to determine a minimum applicable value and/or the first minimum applicable value may correspond to a determination and/or derivation of a minimum applicable value using the corresponding field comprising all zeros (and/or other values). In some embodiments, the first minimum applicable value is 0. Alternatively and/or additionally, the first minimum applicable value may be a lowest minimum applicable value of one or more configured minimum applicable values (e.g., one or more minimum applicable values for scheduling delay with which the UE is configured). Alternatively and/or additionally, the first minimum applicable value may be a configured minimum applicable value (e.g., the UE may be configured with the first minimum applicable value). Alternatively and/or additionally, the first minimum applicable value is determined based on a time domain resource allocation table (e.g., the UE may be configured with the time domain resource allocation table and/or may use one or more values of the time domain resources allocation table to determine the first minimum applicable value, such as by determining one or more minimum applicable values and/or selecting a minimum applicable value from the one or more minimum applicable values as the first minimum applicable value). In some embodiments, the first minimum applicable value is a fixed value. Alternatively and/or additionally, the first minimum applicable value may be a default value (e.g., a default minimum applicable value that is used by the UE when the UE does not detect and/or receive a power saving signal indicative of a minimum applicable value). Alternatively and/or additionally, the first minimum applicable value may be a minimum applicable value which is used when a power saving signal does not indicate a minimum applicable value (e.g., the UE may be configured with the first minimum applicable value that is used when the UE receives a power saving signal that is not indicative of a minimum applicable value and/or that does not comprise a field of DCI with a minimum applicable value). Alternatively and/or additionally, the first minimum applicable value may be a minimum applicable value indicated by a last power saving signal (e.g., a previously and/or most recently received power saving signal prior to transmission of the first power saving signal). For example, responsive to receiving the last power saving signal, the UE may store a minimum applicable value indicated by the last power saving signal. The UE may use the minimum applicable value indicated by the last power saving signal if the UE skips monitoring of the first power saving signal in the one or more monitoring occasions associated with the first power saving signal.

In some embodiments, the UE applies a first PDCCH monitoring pattern (e.g., the UE may perform PDCCH monitoring in accordance with the first PDCCH monitoring pattern) if the UE skips monitoring of a first power saving signal in one or more monitoring occasions associated with the first power saving signal (e.g., the UE may apply the first PDCCH monitoring pattern responsive to the UE skipping monitoring and/or determining to skip monitoring of the first power saving signal in the one or more monitoring occasions). Alternatively and/or additionally, the UE applies a second PDCCH monitoring pattern if above condition is not fulfilled (e.g., the UE may apply the second PDCCH monitoring pattern if the UE does not skip monitoring of a power saving signal in one or more monitoring occasions for the DRX ON duration and/or the power saving signal instructs (and/or indicates to) the UE to apply the second PDCCH monitoring pattern). The first power saving signal may carry (and/or comprise) an indication related to a PDCCH monitoring pattern. The UE may behave as if the UE detects and/or receives a power saving signal indicating to (and/or instructing) the UE to use the first PDCCH monitoring pattern. In an example, responsive to the UE skipping monitoring and/or determining to skip monitoring of the first power saving signal in the one or more monitoring occasions, the UE may perform one or more operations and/or apply one or more configurations (e.g., the UE may perform PDCCH monitoring in accordance with the first PDCCH monitoring pattern) that the UE is configured to perform and/or apply responsive to receiving a power saving signal indicating to (and/or instructing) the UE to use the first PDCCH monitoring pattern.

In some embodiments, the first PDCCH monitoring pattern corresponds to a PDCCH monitoring pattern associated with all zeros in a corresponding field of DCI of a power saving signal (e.g., the first PDCCH monitoring pattern may correspond to a PDCCH monitoring pattern that is indicated by a corresponding field of DCI, of a power saving signal, that comprises "000"). For example, the corresponding field of DCI of a power saving signal may be used to determine a PDCCH monitoring pattern and/or the first PDCCH monitoring pattern may correspond to a determination and/or derivation of a PDCCH monitoring pattern using the corresponding field comprising all zeros (and/or other values). In some embodiments, the first PDCCH monitoring pattern is a configured PDCCH monitoring pattern (e.g., the UE may be configured with the first PDCCH monitoring pattern). Alternatively and/or additionally, the first PDCCH monitoring pattern may be a most dense PDCCH monitoring pattern (e.g., the first PDCCH monitoring pattern may be a most dense PDCCH monitoring pattern of one or more PDCCH monitoring patterns with which the UE is configured). Alternatively and/or additionally, the first PDCCH monitoring pattern may be a PDCCH monitoring pattern with a highest quantity of PDCCH monitoring occasions within a (time) period (e.g., the first PDCCH monitoring pattern may have a highest quantity of PDCCH monitoring occasions within the (time) period among one or more PDCCH monitoring patterns with which the UE is configured). Alternatively and/or additionally, the first PDCCH monitoring pattern may be a PDCCH monitoring pattern with a highest frequency and/or a highest rate of PDCCH monitoring occasions (e.g., the first PDCCH monitoring pattern may have a highest frequency and/or a highest rate of PDCCH monitoring occasions among one or more PDCCH monitoring patterns with which the UE is configured). Alternatively and/or additionally, the first PDCCH monitoring pattern may be a default PDCCH monitoring pattern (e.g., a default PDCCH monitoring pattern that is used by the UE, such as for performing PDCCH monitoring, when the UE does not detect and/or receive a power saving signal indicative of a PDCCH monitoring pattern other than the default PDCCH monitoring pattern). Alternatively and/or additionally, the first PDCCH monitoring pattern may be a PDCCH monitoring pattern which is used when a power saving signal does not indicate a PDCCH monitoring pattern (e.g., the UE may be configured with the first PDCCH monitoring pattern that is used, such as for performing PDCCH monitoring, when the UE receives a power saving signal that is not indicative of a PDCCH monitoring pattern and/or that does not comprise a field of DCI with a PDCCH monitoring pattern). Alternatively and/or additionally, the first PDCCH monitoring pattern may be a PDCCH monitoring pattern indicated by a last power saving signal (e.g., a previously and/or most recently received power saving signal prior to transmission of the first power saving signal). For example, responsive to receiving the last power saving signal, the UE may store an indication of a PDCCH monitoring pattern indicated by the last power saving signal. The UE may use, such as for performing PDCCH monitoring, the PDCCH monitoring pattern indicated by the last power saving signal if the UE skips monitoring of the first power saving signal in the one or more monitoring occasions associated with the first power saving signal.

In some embodiments, the UE applies a first PDCCH monitoring periodicity (e.g., the UE may perform PDCCH monitoring in accordance with the first PDCCH monitoring periodicity) if the UE skips monitoring of a first power saving signal in one or more monitoring occasions associated with the first power saving signal (e.g., the UE may apply the first PDCCH monitoring periodicity responsive to the UE skipping monitoring and/or determining to skip monitoring of the first power saving signal in the one or more monitoring occasions). Alternatively and/or additionally, the UE applies a second PDCCH monitoring periodicity if above condition is not fulfilled (e.g., the UE may apply the second PDCCH monitoring periodicity if the UE does not skip monitoring of a power saving signal in one or more monitoring occasions for the DRX ON duration and/or the power saving signal instructs (and/or indicates to) the UE to apply the second PDCCH monitoring periodicity). The first power saving signal may carry (and/or comprise) an indication related to a PDCCH monitoring periodicity. The UE may behave as if the UE detects and/or receives a power saving signal indicating to (and/or instructing) the UE to use the first PDCCH monitoring periodicity. In an example, responsive to the UE skipping monitoring and/or determining to skip monitoring of the first power saving signal in the one or more monitoring occasions, the UE may perform one or more operations and/or apply one or more configurations (e.g., the UE may perform PDCCH monitoring in accordance with the first PDCCH monitoring periodicity) that the UE is configured to perform and/or apply responsive to receiving a power saving signal indicating to (and/or instructing) the UE to use the first PDCCH monitoring periodicity.

In some embodiments, the first PDCCH monitoring periodicity corresponds to a PDCCH monitoring periodicity associated with all zeros in a corresponding field of DCI of a power saving signal (e.g., the first PDCCH monitoring periodicity may correspond to a PDCCH monitoring periodicity that is indicated by a corresponding field of DCI, of a power saving signal, that comprises "000"). For example, the corresponding field of DCI of a power saving signal may be used to determine a PDCCH monitoring periodicity and/or the first PDCCH monitoring periodicity may correspond to a determination and/or derivation of a PDCCH monitoring periodicity using the corresponding field comprising all zeros (and/or other values). In some embodiments, the first PDCCH monitoring periodicity is a configured PDCCH monitoring periodicity (e.g., the UE may be configured with the first PDCCH monitoring periodicity). Alternatively and/or additionally, the first PDCCH monitoring periodicity may be a shortest PDCCH monitoring periodicity (e.g., the first PDCCH monitoring periodicity may be a shortest PDCCH monitoring periodicity of one or more PDCCH monitoring periodicities with which the UE is configured). Alternatively and/or additionally, the first PDCCH monitoring periodicity may be a default PDCCH monitoring periodicity (e.g., a default PDCCH monitoring periodicity that is used by the UE, such as for performing PDCCH monitoring, when the UE does not detect and/or receive a power saving signal indicative of a PDCCH monitoring periodicity other than the default PDCCH monitoring periodicity). Alternatively and/or additionally, the first PDCCH monitoring periodicity may be a PDCCH monitoring periodicity which is used when a power saving signal does not indicate a PDCCH monitoring periodicity (e.g., the UE may be configured with the first PDCCH monitoring periodicity that is used, such as for performing PDCCH monitoring, when the UE receives a power saving signal that is not indicative of a PDCCH monitoring periodicity and/or that does not comprise a field of DCI with a PDCCH monitoring periodicity). Alternatively and/or additionally, the first PDCCH monitoring periodicity may be a PDCCH monitoring periodicity indicated by a last power saving signal (e.g., a previously and/or most recently received power saving signal prior to transmission of the first power saving signal). For example, responsive to receiving the last power saving signal, the UE may store an indication of a PDCCH monitoring periodicity indicated by the last power saving signal. The UE may use, such as for performing PDCCH monitoring, the PDCCH monitoring periodicity indicated by the last power saving signal if the UE skips monitoring of the first power saving signal in the one or more monitoring occasions associated with the first power saving signal.

In some embodiments, the UE disables PDCCH monitoring skipping if the UE skips monitoring of a power saving signal in one or more monitoring occasions associated with the power saving signal. Alternatively and/or additionally, the UE enables PDCCH monitoring skipping if above condition is not fulfilled (e.g., the UE may enable PDCCH monitoring skipping if the UE does not skip monitoring of a power saving signal in one or more monitoring occasions for the DRX ON duration and/or the power saving signal instructs (and/or indicates to) the UE to enable PDCCH monitoring skipping). Alternatively and/or additionally, the UE may apply a first PDCCH monitoring skipping configuration if the UE skips monitoring of a first power saving signal in one or more monitoring occasions associated with the first power saving signal (e.g., the UE may apply the first PDCCH monitoring skipping configuration responsive to the UE skipping monitoring and/or determining to skip monitoring of the first power saving signal in the one or more monitoring occasions). The first power saving signal may carry (and/or comprise) an indication related to PDCCH monitoring skipping. The UE may behave as if the UE detects and/or receives a power saving signal indicating to (and/or instructing) the UE to use the first PDCCH monitoring skipping configuration. In an example, responsive to the UE skipping monitoring and/or determining to skip monitoring of the first power saving signal in the one or more monitoring occasions, the UE may perform one or more operations and/or apply one or more configurations (e.g., the UE may skip PDCCH monitoring in one or more monitoring occasions in accordance with the first PDCCH monitoring skipping configuration) that the UE is configured to perform and/or apply responsive to receiving a power saving signal indicating to (and/or instructing) the UE to use the first PDCCH monitoring skipping configuration.

In some embodiments, the first PDCCH monitoring skipping configuration is associated with a first pattern to skip one or more configured PDCCH monitoring occasions (e.g., one or more PDCCH monitoring occasions in Active Time). For example, the UE may determine, based on the first PDCCH monitoring skipping configuration, one or more configured PDCCH monitoring occasions in which the UE skips monitoring PDCCH. In some embodiments, the first PDCCH monitoring skipping configuration corresponds to a PDCCH monitoring skipping configuration associated with all zeros in a corresponding field of DCI of a power saving signal (e.g., the first PDCCH monitoring skipping configuration may correspond to a PDCCH monitoring skipping configuration that is indicated by a corresponding field of DCI, of a power saving signal, that comprises "000"). For example, the corresponding field of DCI of a power saving signal may be used to determine a PDCCH monitoring skipping configuration and/or the first PDCCH monitoring skipping configuration may correspond to a determination and/or derivation of a PDCCH monitoring skipping configuration using the corresponding field comprising all zeros (and/or other values). In some embodiments, the first PDCCH monitoring skipping configuration is a configured PDCCH monitoring skipping configuration (e.g., the UE may be configured with the first PDCCH monitoring skipping configuration). Alternatively and/or additionally, the first PDCCH monitoring skipping configuration is associated a skipping pattern with a lowest amount of skipping (e.g., the first PDCCH monitoring skipping configuration may be associated with a lowest amount of PDCCH monitoring occasions for the UE to skip among one or more PDCCH monitoring skipping configurations with which the UE is configured). Alternatively and/or additionally, the first PDCCH monitoring skipping configuration may be a default PDCCH monitoring skipping configuration (e.g., a default PDCCH monitoring skipping configuration that is used by the UE, such as for determining one or more PDCCH monitoring occasions in which to skip PDCCH monitoring, when the UE does not detect and/or receive a power saving signal indicative of a PDCCH monitoring skipping configuration other than the default PDCCH monitoring skipping configuration). Alternatively and/or additionally, the first PDCCH monitoring skipping configuration may be a PDCCH monitoring skipping configuration which is used when a power saving signal does not indicate a PDCCH monitoring skipping configuration (e.g., the UE may be configured with the first PDCCH monitoring skipping configuration that is used, such as for determining one or more PDCCH monitoring occasions in which to skip PDCCH monitoring, when the UE receives a power saving signal that is not indicative of a PDCCH monitoring skipping configuration and/or that does not comprise a field of DCI with a PDCCH monitoring skipping configuration). Alternatively and/or additionally, the first PDCCH monitoring skipping configuration may be a PDCCH monitoring skipping configuration indicated by a last power saving signal (e.g., a previously and/or most recently received power saving signal prior to transmission of the first power saving signal). For example, responsive to receiving the last power saving signal, the UE may store an indication of a PDCCH monitoring skipping configuration indicated by the last power saving signal. The UE may use, such as for determining one or more PDCCH monitoring occasions in which to skip PDCCH monitoring, the PDCCH monitoring skipping configuration indicated by the last power saving signal if the UE skips monitoring of the first power saving signal in the one or more monitoring occasions associated with the first power saving signal.

In some embodiments, the UE applies a first MIMO layer configuration and/or a first antenna configuration if the UE skips monitoring of a first power saving signal in one or more monitoring occasions associated with the first power saving signal. Alternatively and/or additionally, the UE applies a second MIMO layer configuration and/or a second antenna configuration if above condition is not fulfilled (e.g., the UE may apply the second MIMO layer configuration and/or the second antenna configuration if the UE does not skip monitoring of a power saving signal in one or more monitoring occasions for the DRX ON duration and/or the power saving signal instructs (and/or indicates to) the UE to apply the second MIMO layer configuration and/or the second antenna configuration). In some embodiments, the first MIMO layer configuration corresponds to at least one of one or more MIMO layers, a quantity of MIMO layers, etc. In some embodiments, the first antenna configuration corresponds to at least one of one or more antennas, a quantity of antennas, etc. The first power saving signal may carry (and/or comprise) an indication related to a MIMO layer configuration and/or an antenna configuration (e.g., the first power saving signal may be indicative of at least one of one or more MIMO layers, a quantity of MIMO layers, one or more antennas, a quantity of antennas, etc.). The UE may behave as if the UE detects and/or receives a power saving signal indicating to (and/or instructing) the UE to use the first MIMO layer configuration and/or the first antenna configuration. In an example, responsive to the UE skipping monitoring and/or determining to skip monitoring of the first power saving signal in the one or more monitoring occasions, the UE may perform one or more operations and/or apply one or more configurations (e.g., the UE may apply the first MIMO layer configuration and/or the first antenna configuration) that the UE is configured to perform and/or apply responsive to receiving a power saving signal indicating to (and/or instructing) the UE to use the first MIMO layer configuration and/or the first antenna configuration.

In some embodiments, the first MIMO layer configuration and/or the first antenna configuration correspond to a MIMO layer configuration and/or an antenna configuration associated with all zeros in a corresponding field of DCI of a power saving signal (e.g., the first MIMO layer configuration and/or the first antenna configuration may correspond to a MIMO layer configuration and/or an antenna configuration indicated by a corresponding field of DCI, of a power saving signal, that comprises "000"). For example, the corresponding field of DCI of a power saving signal may be used to determine a MIMO layer configuration and/or the first MIMO layer configuration may correspond to a determination and/or derivation of a MIMO layer configuration using the corresponding field comprising all zeros (and/or other values). Alternatively and/or additionally, the corresponding field of DCI of a power saving signal may be used to determine an antenna configuration and/or the first antenna configuration may correspond to a determination and/or derivation of an antenna configuration using the corresponding field comprising all zeros (and/or other values). In some embodiments, the first MIMO layer configuration may be a configured MIMO layer configuration and/or the first antenna configuration may be a configured antenna configuration (e.g., the UE may be configured with the first MIMO layer configuration and/or the first antenna configuration). Alternatively and/or additionally, the first MIMO layer configuration may be associated with a highest quantity of MIMO layers (e.g., the first MIMO layer configuration may be associated with a highest quantity of MIMO layers among one or more MIMO layer configurations with which the UE is configured). Alternatively and/or additionally, the first antenna configuration may be associated with a highest quantity of antennas (e.g., the first antenna configuration may be associated with a highest quantity of antennas among one or more antenna configurations with which the UE is configured). Alternatively and/or additionally, the first MIMO layer configuration may be 4 layers or 8 layers. Alternatively and/or additionally, the first antenna configuration may be 4Tx or 8Tx. Alternatively and/or additionally, the first MIMO layer configuration may be a default MIMO layer configuration (e.g., a default MIMO layer configuration that is used by the UE, such as for determining one or more MIMO layers and/or a quantity of MIMO layers, when the UE does not detect and/or receive a power saving signal indicative of a MIMO layer configuration other than the default MIMO layer configuration). Alternatively and/or additionally, the first antenna configuration may be a default antenna configuration (e.g., a default antenna configuration that is used by the UE, such as for determining one or more antennas and/or a quantity of antennas, when the UE does not detect and/or receive a power saving signal indicative of an antenna configuration other than the default antenna configuration). Alternatively and/or additionally, the first MIMO layer configuration may be a MIMO layer configuration which is used when a power saving signal does not indicate a MIMO layer configuration (e.g., the UE may be configured with the first MIMO layer configuration that is used, such as for determining one or more MIMO layers and/or a quantity of MIMO layers, when the UE receives a power saving signal that is not indicative of a MIMO layer configuration and/or that does not comprise a field of DCI with a MIMO layer configuration). Alternatively and/or additionally, the first antenna configuration may be an antenna configuration which is used when a power saving signal does not indicate an antenna configuration (e.g., the UE may be configured with the first antenna configuration that is used, such as for determining one or more antennas and/or a quantity of antennas, when the UE receives a power saving signal that is not indicative of an antenna configuration and/or that does not comprise a field of DCI with an antenna configuration). Alternatively and/or additionally, the first MIMO layer configuration may be a MIMO layer configuration indicated by a last power saving signal (e.g., a previously and/or most recently received power saving signal prior to transmission of the first power saving signal). For example, responsive to receiving the last power saving signal, the UE may store an indication of a MIMO layer configuration indicated by the last power saving signal. The UE may use, such as for determining one or more MIMO layers and/or a quantity of MIMO layers, the MIMO layer configuration indicated by the last power saving signal if the UE skips monitoring of the first power saving signal in the one or more monitoring occasions associated with the first power saving signal. Alternatively and/or additionally, the first antenna configuration may be an antenna configuration indicated by a last power saving signal (e.g., a previously and/or most recently received power saving signal prior to transmission of the first power saving signal). For example, responsive to receiving the last power saving signal, the UE may store an indication of an antenna configuration indicated by the last power saving signal. The UE may use, such as for determining one or more antennas and/or a quantity of antennas, the antenna configuration indicated by the last power saving signal if the UE skips monitoring of the first power saving signal in the one or more monitoring occasions associated with the first power saving signal.

In some embodiments, the UE applies one or more power saving techniques, one or more operations and/or one or more configurations based on a first assumption if the UE skips monitoring of a first power saving signal in one or more monitoring occasions associated with the first power saving signal. Alternatively and/or additionally, the UE applies one or more power saving techniques, one or more operations and/or one or more configurations based on a second assumption if above condition is not fulfilled (e.g., the UE may apply the one or more power saving techniques, the one or more operations and/or the one or more configurations based on the second assumption if the UE does not skip monitoring of the first power saving signal in one or more monitoring occasions associated with the first power saving signal and/or the first power saving signal instructs (and/or indicates to) the UE to apply the second assumption). The first power saving signal may carry (and/or comprise) an indication related to the one or more power saving techniques, the one or more operations and/or the one or more configurations. The UE may behave as if the UE detects and/or receives a power saving signal indicating to (and/or instructing) the UE to use the first assumption (and/or the one or more power saving techniques, the one or more operations and/or the one or more configurations). In an example, responsive to the UE skipping monitoring and/or determining to skip monitoring of the first power saving signal in the one or more monitoring occasions, the UE may perform the one or more operations and/or apply the one or more power saving techniques and/or the one or more configurations that the UE is configured to perform and/or apply responsive to receiving a power saving signal indicating to (and/or instructing) the UE to use the first assumption.

In some embodiments, the first assumption corresponds to an assumption associated with all zeros in a corresponding field of DCI of a power saving signal (e.g., the first assumption may correspond to information associated with the one or more power saving techniques, the one or more operations and/or the one or more configurations indicated by a corresponding field of DCI, of a power saving signal, that comprises "000"). For example, the corresponding field of DCI of a power saving signal may be used to determine information associated with at least one of a power saving technique, an operation, a configuration, etc. The first assumption (e.g., the one or more power saving techniques, the one or more operations and/or the one or more configurations) may correspond to a determination and/or derivation of at least one of a power saving technique, an operation, a configuration, etc. using the corresponding field comprising all zeros (and/or other values). In some embodiments, the first assumption is a configured assumption (e.g., the UE may be configured with the one or more power saving techniques, the one or more operations and/or the one or more configurations associated with the first assumption). Alternatively and/or additionally, the first assumption may be a default assumption (e.g., a default assumption that is used by the UE, such as for applying and/or determining the one or more power saving techniques, the one or more operations and/or the one or more configurations, when the UE does not detect and/or receive information related to the one or more power saving techniques). Alternatively and/or additionally, the first assumption may be an assumption which is used when a power saving signal does not carry and/or comprise information for the one or more power saving techniques (e.g., the UE may be configured with the one or more power saving techniques that are used when the UE receives a power saving signal that is not indicative of information associated with the one or more power saving techniques and/or that does not comprise a field of DCI with information associated with the one or more power saving techniques). In some embodiments, the first assumption is an assumption which consumes the most power (e.g., the first assumption may be indicative of one or more power saving techniques, one or more operations and/or one or more configurations associated with a most amount of power consumption among power saving techniques, operations, and/or configurations with which the UE is configured). Alternatively and/or additionally, the first assumption is an assumption without power saving (e.g., the first assumption may not be associated with one or more power saving techniques and/or the first assumption may be associated with one or more operations that are not associated with a power saving technique). The first assumption corresponds to information (e.g., one or more power saving techniques, one or more operations and/or one or more configurations) indicated by a last power saving signal (e.g., a previously and/or most recently received power saving signal prior to transmission of the first power saving signal). For example, responsive to receiving the last power saving signal, the UE may store information (e.g., one or more power saving techniques, one or more operations and/or one or more configurations) indicated by the last power saving signal. The UE may use, such as for determining one or more power saving techniques, one or more operations and/or one or more configurations, the information indicated by the last power saving signal if the UE skips monitoring of the first power saving signal in the one or more monitoring occasions associated with the first power saving signal.

In a second embodiment, a base station transmits an indication for a UE to monitor a power saving signal. For example, the base station may transmit the indication to the UE and/or indicate to (and/or instruct) the UE to monitor the power saving signal. In some embodiments, the base station determines whether to transmit the power saving signal (to the UE) in a slot based on whether the slot is within Active Time (e.g., Active Time associated with the UE). Alternatively and/or additionally, the base station may determine whether to apply power saving related information indicated in a slot (e.g., power saving related information indicated in the power saving signal associated with the slot) based on whether the slot is within Active Time. In some embodiments, the base station may transmit the power saving signal (to the UE) in the slot if the slot is not within Active Time. Alternatively and/or additionally, the base station may not transmit the power saving signal (to the UE) in the slot if the slot is within Active Time. In some embodiments, the base station does not apply power saving related information indicated in a slot (e.g., power saving related information indicated in the power saving signal associated with the slot) if the slot is within Active Time. For example, responsive to a determination that the slot is within Active Time, the base station may not perform one or more operations and/or may not apply one or more power saving techniques and/or one or more configurations in accordance with power saving related information indicated in the slot (and/or in the power saving signal). Alternatively and/or additionally, the base station may apply power saving related information indicated in a slot (e.g., power saving related information indicated in the power saving signal associated with the slot) if the slot is not within Active Time. For example, responsive to a determination that the slot is not within Active Time, the base station may perform one or more operations and/or may apply one or more power saving techniques and/or one or more configurations in accordance with power saving related information indicated in the slot (and/or in the power saving signal).

In some embodiments, the base station does not transmit the power saving signal in one or more monitoring occasions if at least one monitoring occasion of the one or more monitoring occasions is within Active Time. In some embodiments, the base station does not apply power saving related information indicated in the one or more monitoring occasions (e.g., power saving related information indicated in the power saving signal associated with the one or more monitoring occasions) if at least one monitoring occasion of the one or more monitoring occasions is within Active Time. For example, responsive to a determination that at least one monitoring occasion of the one or more monitoring occasions is within Active Time, the base station may not perform one or more operations and/or may not apply one or more power saving techniques and/or one or more configurations in accordance with power saving related information indicated in the one or more monitoring occasions (and/or in the power saving signal). Alternatively and/or additionally, the base station may not transmit the power saving signal in the one or more monitoring occasions if (all monitoring occasions of) the one or more monitoring occasions are within Active Time. Alternatively and/or additionally, the base station may not apply power saving related information indicated in the one or more monitoring occasions (e.g., power saving related information indicated in the power saving signal associated with the one or more monitoring occasions) if (all monitoring occasions of) the one or more monitoring occasions are within Active Time. For example, responsive to a determination that (all monitoring occasions of) the one or more monitoring occasions are within Active Time, the base station may not perform one or more operations and/or may not apply one or more power saving techniques and/or one or more configurations in accordance with power saving related information indicated in the one or more monitoring occasions (and/or in the power saving signal).

The one or more monitoring occasions may comprise one, some and/or all monitoring occasions within a DRX cycle. The one or more monitoring occasions may comprise one, some and/or all monitoring occasions between two DRX ON durations (e.g., the two DRX ON durations may be two consecutive DRX ON durations). The one or more monitoring occasions may comprise one, some and/or all monitoring occasions before a DRX ON duration (and/or after a preceding DRX ON duration before the DRX ON duration). The one or more monitoring occasions may comprise one, some and/or all monitoring occasions for a power saving signal that indicates information for the DRX ON duration (and/or a different DRX ON duration). The power saving signal may indicate whether the UE should wake up for the DRX ON duration (and/or a different DRX ON duration). The power saving signal may be monitored before the DRX ON duration (and/or a different DRX ON duration). An offset may be indicative of the one or more monitoring occasions of the power saving signal. The offset may be indicative of a time duration between a beginning of a DRX ON duration and the one or more monitoring occasions of the power saving signal.

In some embodiments, the UE behaves as if the UE detects and/or receives a power saving signal for the UE. Alternatively and/or additionally, the UE may behave as if the UE detects and/or receives a power saving signal for the UE when the UE does not monitor a power saving signal in one or more monitoring occasions. Alternatively and/or additionally, the UE may behave as if the UE detects and/or receives a power saving signal for the UE when the UE skips monitoring of a power saving signal in one or more monitoring occasions associated with the power saving signal. Alternatively and/or additionally, the UE may behave as if the UE detects and/or receives a power saving signal indicating one or more values in one or more fields (of the power saving signal). For example, the UE may apply one or more power saving techniques and/or one or more configurations and/or perform one or more operations in accordance with the one or more values. In an example, responsive to the UE skipping monitoring and/or determining to skip monitoring of a power saving signal in the one or more monitoring occasions, the UE may perform one or more operations and/or apply one or more power saving techniques and/or one or more configurations that the UE is configured to perform and/or apply responsive to receiving a power saving signal indicative of the one or more values in the one or more fields. Alternatively and/or additionally, the UE may behave as if the UE detects and/or receives a power saving signal indicating whether one or more first power saving techniques are applied. In an example, responsive to the UE skipping monitoring and/or determining to skip monitoring of a power saving signal in the one or more monitoring occasions, the UE may perform one or more operations and/or apply one or more power saving techniques and/or one or more configurations that the UE is configured to perform and/or apply responsive to receiving a power saving signal indicating whether the one or more first power saving techniques are applied. Alternatively and/or additionally, the UE may behave as if the UE detects and/or receives a power saving signal indicating how one or more second power saving techniques are applied. In an example, responsive to the UE skipping monitoring and/or determining to skip monitoring of a power saving signal in the one or more monitoring occasions, the UE may perform one or more operations and/or apply one or more power saving techniques and/or one or more configurations that the UE is configured to perform and/or apply responsive to receiving a power saving signal indicating how the one or more second power saving techniques are applied. Alternatively and/or additionally, the UE may behave as if the UE detects and/or receives a power saving signal indicating one or more power consumption characteristics. In an example, responsive to the UE skipping monitoring and/or determining to skip monitoring of a power saving signal in the one or more monitoring occasions, the UE may perform one or more operations and/or apply one or more power saving techniques and/or one or more configurations that the UE is configured to perform and/or apply responsive to receiving a power saving signal indicating the one or more power consumption characteristics.

In some embodiments, the UE wakes up for a DRX ON duration if the UE skips monitoring of a power saving signal in one or more monitoring occasions for the DRX ON duration. Alternatively and/or additionally, the one or more monitoring occasions for the DRX ON duration may comprise one, some and/or all monitoring occasions for the DRX ON duration. Alternatively and/or additionally, the UE may wake up for a DRX ON duration or go to sleep for the DRX ON duration based on an indication and/or a configuration from the base station (e.g., the UE may wake up for the DRX ON duration if the indication and/or the configuration indicate to the UE to wake up for the DRX ON duration and/or the UE may go to sleep for the DRX ON duration if the indication and/or the configuration indicate to the UE to go to sleep for the DRX ON duration). Alternatively and/or additionally, the UE may wake up for a DRX ON duration or go to sleep for the DRX ON duration based on an indication and/or a configuration from the base station if the UE skips monitoring of a power saving signal in one or more monitoring occasions for the DRX ON duration. Alternatively and/or additionally, the UE may wake up for a DRX ON duration or go to sleep for the DRX ON duration based on a last power saving signal (e.g., a previously and/or most recently received power saving signal) if the UE skips monitoring of a power saving signal in one or more monitoring occasions for the DRX ON duration (e.g., the UE may wake up for the DRX ON duration if the last power saving signal indicates to the UE to wake up and/or the UE may go to sleep for the DRX ON duration if the last power saving signal indicates to the UE to go to sleep). In some embodiments, the power saving signal carries (and/or comprises) an indication to inform the UE to wake up (or not to wake up). The DRX ON duration may be associated with the one or more monitoring occasions. The UE may behave as if the UE detects and/or receives a power saving signal indicating to (and/or instructing) the UE to wake up. For example, the UE may perform one or more operations (e.g., wake up) and/or apply one or more configurations that the UE is configured to perform and/or apply responsive to receiving a power saving signal indicating to (and/or instructing) the UE to wake up.

In some embodiments, the UE disables cross-slot scheduling if the UE skips monitoring of a first power saving signal in one or more monitoring occasions associated with the first power saving signal (e.g., the UE may disable cross-slot scheduling responsive to the UE skipping monitoring and/or determining to skip monitoring of the first power saving signal in the one or more monitoring occasions). In some embodiments, the first power saving signal carries (and/or comprises) an indication related to cross-slot scheduling. In some embodiments, the UE behaves as if the UE detects and/or receives a power saving signal indicating to (and/or instructing) the UE to disable cross-slot scheduling. In an example, responsive to the UE skipping monitoring and/or determining to skip monitoring of the first power saving signal in the one or more monitoring occasions, the UE may perform one or more operations (e.g., disable cross-slot scheduling) and/or apply one or more configurations that the UE is configured to perform and/or apply responsive to receiving a power saving signal indicating to (and/or instructing) the UE to disable cross-slot scheduling.

In some embodiments, the UE applies a first minimum applicable value for a scheduling delay if the UE skips monitoring of a first power saving signal in one or more monitoring occasions associated with the first power saving signal (e.g., the UE may apply the first minimum applicable value for the scheduling delay responsive to the UE skipping monitoring and/or determining to skip monitoring of the first power saving signal in the one or more monitoring occasions). The first power saving signal may carry (and/or comprise) an indication related to a minimum applicable value for a scheduling delay. In some embodiments, the UE behaves as if the UE detects and/or receives a power saving signal indicating to (and/or instructing) the UE to use the first minimum applicable value for a scheduling delay.

In some embodiments, the first minimum applicable value corresponds to a minimum applicable value associated with all zeros in a corresponding field of DCI of a power saving signal (e.g., the first minimum applicable value may correspond to a minimum applicable value that is indicated by a corresponding field of DCI, of a power saving signal, that comprises "000"). For example, the corresponding field of DCI of a power saving signal may be used to determine a minimum applicable value and/or the first minimum applicable value may correspond to a determination and/or derivation of a minimum applicable value using the corresponding field comprising all zeros (and/or other values). In some embodiments, the first minimum applicable value is 0. Alternatively and/or additionally, the first minimum applicable value may be a lowest minimum applicable value of one or more configured minimum applicable values (e.g., one or more minimum applicable values for scheduling delay with which the UE is configured). Alternatively and/or additionally, the first minimum applicable value may be a configured minimum applicable value (e.g., the UE may be configured with the first minimum applicable value).

In some embodiments, the UE applies a first PDCCH monitoring pattern (e.g., the UE may perform PDCCH monitoring in accordance with the first PDCCH monitoring pattern) if the UE skips monitoring of a first power saving signal in one or more monitoring occasions associated with the first power saving signal (e.g., the UE may apply the first PDCCH monitoring pattern responsive to the UE skipping monitoring and/or determining to skip monitoring of the first power saving signal in the one or more monitoring occasions). The first power saving signal may carry (and/or comprise) an indication related to a PDCCH monitoring pattern. The UE may behave as if the UE detects and/or receives a power saving signal indicating to (and/or instructing) the UE to use the first PDCCH monitoring pattern.

In some embodiments, the first PDCCH monitoring pattern corresponds to a PDCCH monitoring pattern associated with all zeros in a corresponding field of DCI of a power saving signal (e.g., the first PDCCH monitoring pattern may correspond to a PDCCH monitoring pattern that is indicated by a corresponding field of DCI, of a power saving signal, that comprises "000"). For example, the corresponding field of DCI of a power saving signal may be used to determine a PDCCH monitoring pattern and/or the first PDCCH monitoring pattern may correspond to a determination and/or derivation of a PDCCH monitoring pattern using the corresponding field comprising all zeros (and/or other values). In some embodiments, the first PDCCH monitoring pattern is a configured PDCCH monitoring pattern (e.g., the UE may be configured with the first PDCCH monitoring pattern). Alternatively and/or additionally, the first PDCCH monitoring pattern may be a most dense PDCCH monitoring pattern (e.g., the first PDCCH monitoring pattern may be a most dense PDCCH monitoring pattern of one or more PDCCH monitoring patterns with which the UE is configured).

In some embodiments, the UE applies a first PDCCH monitoring periodicity (e.g., the UE may perform PDCCH monitoring in accordance with the first PDCCH monitoring periodicity) if the UE skips monitoring of a first power saving signal in one or more monitoring occasions associated with the first power saving signal (e.g., the UE may apply the first PDCCH monitoring periodicity responsive to the UE skipping monitoring and/or determining to skip monitoring of the first power saving signal in the one or more monitoring occasions). The first power saving signal may carry (and/or comprise) an indication related to a PDCCH monitoring periodicity.

In some embodiments, the first PDCCH monitoring periodicity corresponds to a PDCCH monitoring periodicity associated with all zeros in a corresponding field of DCI of a power saving signal (e.g., the first PDCCH monitoring periodicity may correspond to a PDCCH monitoring periodicity that is indicated by a corresponding field of DCI, of a power saving signal, that comprises "000"). For example, the corresponding field of DCI of a power saving signal may be used to determine a PDCCH monitoring periodicity and/or the first PDCCH monitoring periodicity may correspond to a determination and/or derivation of a PDCCH monitoring periodicity using the corresponding field comprising all zeros (and/or other values). In some embodiments, the first PDCCH monitoring periodicity is a configured PDCCH monitoring periodicity (e.g., the UE may be configured with the first PDCCH monitoring periodicity).

In some embodiments, the UE disables PDCCH monitoring skipping if the UE skips monitoring of a power saving signal in one or more monitoring occasions associated with the power saving signal. Alternatively and/or additionally, the UE may apply a first PDCCH monitoring skipping configuration if the UE skips monitoring of a first power saving signal in one or more monitoring occasions associated with the first power saving signal (e.g., the UE may apply the first PDCCH monitoring skipping configuration responsive to the UE skipping monitoring and/or determining to skip monitoring of the first power saving signal in the one or more monitoring occasions).

In some embodiments, the first PDCCH monitoring skipping configuration is associated with a first pattern to skip one or more configured PDCCH monitoring occasions (e.g., one or more PDCCH monitoring occasions in Active Time). For example, the UE may determine, based on the first PDCCH monitoring skipping configuration, one or more configured PDCCH monitoring occasions in which the UE skips monitoring PDCCH.

In some embodiments, the UE applies a first MIMO layer configuration and/or a first antenna configuration if the UE skips monitoring of a first power saving signal in one or more monitoring occasions associated with the first power saving signal. In some embodiments, the first MIMO layer configuration corresponds to at least one of one or more MIMO layers, a quantity of MIMO layers, etc. In some embodiments, the first antenna configuration corresponds to at least one of one or more antennas, a quantity of antennas, etc.

In some embodiments, the first MIMO layer configuration and/or the first antenna configuration correspond to a MIMO layer configuration and/or an antenna configuration associated with all zeros in a corresponding field of DCI of a power saving signal (e.g., the first MIMO layer configuration and/or the first antenna configuration may correspond to a MIMO layer configuration and/or an antenna configuration indicated by a corresponding field of DCI, of a power saving signal, that comprises "000"). For example, the corresponding field of DCI of a power saving signal may be used to determine a MIMO layer configuration and/or the first MIMO layer configuration may correspond to a determination and/or derivation of a MIMO layer configuration using the corresponding field comprising all zeros (and/or other values).

In some embodiments, the UE applies one or more power saving techniques, one or more operations and/or one or more configurations based on a first assumption if the UE skips monitoring of a first power saving signal in one or more monitoring occasions associated with the first power saving signal. The first power saving signal may carry (and/or comprise) an indication related to the one or more power saving techniques, the one or more operations and/or the one or more configurations. The UE may behave as if the UE detects and/or receives a power saving signal indicating to (and/or instructing) the UE to use the first assumption (and/or the one or more power saving techniques, the one or more operations and/or the one or more configurations).

In some embodiments, the first assumption corresponds to an assumption associated with all zeros in a corresponding field of DCI of a power saving signal (e.g., the first assumption may correspond to information associated with the one or more power saving techniques, the one or more operations and/or the one or more configurations indicated by a corresponding field of DCI, of a power saving signal, that comprises "000"). For example, the corresponding field of DCI of a power saving signal may be used to determine information associated with at least one of a power saving technique, an operation, a configuration, etc. The first assumption (e.g., the one or more power saving techniques, the one or more operations and/or the one or more configurations) may correspond to a determination and/or derivation of at least one of a power saving technique, an operation, a configuration, etc. using the corresponding field comprising all zeros (and/or other values). In some embodiments, the first assumption is a configured assumption (e.g., the UE may be configured with the one or more power saving techniques, the one or more operations and/or the one or more configurations associated with the first assumption). Alternatively and/or additionally, the first assumption may be a default assumption (e.g., a default assumption that is used by the UE, such as for applying and/or determining the one or more power saving techniques, the one or more operations and/or the one or more configurations, when the UE does not detect and/or receive information related to the one or more power saving techniques).

In a third embodiment, a UE receives an indication from a base station to monitor a power saving signal. In some embodiments, the UE does not monitor a power saving signal in one or more monitoring occasions associated with the power saving signal. Alternatively and/or additionally, the one or more monitoring occasions associated with the power saving signal may comprise one, some and/or all monitoring occasions associated with the power saving signal. The UE may skip monitoring of the power saving signal in the one or more monitoring occasions. In some embodiments, the UE behaves as if the UE detects and/or receives a power saving signal for the UE. Alternatively and/or additionally, the UE may behave as if the UE detects and/or receives a power saving signal for the UE when the UE does not monitor a power saving signal in one or more monitoring occasions. Alternatively and/or additionally, the UE may behave as if the UE detects and/or receives a power saving signal for the UE when the UE skips monitoring of a power saving signal in one or more monitoring occasions associated with the power saving signal. Alternatively and/or additionally, the UE may behave as if the UE detects and/or receives a power saving signal indicating one or more values in one or more fields (of the power saving signal). For example, the UE may apply one or more power saving techniques and/or one or more configurations and/or perform one or more operations in accordance with the one or more values. In an example, responsive to the UE skipping monitoring and/or determining to skip monitoring of a power saving signal in the one or more monitoring occasions, the UE may perform one or more operations and/or apply one or more power saving techniques and/or one or more configurations that the UE is configured to perform and/or apply responsive to receiving a power saving signal indicative of the one or more values in the one or more fields. Alternatively and/or additionally, the UE may behave as if the UE detects and/or receives a power saving signal indicating whether one or more first power saving techniques are applied. In an example, responsive to the UE skipping monitoring and/or determining to skip monitoring of a power saving signal in the one or more monitoring occasions, the UE may perform one or more operations and/or apply one or more power saving techniques and/or one or more configurations that the UE is configured to perform and/or apply responsive to receiving a power saving signal indicating whether the one or more first power saving techniques are applied. Alternatively and/or additionally, the UE may behave as if the UE detects and/or receives a power saving signal indicating how one or more second power saving techniques are applied. In an example, responsive to the UE skipping monitoring and/or determining to skip monitoring of a power saving signal in the one or more monitoring occasions, the UE may perform one or more operations and/or apply one or more power saving techniques and/or one or more configurations that the UE is configured to perform and/or apply responsive to receiving a power saving signal indicating how the one or more second power saving techniques are applied. Alternatively and/or additionally, the UE may behave as if the UE detects and/or receives a power saving signal indicating one or more power consumption characteristics. In an example, responsive to the UE skipping monitoring and/or determining to skip monitoring of a power saving signal in the one or more monitoring occasions, the UE may perform one or more operations and/or apply one or more power saving techniques and/or one or more configurations that the UE is configured to perform and/or apply responsive to receiving a power saving signal indicating the one or more power consumption characteristics. One or more power saving techniques (e.g., the one or more first power saving techniques and/or the one or more second power saving techniques) may be associated with the power saving signal. For example, the power saving signal may comprise information indicative of one or more configurations, one or more power saving techniques and/or one or more operations.

In some embodiments, the UE wakes up for a DRX ON duration if the UE skips monitoring of a power saving signal in one or more monitoring occasions for the DRX ON duration. Alternatively and/or additionally, the UE may wake up for a DRX ON duration or go to sleep for the DRX ON duration based on an indication and/or a configuration from the base station (e.g., the UE may wake up for the DRX ON duration if the indication and/or the configuration indicate to the UE to wake up for the DRX ON duration and/or the UE may go to sleep for the DRX ON duration if the indication and/or the configuration indicate to the UE to go to sleep for the DRX ON duration). Alternatively and/or additionally, the UE may wake up for a DRX ON duration or go to sleep for the DRX ON duration based on an indication and/or a configuration from the base station if the UE skips monitoring of a power saving signal in one or more monitoring occasions for the DRX ON duration. Alternatively and/or additionally, the UE may wake up for a DRX ON duration or go to sleep for the DRX ON duration based on a last power saving signal (e.g., a previously and/or most recently received power saving signal) if the UE skips monitoring of a power saving signal in one or more monitoring occasions for the DRX ON duration (e.g., the UE may wake up for the DRX ON duration if the last power saving signal indicates to the UE to wake up and/or the UE may go to sleep for the DRX ON duration if the last power saving signal indicates to the UE to go to sleep). Alternatively and/or additionally, the UE does not wake up for a DRX ON duration or does not go to sleep for the DRX ON duration if above condition is not fulfilled (e.g., the UE may not wake up for a DRX ON duration or may not go to sleep for the DRX ON duration if the UE does not skip monitoring of a power saving signal in one or more monitoring occasions for the DRX ON duration and/or the power saving signal instructs (and/or indicates to) the UE not to wake up or not to go to sleep). In some embodiments, the power saving signal carries (and/or comprises) an indication to inform the UE to wake up (or not to wake up). The DRX ON duration may be associated with the one or more monitoring occasions. The UE may behave as if the UE detects and/or receives a power saving signal indicating to (and/or instructing) the UE to wake up. For example, the UE may perform one or more operations (e.g., wake up) and/or apply one or more configurations that the UE is configured to perform and/or apply responsive to receiving a power saving signal indicating to (and/or instructing) the UE to wake up.

In some embodiments, the UE disables cross-slot scheduling if the UE skips monitoring of a first power saving signal in one or more monitoring occasions associated with the first power saving signal (e.g., the UE may disable cross-slot scheduling responsive to the UE skipping monitoring and/or determining to skip monitoring of the first power saving signal in the one or more monitoring occasions). Alternatively and/or additionally, the UE may enable same-slot scheduling if the UE skips monitoring of a first power saving signal in one or more monitoring occasions associated with the first power saving signal (e.g., the UE may enable same-slot scheduling responsive to the UE skipping monitoring and/or determining to skip monitoring of the first power saving signal in the one or more monitoring occasions).

In some embodiments, the first power saving signal carries (and/or comprises) an indication related to cross-slot scheduling. In some embodiments, the UE behaves as if the UE detects and/or receives a power saving signal indicating to (and/or instructing) the UE to disable cross-slot scheduling. In an example, responsive to the UE skipping monitoring and/or determining to skip monitoring of the first power saving signal in the one or more monitoring occasions, the UE may perform one or more operations (e.g., disable cross-slot scheduling) and/or apply one or more configurations that the UE is configured to perform and/or apply responsive to receiving a power saving signal indicating to (and/or instructing) the UE to disable cross-slot scheduling. The UE may disable cross-slot scheduling by setting a minimum applicable value for a scheduling delay to 0.

In some embodiments, the UE applies a first minimum applicable value for a scheduling delay if the UE skips monitoring of a first power saving signal in one or more monitoring occasions associated with the first power saving signal (e.g., the UE may apply the first minimum applicable value for the scheduling delay responsive to the UE skipping monitoring and/or determining to skip monitoring of the first power saving signal in the one or more monitoring occasions). The first power saving signal may carry (and/or comprise) an indication related to a minimum applicable value for a scheduling delay. In some embodiments, the UE behaves as if the UE detects and/or receives a power saving signal indicating to (and/or instructing) the UE to use the first minimum applicable value for a scheduling delay. In an example, responsive to the UE skipping monitoring and/or determining to skip monitoring of the first power saving signal in the one or more monitoring occasions, the UE may perform one or more operations and/or apply one or more configurations (e.g., the first minimum applicable value for the scheduling delay) that the UE is configured to perform and/or apply responsive to receiving a power saving signal indicating to (and/or instructing) the UE to use the first minimum applicable value for a scheduling delay.

In some embodiments, the first minimum applicable value corresponds to a minimum applicable value associated with all zeros in a corresponding field of DCI of a power saving signal (e.g., the first minimum applicable value may correspond to a minimum applicable value that is indicated by a corresponding field of DCI, of a power saving signal, that comprises "000"). For example, the corresponding field of DCI of a power saving signal may be used to determine a minimum applicable value and/or the first minimum applicable value may correspond to a determination and/or derivation of a minimum applicable value using the corresponding field comprising all zeros (and/or other values). In some embodiments, the first minimum applicable value is 0. Alternatively and/or additionally, the first minimum applicable value may be a lowest minimum applicable value of one or more configured minimum applicable values (e.g., one or more minimum applicable values for scheduling delay with which the UE is configured). Alternatively and/or additionally, the first minimum applicable value may be a configured minimum applicable value (e.g., the UE may be configured with the first minimum applicable value).

In some embodiments, the UE applies a first PDCCH monitoring pattern (e.g., the UE may perform PDCCH monitoring in accordance with the first PDCCH monitoring pattern) if the UE skips monitoring of a first power saving signal in one or more monitoring occasions associated with the first power saving signal (e.g., the UE may apply the first PDCCH monitoring pattern responsive to the UE skipping monitoring and/or determining to skip monitoring of the first power saving signal in the one or more monitoring occasions). The first power saving signal may carry (and/or comprise) an indication related to a PDCCH monitoring pattern. The UE may behave as if the UE detects and/or receives a power saving signal indicating to (and/or instructing) the UE to use the first PDCCH monitoring pattern. In an example, responsive to the UE skipping monitoring and/or determining to skip monitoring of the first power saving signal in the one or more monitoring occasions, the UE may perform one or more operations and/or apply one or more configurations (e.g., the UE may perform PDCCH monitoring in accordance with the first PDCCH monitoring pattern) that the UE is configured to perform and/or apply responsive to receiving a power saving signal indicating to (and/or instructing) the UE to use the first PDCCH monitoring pattern.

In some embodiments, the first PDCCH monitoring pattern corresponds to a PDCCH monitoring pattern associated with all zeros in a corresponding field of DCI of a power saving signal (e.g., the first PDCCH monitoring pattern may correspond to a PDCCH monitoring pattern that is indicated by a corresponding field of DCI, of a power saving signal, that comprises "000"). For example, the corresponding field of DCI of a power saving signal may be used to determine a PDCCH monitoring pattern and/or the first PDCCH monitoring pattern may correspond to a determination and/or derivation of a PDCCH monitoring pattern using the corresponding field comprising all zeros (and/or other values). In some embodiments, the first PDCCH monitoring pattern is a configured PDCCH monitoring pattern (e.g., the UE may be configured with the first PDCCH monitoring pattern). Alternatively and/or additionally, the first PDCCH monitoring pattern may be a most dense PDCCH monitoring pattern (e.g., the first PDCCH monitoring pattern may be a most dense PDCCH monitoring pattern of one or more PDCCH monitoring patterns with which the UE is configured). Alternatively and/or additionally, the first PDCCH monitoring pattern may be a PDCCH monitoring pattern with a highest quantity of PDCCH monitoring occasions within a (time) period (e.g., the first PDCCH monitoring pattern may have a highest quantity of PDCCH monitoring occasions within the (time) period among one or more PDCCH monitoring patterns with which the UE is configured). Alternatively and/or additionally, the first PDCCH monitoring pattern may be a PDCCH monitoring pattern with a highest frequency and/or a highest rate of PDCCH monitoring occasions (e.g., the first PDCCH monitoring pattern may have a highest frequency and/or a highest rate of PDCCH monitoring occasions among one or more PDCCH monitoring patterns with which the UE is configured). Alternatively and/or additionally, the first PDCCH monitoring pattern may be a default PDCCH monitoring pattern (e.g., a default PDCCH monitoring pattern that is used by the UE, such as for performing PDCCH monitoring, when the UE does not detect and/or receive a power saving signal indicative of a PDCCH monitoring pattern other than the default PDCCH monitoring pattern).

In some embodiments, the UE applies a first PDCCH monitoring periodicity (e.g., the UE may perform PDCCH monitoring in accordance with the first PDCCH monitoring periodicity) if the UE skips monitoring of a first power saving signal in one or more monitoring occasions associated with the first power saving signal (e.g., the UE may apply the first PDCCH monitoring periodicity responsive to the UE skipping monitoring and/or determining to skip monitoring of the first power saving signal in the one or more monitoring occasions). The first power saving signal may carry (and/or comprise) an indication related to a PDCCH monitoring periodicity. The UE may behave as if the UE detects and/or receives a power saving signal indicating to (and/or instructing) the UE to use the first PDCCH monitoring periodicity. In an example, responsive to the UE skipping monitoring and/or determining to skip monitoring of the first power saving signal in the one or more monitoring occasions, the UE may perform one or more operations and/or apply one or more configurations (e.g., the UE may perform PDCCH monitoring in accordance with the first PDCCH monitoring periodicity) that the UE is configured to perform and/or apply responsive to receiving a power saving signal indicating to (and/or instructing) the UE to use the first PDCCH monitoring periodicity.

In some embodiments, the first PDCCH monitoring periodicity corresponds to a PDCCH monitoring periodicity associated with all zeros in a corresponding field of DCI of a power saving signal (e.g., the first PDCCH monitoring periodicity may correspond to a PDCCH monitoring periodicity that is indicated by a corresponding field of DCI, of a power saving signal, that comprises "000"). For example, the corresponding field of DCI of a power saving signal may be used to determine a PDCCH monitoring periodicity and/or the first PDCCH monitoring periodicity may correspond to a determination and/or derivation of a PDCCH monitoring periodicity using the corresponding field comprising all zeros (and/or other values). In some embodiments, the first PDCCH monitoring periodicity is a configured PDCCH monitoring periodicity (e.g., the UE may be configured with the first PDCCH monitoring periodicity). Alternatively and/or additionally, the first PDCCH monitoring periodicity may be a shortest PDCCH monitoring periodicity (e.g., the first PDCCH monitoring periodicity may be a shortest PDCCH monitoring periodicity of one or more PDCCH monitoring periodicities with which the UE is configured). Alternatively and/or additionally, the first PDCCH monitoring periodicity may be a default PDCCH monitoring periodicity (e.g., a default PDCCH monitoring periodicity that is used by the UE, such as for performing PDCCH monitoring, when the UE does not detect and/or receive a power saving signal indicative of a PDCCH monitoring periodicity other than the default PDCCH monitoring periodicity).

In some embodiments, the UE disables PDCCH monitoring skipping if the UE skips monitoring of a power saving signal in one or more monitoring occasions associated with the power saving signal. Alternatively and/or additionally, the UE may apply a first PDCCH monitoring skipping configuration if the UE skips monitoring of a first power saving signal in one or more monitoring occasions associated with the first power saving signal (e.g., the UE may apply the first PDCCH monitoring skipping configuration responsive to the UE skipping monitoring and/or determining to skip monitoring of the first power saving signal in the one or more monitoring occasions). The first power saving signal may carry (and/or comprise) an indication related to PDCCH monitoring skipping. The UE may behave as if the UE detects and/or receives a power saving signal indicating to (and/or instructing) the UE to use the first PDCCH monitoring skipping configuration. In an example, responsive to the UE skipping monitoring and/or determining to skip monitoring of the first power saving signal in the one or more monitoring occasions, the UE may perform one or more operations and/or apply one or more configurations (e.g., the UE may skip PDCCH monitoring in one or more monitoring occasions in accordance with the first PDCCH monitoring skipping configuration) that the UE is configured to perform and/or apply responsive to receiving a power saving signal indicating to (and/or instructing) the UE to use the first PDCCH monitoring skipping configuration.

In some embodiments, the first PDCCH monitoring skipping configuration is associated with a first pattern to skip one or more configured PDCCH monitoring occasions (e.g., one or more PDCCH monitoring occasions in Active Time). For example, the UE may determine, based on the first PDCCH monitoring skipping configuration, one or more configured PDCCH monitoring occasions in which the UE skips monitoring PDCCH. In some embodiments, the first PDCCH monitoring skipping configuration corresponds to a PDCCH monitoring skipping configuration associated with all zeros in a corresponding field of DCI of a power saving signal (e.g., the first PDCCH monitoring skipping configuration may correspond to a PDCCH monitoring skipping configuration that is indicated by a corresponding field of DCI, of a power saving signal, that comprises "000"). For example, the corresponding field of DCI of a power saving signal may be used to determine a PDCCH monitoring skipping configuration and/or the first PDCCH monitoring skipping configuration may correspond to a determination and/or derivation of a PDCCH monitoring skipping configuration using the corresponding field comprising all zeros (and/or other values). In some embodiments, the first PDCCH monitoring skipping configuration is a configured PDCCH monitoring skipping configuration (e.g., the UE may be configured with the first PDCCH monitoring skipping configuration). Alternatively and/or additionally, the first PDCCH monitoring skipping configuration is associated a skipping pattern with a lowest amount of skipping (e.g., the first PDCCH monitoring skipping configuration may be associated with a lowest amount of PDCCH monitoring occasions for the UE to skip among one or more PDCCH monitoring skipping configurations with which the UE is configured). Alternatively and/or additionally, the first PDCCH monitoring skipping configuration may be a default PDCCH monitoring skipping configuration (e.g., a default PDCCH monitoring skipping configuration that is used by the UE, such as for determining one or more PDCCH monitoring occasions in which to skip PDCCH monitoring, when the UE does not detect and/or receive a power saving signal indicative of a PDCCH monitoring skipping configuration other than the default PDCCH monitoring skipping configuration).

In some embodiments, the UE applies a first MIMO layer configuration and/or a first antenna configuration if the UE skips monitoring of a first power saving signal in one or more monitoring occasions associated with the first power saving signal. In some embodiments, the first MIMO layer configuration corresponds to at least one of one or more MIMO layers, a quantity of MIMO layers, etc. In some embodiments, the first antenna configuration corresponds to at least one of one or more antennas, a quantity of antennas, etc. The first power saving signal may carry (and/or comprise) an indication related to a MIMO layer configuration and/or an antenna configuration (e.g., the first power saving signal may be indicative of at least one of one or more MIMO layers, a quantity of MIMO layers, one or more antennas, a quantity of antennas, etc.). The UE may behave as if the UE detects and/or receives a power saving signal indicating to (and/or instructing) the UE to use the first MIMO layer configuration and/or the first antenna configuration. In an example, responsive to the UE skipping monitoring and/or determining to skip monitoring of the first power saving signal in the one or more monitoring occasions, the UE may perform one or more operations and/or apply one or more configurations (e.g., the UE may apply the first MIMO layer configuration and/or the first antenna configuration) that the UE is configured to perform and/or apply responsive to receiving a power saving signal indicating to (and/or instructing) the UE to use the first MIMO layer configuration and/or the first antenna configuration.

In some embodiments, the first MIMO layer configuration and/or the first antenna configuration correspond to a MIMO layer configuration and/or an antenna configuration associated with all zeros in a corresponding field of DCI of a power saving signal (e.g., the first MIMO layer configuration and/or the first antenna configuration may correspond to a MIMO layer configuration and/or an antenna configuration indicated by a corresponding field of DCI, of a power saving signal, that comprises "000"). For example, the corresponding field of DCI of a power saving signal may be used to determine a MIMO layer configuration and/or the first MIMO layer configuration may correspond to a determination and/or derivation of a MIMO layer configuration using the corresponding field comprising all zeros (and/or other values). Alternatively and/or additionally, the corresponding field of DCI of a power saving signal may be used to determine an antenna configuration and/or the first antenna configuration may correspond to a determination and/or derivation of an antenna configuration using the corresponding field comprising all zeros (and/or other values). In some embodiments, the first MIMO layer configuration may be a configured MIMO layer configuration and/or the first antenna configuration may be a configured antenna configuration (e.g., the UE may be configured with the first MIMO layer configuration and/or the first antenna configuration). Alternatively and/or additionally, the first MIMO layer configuration may be associated with a highest quantity of MIMO layers (e.g., the first MIMO layer configuration may be associated with a highest quantity of MIMO layers among one or more MIMO layer configurations with which the UE is configured). Alternatively and/or additionally, the first antenna configuration may be associated with a highest quantity of antennas (e.g., the first antenna configuration may be associated with a highest quantity of antennas among one or more antenna configurations with which the UE is configured). Alternatively and/or additionally, the first MIMO layer configuration may be 4 layers or 8 layers. Alternatively and/or additionally, the first antenna configuration may be 4Tx or 8Tx. Alternatively and/or additionally, the first MIMO layer configuration may be a default MIMO layer configuration (e.g., a default MIMO layer configuration that is used by the UE, such as for determining one or more MIMO layers and/or a quantity of MIMO layers, when the UE does not detect and/or receive a power saving signal indicative of a MIMO layer configuration other than the default MIMO layer configuration). Alternatively and/or additionally, the first antenna configuration may be a default antenna configuration (e.g., a default antenna configuration that is used by the UE, such as for determining one or more antennas and/or a quantity of antennas, when the UE does not detect and/or receive a power saving signal indicative of an antenna configuration other than the default antenna configuration). Alternatively and/or additionally, the first MIMO layer configuration may be a MIMO layer configuration which is used when a power saving signal does not indicate a MIMO layer configuration (e.g., the UE may be configured with the first MIMO layer configuration that is used, such as for determining one or more MIMO layers and/or a quantity of MIMO layers, when the UE receives a power saving signal that is not indicative of a MIMO layer configuration and/or that does not comprise a field of DCI with a MIMO layer configuration).

In some embodiments, the UE applies one or more power saving techniques, one or more operations and/or one or more configurations based on a first assumption if the UE skips monitoring of a first power saving signal in one or more monitoring occasions associated with the first power saving signal. The first power saving signal may carry (and/or comprise) an indication related to the one or more power saving techniques, the one or more operations and/or the one or more configurations. The UE may behave as if the UE detects and/or receives a power saving signal indicating to (and/or instructing) the UE to use the first assumption (and/or the one or more power saving techniques, the one or more operations and/or the one or more configurations). In an example, responsive to the UE skipping monitoring and/or determining to skip monitoring of the first power saving signal in the one or more monitoring occasions, the UE may perform the one or more operations and/or apply the one or more power saving techniques and/or the one or more configurations that the UE is configured to perform and/or apply responsive to receiving a power saving signal indicating to (and/or instructing) the UE to use the first assumption.

In some embodiments, the first assumption corresponds to an assumption associated with all zeros in a corresponding field of DCI of a power saving signal (e.g., the first assumption may correspond to information associated with the one or more power saving techniques, the one or more operations and/or the one or more configurations indicated by a corresponding field of DCI, of a power saving signal, that comprises "000"). For example, the corresponding field of DCI of a power saving signal may be used to determine information associated with at least one of a power saving technique, an operation, a configuration, etc. The first assumption (e.g., the one or more power saving techniques, the one or more operations and/or the one or more configurations) may correspond to a determination and/or derivation of at least one of a power saving technique, an operation, a configuration, etc. using the corresponding field comprising all zeros (and/or other values). In some embodiments, the first assumption is a configured assumption (e.g., the UE may be configured with the one or more power saving techniques, the one or more operations and/or the one or more configurations associated with the first assumption). Alternatively and/or additionally, the first assumption may be a default assumption (e.g., a default assumption that is used by the UE, such as for applying and/or determining the one or more power saving techniques, the one or more operations and/or the one or more configurations, when the UE does not detect and/or receive information related to the one or more power saving techniques). Alternatively and/or additionally, the first assumption may be an assumption which is used when a power saving signal does not carry and/or comprise information for the one or more power saving techniques (e.g., the UE may be configured with the one or more power saving techniques that are used when the UE receives a power saving signal that is not indicative of information associated with the one or more power saving techniques and/or that does not comprise a field of DCI with information associated with the one or more power saving techniques). In some embodiments, the first assumption is an assumption which consumes the most power (e.g., the first assumption may be indicative of one or more power saving techniques, one or more operations and/or one or more configurations associated with a most amount of power consumption among power saving techniques, operations, and/or configurations with which the UE is configured). Alternatively and/or additionally, the first assumption is an assumption without power saving (e.g., the first assumption may not be associated with one or more power saving techniques and/or the first assumption may be associated with one or more operations that are not associated with a power saving technique). The first assumption corresponds to information (e.g., one or more power saving techniques, one or more operations and/or one or more configurations) indicated by a last power saving signal (e.g., a previously and/or most recently received power saving signal prior to transmission of the first power saving signal). For example, responsive to receiving the last power saving signal, the UE may store information (e.g., one or more power saving techniques, one or more operations and/or one or more configurations) indicated by the last power saving signal. The UE may use, such as for determining one or more power saving techniques, one or more operations and/or one or more configurations, the information indicated by the last power saving signal if the UE skips monitoring of the first power saving signal in the one or more monitoring occasions associated with the first power saving signal.

In some embodiments, one or more assumptions applied by the UE as described with respect to the third embodiment and/or others herein may also be applied by the base station. The one or more assumptions may correspond to at least one of one or more values of one or more fields of a power saving signal, whether the UE wakes up or goes to sleep, disablement of cross-slot scheduling, enablement of same-slot scheduling, the first minimum applicable value, the first PDCCH monitoring pattern, the first PDCCH monitoring periodicity, the first PDCCH monitoring skipping configuration, the first MIMO layer configuration, the first antenna configuration, the first assumption, one or more power saving techniques, one or more operations, one or more configurations, etc. At least one of the one or more assumptions may be applied by the base station when the base station determines and/or realizes that the UE skipped and/or will skip monitoring of a power saving signal in one or more monitoring occasions associated with the power saving signal (and/or responsive to a determination that one, some and/or all of the one or more monitoring occasions associated with the power saving signal are within Active Time associated with the UE).

In a fourth embodiment, a base station transmits an indication to a UE for the UE to monitor a power saving signal. In some embodiments, the base station determines and/or realizes that the UE does not monitor the power saving signal in one or more monitoring occasions (e.g., one or more monitoring occasions associated with the power saving signal). Alternatively and/or additionally, the base station may determine and/or realize that the UE skips monitoring of the power saving signal in the one or more monitoring occasions.

In some embodiments, the base station receives an indication from the UE. In some embodiments, the base station determines and/or realizes, based on the indication, that the UE does not monitor the power saving signal in the one or more monitoring occasions and/or that the UE skips monitoring of the power saving signal in the one or more monitoring occasions. The indication may be associated with and/or indicative of monitoring of the power saving signal being skipped by the UE and/or the power saving signal not being monitored (in the one or more monitoring occasions). In some embodiments, the indication may inform the base station that the power saving signal is not monitored by the UE in the one or more monitoring occasions. Alternatively and/or additionally, the indication may inform the base station that monitoring of the power signal in the one or more monitoring occasions is skipped by the UE. In some embodiments, the indication is a scheduling request. Alternatively and/or additionally, the indication comprises (and/or is comprised in) one or more messages related to a random access procedure.

In some embodiments, the base station determines and/or realizes that the UE does not monitor the power saving signal in the one or more monitoring occasions if the one or more monitoring occasions are within Active Time (associated with the UE). The UE may not monitor a power saving signal in the one or more monitoring occasions if the one or more monitoring occasions are within Active Time. Alternatively and/or additionally, the UE may skip monitoring of the power saving signal in the one or more monitoring occasions if the one or more monitoring occasions are within Active Time.

In some embodiments, the base station applies a first assumption of one or more first power saving techniques, one or more first operations and/or one or more first configurations for the UE. The base station may apply the first assumption without transmitting, to the UE, a power saving signal indicating the first assumption (e.g., a power saving signal indicative of the one or more power saving techniques, the one or more first operations and/or the one or more first configurations). Alternatively and/or additionally, the base station may apply the first assumption regardless of whether the base station transmits, to the UE, a power saving signal indicating the first assumption. Alternatively and/or additionally, the base station may apply the first assumption for the UE even though the base station transmits a power saving signal, indicative of a second assumption (e.g., an assumption of one or more second power saving techniques, one or more second operations and/or one or more second configurations different than the one or more first power saving techniques, the one or more first operations and/or the one or more first configurations) to the UE (e.g., the base station may apply the first assumption for the UE based on a determination that the UE does not monitor the power saving signal indicative of the second assumption and/or that the UE skips monitoring of the power saving signal). In some embodiments, the power saving signal indicative of the second assumption is transmitted in the one or more monitoring occasions. In an example, responsive to the base station determining and/or realizing that the UE does not monitor and/or skips monitoring the power saving signal in the one or more monitoring occasions, the base station may apply the first assumption (e.g., the base station may perform the one or more first operations and/or apply the one or more first power saving techniques and/or the one or more first configurations in accordance with the first assumption).

In some embodiments, the first assumption is related to wake-up. Alternatively and/or additionally, the first assumption may be related to cross-slot scheduling. Alternatively and/or additionally, the first assumption may be related to a PDCCH monitoring pattern. Alternatively and/or additionally, the first assumption may be related to a PDCCH monitoring periodicity. Alternatively and/or additionally, the first assumption may be related to PDCCH skipping. Alternatively and/or additionally, the first assumption may be related to a quantity of MIMO layers. Alternatively and/or additionally, the first assumption may be related to a quantity of antennas.

In some embodiments, the base station behaves as if the base station transmits a power saving signal indicating the first assumption for the UE when the UE does not monitor a first power saving signal in one or more monitoring occasions associated with the first power saving signal. In an example, responsive to the base station determining and/or realizing that the UE does not monitor and/or skips monitoring the power saving signal in the one or more monitoring occasions, the base station may apply the first assumption (e.g., the base station may perform the one or more first operations and/or apply the one or more first power saving techniques and/or the one or more first configurations in accordance with the first assumption).

In some embodiments, the first assumption is associated with one or more values in one or more fields of a power saving signal. Alternatively and/or additionally, the first assumption may be associated with whether a power saving technique is applied. For example, the first assumption may be an assumption to apply a power saving technique. Alternatively and/or additionally, the first assumption may be an assumption not to apply a power saving technique. In some embodiments, the power saving technique is associated with a power saving signal (e.g., a power saving signal may be indicative of whether and/or how to apply the power saving technique). In some embodiments, the first assumption is associated with one or more power consumption characteristics.

In some embodiments, the first assumption may be an assumption that the UE wakes up for a DRX ON duration (or an assumption that the UE goes to sleep for the DRX ON duration). For example, the base station may assume and/or determine that the UE wakes up for the DRX ON duration if the UE skips monitoring of a power saving signal in one or more monitoring occasions for the DRX ON duration. Alternatively and/or additionally, the UE may wake up for the DRX ON duration if the UE skips monitoring of a power saving signal in one or more monitoring occasions for the DRX ON duration. Alternatively and/or additionally, the base station may assume and/or determine that the UE goes to sleep for the DRX ON duration if the UE skips monitoring of a power saving signal in one or more monitoring occasions for the DRX ON duration. Alternatively and/or additionally, the UE may go to sleep for the DRX ON duration if the UE skips monitoring of a power saving signal in one or more monitoring occasions for the DRX ON duration. In some embodiments, the base station schedules the UE in accordance with the assumption and/or the determination that the UE wakes up (or goes to sleep) for the DRX ON duration.

In some embodiments, the base station assumes and/or determines that the UE wakes up for a DRX ON duration or goes to sleep for the DRX ON duration based on an indication and/or configuration from the base station (e.g., the base station may transmit the indication and/or the configuration, to the UE, indicative of the UE waking up (or going to sleep) for the DRX ON duration). Alternatively and/or additionally, the base station may assume and/or determine that the UE wakes up for a DRX ON duration or goes to sleep for the DRX ON duration based on an indication and/or configuration from the base station if the UE skips monitoring of a power saving signal in one or more monitoring occasions for the DRX ON duration. In an example, responsive to the base station determining and/or realizing that the UE does not monitor and/or skips monitoring the power saving signal in the one or more monitoring occasions for the DRX ON duration, the base station may assume and/or determine that the UE wakes up for a DRX ON duration or goes to sleep for the DRX ON duration based on a determination that the indication and/or the configuration are indicative of the UE waking up or going to sleep. In some embodiments, the base station assumes and/or determines that the UE wakes up for a DRX ON duration or goes to sleep for the DRX ON duration based on a last power saving signal (e.g., a power saving signal previously and/or most recently transmitted to the UE and/or a power saving signal transmitted in one or more previous monitoring occasions) if the UE skips monitoring of a power saving signal in one or more monitoring occasions for the DRX ON duration. For example, a power saving signal, such as the last power saving signal and/or one or more other power saving signals received by the UE, may carry (and/or comprise) an indication to inform the UE to wake up (or not to wake up and/or go to sleep). The DRX ON duration may be associated with the one or more monitoring occasions.

In some embodiments, the base station disables cross-slot scheduling (associated with the UE) if the UE skips monitoring of a first power saving signal in one or more monitoring occasions. In an example, the base station may disable cross-slot scheduling (associated with the UE) responsive to the base station determining and/or realizing that the UE does not monitor and/or skips monitoring the first power saving signal in the one or more monitoring occasions. In some embodiments, the base station enables same-slot scheduling (associated with the UE) if the UE skips monitoring of the first power saving signal in the one or more monitoring occasions. The power saving signal carries an indication related to cross-slot scheduling. In an example, the base station may enable same-slot scheduling (associated with the UE) responsive to the base station determining and/or realizing that the UE does not monitor and/or skips monitoring the first power saving signal in the one or more monitoring occasions. In some embodiments, the base station behaves as if the base station transmits a power saving signal indicating the UE to disable cross-slot scheduling. In an example, responsive to the base station determining and/or realizing that the UE does not monitor and/or skips monitoring the first power saving signal in the one or more monitoring occasions, the base station may perform one or more operations and/or apply one or more configurations that the base station is configured to perform and/or apply responsive to transmitting a power saving signal indicating to (and/or instructing) the UE to disable cross-slot scheduling. In some embodiments, the base station may disable cross-slot scheduling by setting a minimum applicable value for a scheduling delay to 0.

In some embodiments, the base station applies a first minimum applicable value for a scheduling delay if the UE skips monitoring of a first power saving signal in one or more monitoring occasions associated with the first power saving signal (e.g., the base station may apply the first minimum applicable value for the scheduling delay responsive to the base station determining and/or realizing that the UE does not monitor and/or skips monitoring the first power saving signal in the one or more monitoring occasions). The first power saving signal may carry (and/or comprise) an indication related to a minimum applicable value for a scheduling delay. In some embodiments, the base station behaves as if the base station transmits a power saving signal indicating to (and/or instructing) the UE to use the first minimum applicable value for a scheduling delay. In an example, responsive to the base station determining and/or realizing that the UE does not monitor and/or skips monitoring the first power saving signal in the one or more monitoring occasions, the base station may perform one or more operations and/or apply one or more configurations (e.g., the first minimum applicable value for the scheduling delay) that the base station is configured to perform and/or apply responsive to transmitting a power saving signal indicating to (and/or instructing) the UE to use the first minimum applicable value for a scheduling delay.

In some embodiments, the first minimum applicable value corresponds to a minimum applicable value associated with all zeros in a corresponding field of DCI of a power saving signal (e.g., the first minimum applicable value may correspond to a minimum applicable value that is indicated by a corresponding field of DCI, of a power saving signal, that comprises "000"). For example, the corresponding field of DCI of a power saving signal may be used to determine a minimum applicable value and/or the first minimum applicable value may correspond to a determination and/or derivation of a minimum applicable value using the corresponding field comprising all zeros (and/or other values). In some embodiments, the first minimum applicable value is 0. Alternatively and/or additionally, the first minimum applicable value may be a lowest minimum applicable value of one or more configured minimum applicable values (e.g., one or more minimum applicable values for scheduling delay with which the base station and/or the UE are configured). Alternatively and/or additionally, the first minimum applicable value may be a configured minimum applicable value (e.g., the base station and/or the UE may be configured with the first minimum applicable value). In some embodiments, the first minimum applicable value is a fixed value. Alternatively and/or additionally, the first minimum applicable value may be a default value (e.g., a default minimum applicable value that is used by the base station and/or the UE when the UE does not detect and/or receive a power saving signal indicative of a minimum applicable value).

In some embodiments, the base station applies a first PDCCH monitoring pattern if the UE skips monitoring of a first power saving signal in one or more monitoring occasions associated with the first power saving signal (e.g., the base station may apply the first PDCCH monitoring pattern responsive to the base station determining and/or realizing that the UE does not monitor and/or skips monitoring the first power saving signal in the one or more monitoring occasions). The first power saving signal may carry (and/or comprise) an indication related to a PDCCH monitoring pattern. In some embodiments, the base station behaves as if the base station transmits a power saving signal indicating to (and/or instructing) the UE to use the first PDCCH monitoring pattern. In an example, responsive to the base station determining and/or realizing that the UE does not monitor and/or skips monitoring the first power saving signal in the one or more monitoring occasions, the base station may perform one or more operations and/or apply one or more configurations (e.g., the base station may transmit one or more PDCCH signals to the UE in accordance with the first PDCCH monitoring pattern) that the base station is configured to perform and/or apply responsive to transmitting a power saving signal indicating to (and/or instructing) the UE to use the first PDCCH monitoring pattern.

In some embodiments, the first PDCCH monitoring pattern corresponds to a PDCCH monitoring pattern associated with all zeros in a corresponding field of DCI of a power saving signal (e.g., the first PDCCH monitoring pattern may correspond to a PDCCH monitoring pattern that is indicated by a corresponding field of DCI, of a power saving signal, that comprises "000"). For example, the corresponding field of DCI of a power saving signal may be used to determine a PDCCH monitoring pattern and/or the first PDCCH monitoring pattern may correspond to a determination and/or derivation of a PDCCH monitoring pattern using the corresponding field comprising all zeros (and/or other values). In some embodiments, the first PDCCH monitoring pattern is a configured PDCCH monitoring pattern (e.g., the base station and/or the UE may be configured with the first PDCCH monitoring pattern). Alternatively and/or additionally, the first PDCCH monitoring pattern may be a most dense PDCCH monitoring pattern (e.g., the first PDCCH monitoring pattern may be a most dense PDCCH monitoring pattern of one or more PDCCH monitoring patterns with which the base station and/or the UE are configured). Alternatively and/or additionally, the first PDCCH monitoring pattern may be a PDCCH monitoring pattern with a highest quantity of PDCCH monitoring occasions within a (time) period (e.g., the first PDCCH monitoring pattern may have a highest quantity of PDCCH monitoring occasions within the (time) period among one or more PDCCH monitoring patterns with which the base station and/or the UE are configured). Alternatively and/or additionally, the first PDCCH monitoring pattern may be a PDCCH monitoring pattern with a highest frequency and/or a highest rate of PDCCH monitoring occasions (e.g., the first PDCCH monitoring pattern may have a highest frequency and/or a highest rate of PDCCH monitoring occasions among one or more PDCCH monitoring patterns with which the base station and/or the UE are configured). Alternatively and/or additionally, the first PDCCH monitoring pattern may be a default PDCCH monitoring pattern (e.g., a default PDCCH monitoring pattern that is used by the base station, such as for transmitting one or more PDCCH signals to the UE, when the UE does not detect and/or receive a power saving signal indicative of a PDCCH monitoring pattern other than the default PDCCH monitoring pattern).

In some embodiments, the base station applies a first PDCCH monitoring periodicity if the UE skips monitoring of a first power saving signal in one or more monitoring occasions associated with the first power saving signal (e.g., the base station may apply the first PDCCH monitoring periodicity responsive to the base station determining and/or realizing that the UE does not monitor and/or skips monitoring the first power saving signal in the one or more monitoring occasions). The first power saving signal may carry (and/or comprise) an indication related to a PDCCH monitoring periodicity. In some embodiments, the base station behaves as if the base station transmits a power saving signal indicating to (and/or instructing) the UE to use the first PDCCH monitoring periodicity. In an example, responsive to the base station determining and/or realizing that the UE does not monitor and/or skips monitoring the first power saving signal in the one or more monitoring occasions, the base station may perform one or more operations and/or apply one or more configurations (e.g., the base station may transmit one or more PDCCH signals to the UE in accordance with the first PDCCH monitoring periodicity) that the base station is configured to perform and/or apply responsive to transmitting a power saving signal indicating to (and/or instructing) the UE to use the first PDCCH monitoring periodicity.

In some embodiments, the base station disables PDCCH monitoring skipping if the UE skips monitoring of a power saving signal in one or more monitoring occasions associated with the power saving signal. Alternatively and/or additionally, the base station may apply a first PDCCH monitoring skipping configuration if the UE skips monitoring of a first power saving signal in one or more monitoring occasions associated with the first power saving signal (e.g., the base station may apply the first PDCCH monitoring skipping configuration responsive to the base station determining and/or realizing that the UE does not monitor and/or skips monitoring the first power saving signal in the one or more monitoring occasions). The first power saving signal may carry (and/or comprise) an indication related to PDCCH monitoring skipping. In some embodiments, the base station behaves as if the base station transmits a power saving signal indicating to (and/or instructing) the UE to use the first PDCCH monitoring skipping configuration. In an example, responsive to the base station determining and/or realizing that the UE does not monitor and/or skips monitoring the first power saving signal in the one or more monitoring occasions, the base station may perform one or more operations and/or apply one or more configurations (e.g., the base station may transmit one or more PDCCH signals to the UE in accordance with the first PDCCH monitoring skipping configuration) that the base station is configured to perform and/or apply responsive to transmitting a power saving signal indicating to (and/or instructing) the UE to use the first PDCCH monitoring skipping configuration.

In some embodiments, the base station applies a first MIMO layer configuration and/or a first antenna configuration if the UE skips monitoring of a first power saving signal in one or more monitoring occasions associated with the first power saving signal (e.g., the base station may apply the first MIMO layer configuration and/or the first antenna configuration responsive to the base station determining and/or realizing that the UE does not monitor and/or skips monitoring the first power saving signal in the one or more monitoring occasions). In some embodiments, the first MIMO layer configuration corresponds to at least one of one or more MIMO layers, a quantity of MIMO layers, etc. In some embodiments, the first antenna configuration corresponds to at least one of one or more antennas, a quantity of antennas, etc. The first power saving signal may carry (and/or comprise) an indication related to a MIMO layer configuration and/or an antenna configuration (e.g., the first power saving signal may be indicative of at least one of one or more MIMO layers, a quantity of MIMO layers, one or more antennas, a quantity of antennas, etc.). In some embodiments, the base station behaves as if the base station transmits a power saving signal indicating to (and/or instructing) the UE to use the first MIMO layer configuration and/or the first antenna configuration. In an example, responsive to the base station determining and/or realizing that the UE does not monitor and/or skips monitoring the first power saving signal in the one or more monitoring occasions, the base station may perform one or more operations and/or apply one or more configurations that the base station is configured to perform and/or apply responsive to transmitting a power saving signal indicating to (and/or instructing) the UE to use the first MIMO layer configuration and/or the first antenna configuration.

In some embodiments, the base station applies one or more power saving techniques, one or more operations and/or one or more configurations based on a first assumption if the UE skips monitoring of a first power saving signal in one or more monitoring occasions associated with the first power saving signal. The first power saving signal may carry (and/or comprise) an indication related to the one or more power saving techniques, the one or more operations and/or the one or more configurations. In some embodiments, the base station behaves as if the base station transmits a power saving signal indicating to (and/or instructing) the UE to use the first assumption (and/or the one or more power saving techniques, the one or more operations and/or the one or more configurations). In an example, responsive to the base station determining and/or realizing that the UE does not monitor and/or skips monitoring the first power saving signal in the one or more monitoring occasions, the base station may perform the one or more operations and/or apply the one or more power saving techniques and/or the one or more configurations that the that the base station is configured to perform and/or apply responsive to transmitting a power saving signal indicating to (and/or instructing) the UE to use the first assumption.

In a fifth embodiment, a base station indicates to (and/or instructs) a UE not to monitor one or more monitoring occasions for a power saving signal. In some embodiments, the UE receives an indication from a base station, wherein the indication indicates to (and/or instructs) the UE not to monitor one or more monitoring occasions for a power saving signal. In some embodiments, the one or more monitoring occasions are within Active Time (associated with the UE). In some embodiments, the UE monitors PDCCH in the one or more monitoring occasions for PDCCH other than the power saving signal (e.g., the UE monitors PDCCH in the one or more monitoring occasions for one or more PDCCH signals other than the power saving signal). Alternatively and/or additionally, the UE may monitor PDCCH in a slot comprising the one or more monitoring occasions for PDCCH other than the power saving signal (e.g., the UE monitors PDCCH in the slot comprising the one or more monitoring occasions for one or more PDCCH signals other than the power saving signal). In some embodiments, the indication is specifically for skipping monitoring for the power saving signal. The indication may not be used (by the UE) to skip monitoring of PDCCH other than power saving signal (e.g., the UE may not skip monitoring of one or more PDCCH signals other than the power saving signal based on the indication). In some embodiments, the indication is associated with the power saving signal. Alternatively and/or additionally, the indication may be associated with the one or more monitoring occasions for the power saving signal.

In a sixth embodiment, a UE receives an indication from a base station to monitor a power saving signal. One or more monitoring occasions associated with the power saving signal are within Active Time. The UE may be configured and/or scheduled to monitor both the power saving signal and PDCCH other than the power saving signal (e.g., the UE may be configured and/or scheduled to monitor both the power saving signal and one or more PDCCH signals other than the power saving signal concurrently). Monitoring both the power saving signal and PDCCH other than power saving signal may exceed a UE capability of the UE. The UE may determine one or more PDCCH candidates for monitoring based on one or more priorities (e.g., the one or more priorities may be associated with the power saving signal and/or one or more PDCCH signals other than the power saving signal). In some embodiments, the UE prioritizes one or more PDCCH candidates for a power saving signal. Alternatively and/or additionally, the UE may prioritize a DCI format for a power saving signal. Alternatively and/or additionally, the UE may prioritize a CORESET for a power saving signal. Alternatively and/or additionally, the UE may prioritize a search space for a power saving signal. In some embodiments, the UE does not monitor one or more PDCCH candidates for downlink data if the UE capability is exceeded. Alternatively and/or additionally, the UE may not monitor a DCI format for downlink data if the UE capability is exceeded. In some embodiments, the UE may select one or more types of PDCCH for monitoring based on priorities associated with types of PDCCH scheduled in a slot if the UE capability is exceeded. In some embodiments, the UE prioritizes one or more PDCCH candidates for a power saving signal over one or more PDCCH candidates for downlink data. Alternatively and/or additionally, the UE may prioritize one or more PDCCH candidates for uplink data over one or more PDCCH candidates for downlink data. Alternatively and/or additionally, the UE may prioritize one or more PDCCH candidates for uplink data over one or more PDCCH candidates for a power saving signal. Alternatively and/or additionally, the UE may prioritize one or more PDCCH candidates for a power saving signal over one or more PDCCH candidates for uplink data. Alternatively and/or additionally, the UE may prioritize one or more DCI formats for a power saving signal over one or more DCI formats for downlink data. Alternatively and/or additionally, the UE may prioritize one or more DCI formats for uplink data over one or more DCI formats for downlink data. Alternatively and/or additionally, the UE may prioritize one or more DCI formats for uplink data over one or more DCI formats for a power saving signal. Alternatively and/or additionally, the UE may prioritize one or more DCI formats for a power saving signal over one or more DCI formats for uplink data. Alternatively and/or additionally, the UE may prioritize one or more CCEs for a power saving signal over one or more CCEs for downlink data. Alternatively and/or additionally, the UE may prioritize one or more CCEs for uplink data over one or more CCEs for downlink data. Alternatively and/or additionally, the UE may prioritize one or more CCEs for uplink data over one or more CCEs for a power saving signal. The UE prioritize one or more CCEs for a power saving signal over one or more CCEs for uplink data. Alternatively and/or additionally, the UE may prioritize one or more CORESETs for a power saving signal over one or more CORESETs for downlink data. Alternatively and/or additionally, the UE may prioritize one or more CORESETs for uplink data over one or more CORESETs for downlink data. Alternatively and/or additionally, the UE may prioritize one or more CORESETs for uplink data over one or more CORESETs for a power saving signal. Alternatively and/or additionally, the UE may prioritize one or more CORESETs for a power saving signal over one or more CORESETs for uplink data. Alternatively and/or additionally, the UE may prioritize one or more search spaces for a power saving signal over one or more search spaces for downlink data. Alternatively and/or additionally, the UE may prioritize one or more search spaces for uplink data over one or more search spaces for downlink data. Alternatively and/or additionally, the UE may prioritize one or more search spaces for uplink data over one or more search spaces for a power saving signal. Alternatively and/or additionally, the UE may prioritize one or more search spaces for a power saving signal over one or more search spaces for uplink data.

One, some and/or all of the foregoing techniques and/or embodiments can be formed to a new embodiment.

In some examples, embodiments disclosed herein, such as embodiments described with respect to the first embodiment, the second embodiment, the third embodiment, the fourth embodiment, the fifth embodiment, and the sixth embodiment, may be implemented independently and/or separately. Alternatively and/or additionally, a combination of embodiments described herein, such as embodiments described with respect to the first embodiment, the second embodiment, the third embodiment, the fourth embodiment, the fifth embodiment, and/or the sixth embodiment, may be implemented. Alternatively and/or additionally, a combination of embodiments described herein, such as embodiments described with respect to the first embodiment, the second embodiment, the third embodiment, the fourth embodiment, the fifth embodiment, and/or the sixth embodiment, may be implemented concurrently and/or simultaneously.

Various techniques of the present disclosure may be performed independently and/or separately from one another. Alternatively and/or additionally, various techniques of the present disclosure may be combined and/or implemented using a single system. Alternatively and/or additionally, various techniques of the present disclosure may be implemented concurrently and/or simultaneously.

Throughout the present disclosure, if an assumption, a configuration and/or power saving related information is applied (such as by a base station and/or a UE), a base station and/or a UE may perform one or more operations and/or processing based on the assumption, the configuration and/or the power saving related information. The one or more operations and/or the processing may comprise one or more operations and/or processing associated with a control channel and/or a data channel (e.g., the one or more operations and/or the processing may comprise at least one of scheduling, receiving, transmitting, buffering, monitoring, decoding, etc. of a control channel and/or a data channel).

Operations, techniques and/or behavior described herein with respect to a UE may be correspondingly applied to a base station.

Operations, techniques and/or behavior described herein with respect to a base station may be correspondingly applied to a UE.

Figure 8:
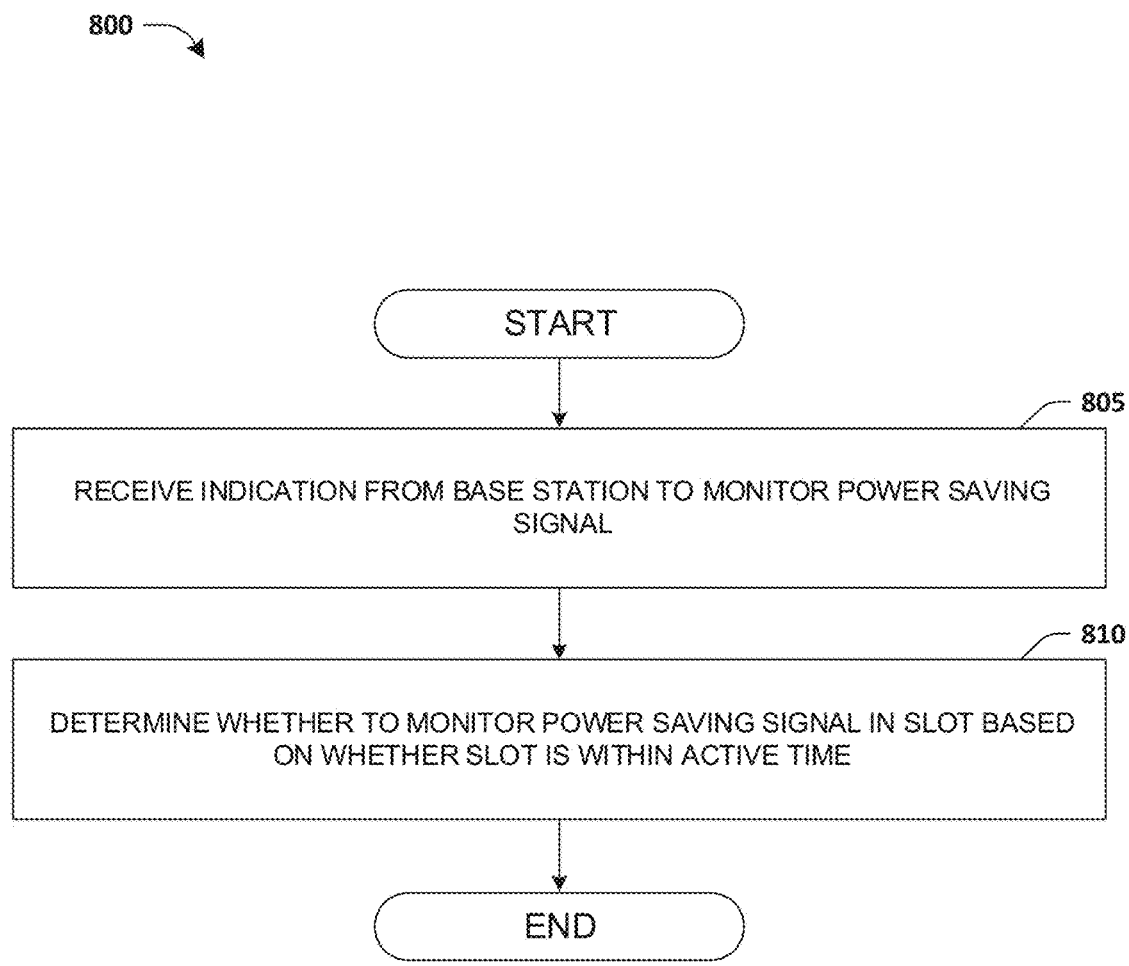
FIG. 8 is a flow chart according to one exemplary embodiment.

FIG. 8 is a flow chart 800 according to one exemplary embodiment from the perspective of a UE. In step 805, the UE receives an indication from a base station to monitor a power saving signal. In step 810, the UE determines whether to monitor the power saving signal in a slot based on whether the slot is within Active Time (e.g., Active Time associated with the UE).

In one embodiment, the UE determines whether to skip monitoring of the power saving signal in a slot based on whether the slot is within Active Time.

In one embodiment, the power saving signal is monitored before a DRX ON duration.

In one embodiment, the slot is before the DRX ON duration.

In one embodiment, an offset is indicative of one or more monitoring occasions associated with the power saving signal. For example, a monitoring occasion, of the one or more monitoring occasions, in which the power saving signal may be monitored may be determined based on the offset.

In one embodiment, the offset indicates a time duration between a beginning of a DRX ON duration and the one or more monitoring occasions associated with the power saving signal.

In one embodiment, the power saving signal is carried on a PDCCH.

In one embodiment, the PDCCH does not comprise scheduling information for the UE.

In one embodiment, the PDCCH is for power saving.

In one embodiment, the PDCCH is a group common PDCCH.

In one embodiment, the PDCCH is for a group of UEs.

In one embodiment, the PDCCH is monitored in a common search space.

In one embodiment, the PDCCH is scrambled with a RNTI specific for power saving.

In one embodiment, the UE behaves as if the UE detects a power saving signal for the UE.

In one embodiment, the UE behaves as if the UE detects a power saving signal for the UE when the UE does not monitor a power saving signal in one or more monitoring occasions associated with the power saving signal.

In one embodiment, the UE behaves as if the UE detects a power saving signal for the UE when the UE skips monitoring of a power saving signal in one or more monitoring occasions associated with the power saving signal.

In one embodiment, the UE behaves as if the UE detects a power saving signal indicating one or more values in one or more fields of a DCI for the power saving signal. In an example, responsive to the UE skipping monitoring and/or determining to skip monitoring of a power saving signal in one or more monitoring occasions associated with the power saving signal, the UE may perform one or more operations and/or apply one or more power saving techniques and/or one or more configurations that the UE is configured to perform and/or apply responsive to receiving a power saving signal indicative of the one or more values in the one or more fields.

In one embodiment, the UE behaves as if the UE detects a power saving signal indicating whether a power saving technique is applied. In an example, responsive to the UE skipping monitoring and/or determining to skip monitoring of a power saving signal in one or more monitoring occasions associated with the power saving signal, the UE may perform one or more operations and/or apply one or more power saving techniques and/or one or more configurations that the UE is configured to perform and/or apply responsive to receiving a power saving signal indicative of whether to apply the power saving technique.

In one embodiment, the UE behaves as if the UE detects a power saving signal indicating how a power saving technique is applied. In an example, responsive to the UE skipping monitoring and/or determining to skip monitoring of a power saving signal in one or more monitoring occasions associated with the power saving signal, the UE may perform one or more operations and/or apply one or more power saving techniques and/or one or more configurations that the UE is configured to perform and/or apply responsive to receiving a power saving signal indicative of how to apply the power saving technique.

In one embodiment, the UE behaves as if the UE detects a power saving signal indicating a power consumption characteristic. In an example, responsive to the UE skipping monitoring and/or determining to skip monitoring of a power saving signal in one or more monitoring occasions associated with the power saving signal, the UE may perform one or more operations and/or apply one or more power saving techniques and/or one or more configurations that the UE is configured to perform and/or apply responsive to receiving a power saving signal indicative of the power consumption characteristic.

In one embodiment, the power saving technique is associated with the power saving signal.

In one embodiment, the UE wakes up for a DRX ON duration if the UE skips monitoring of the power saving signal in one or more monitoring occasions for the DRX ON duration.

In one embodiment, the UE wakes up for a DRX ON duration or goes to sleep for the DRX ON duration based on an indication and/or a configuration from the base station.

In one embodiment, the UE wakes up for a DRX ON duration or goes to sleep for the DRX ON duration based on an indication and/or a configuration from the base station if the UE skips monitoring of a power saving signal in one or more monitoring occasions for the DRX ON duration.

In one embodiment, the UE wakes up for a DRX ON duration or goes to sleep for the DRX ON duration based on a last power saving signal (e.g., a previously and/or most recently received power saving signal prior to the DRX ON duration) if the UE skips monitoring of a power saving signal in one or more monitoring occasions for the DRX ON duration.

In one embodiment, the power saving signal carries (and/or comprises) an indication to inform the UE to wake up (or not to wake up).

In one embodiment, the DRX ON duration is associated with one or more monitoring occasions associated with the power saving signal.

In one embodiment, the UE behaves as if the UE detects a power saving signal indicating to (and/or instructing) the UE to wake up. In an example, responsive to the UE skipping monitoring and/or determining to skip monitoring of a power saving signal in one or more monitoring occasions associated with the power saving signal, the UE may perform one or more operations and/or apply one or more configurations that the UE is configured to perform and/or apply responsive to receiving a power saving signal indicating to (and/or instructing) the UE to wake up.

Referring back to FIGS. 3 and 4, in one exemplary embodiment of a UE, the device 300 includes a program code 312 stored in the memory 310. The CPU 308 could execute program code 312 to enable the UE (i) to receive an indication from a base station to monitor a power saving signal, and (ii) to determine whether to monitor the power saving signal in a slot based on whether the slot is within Active Time. Furthermore, the CPU 308 can execute the program code 312 to perform one, some and/or all of the above-described actions and steps and/or others described herein.

Figure 9:
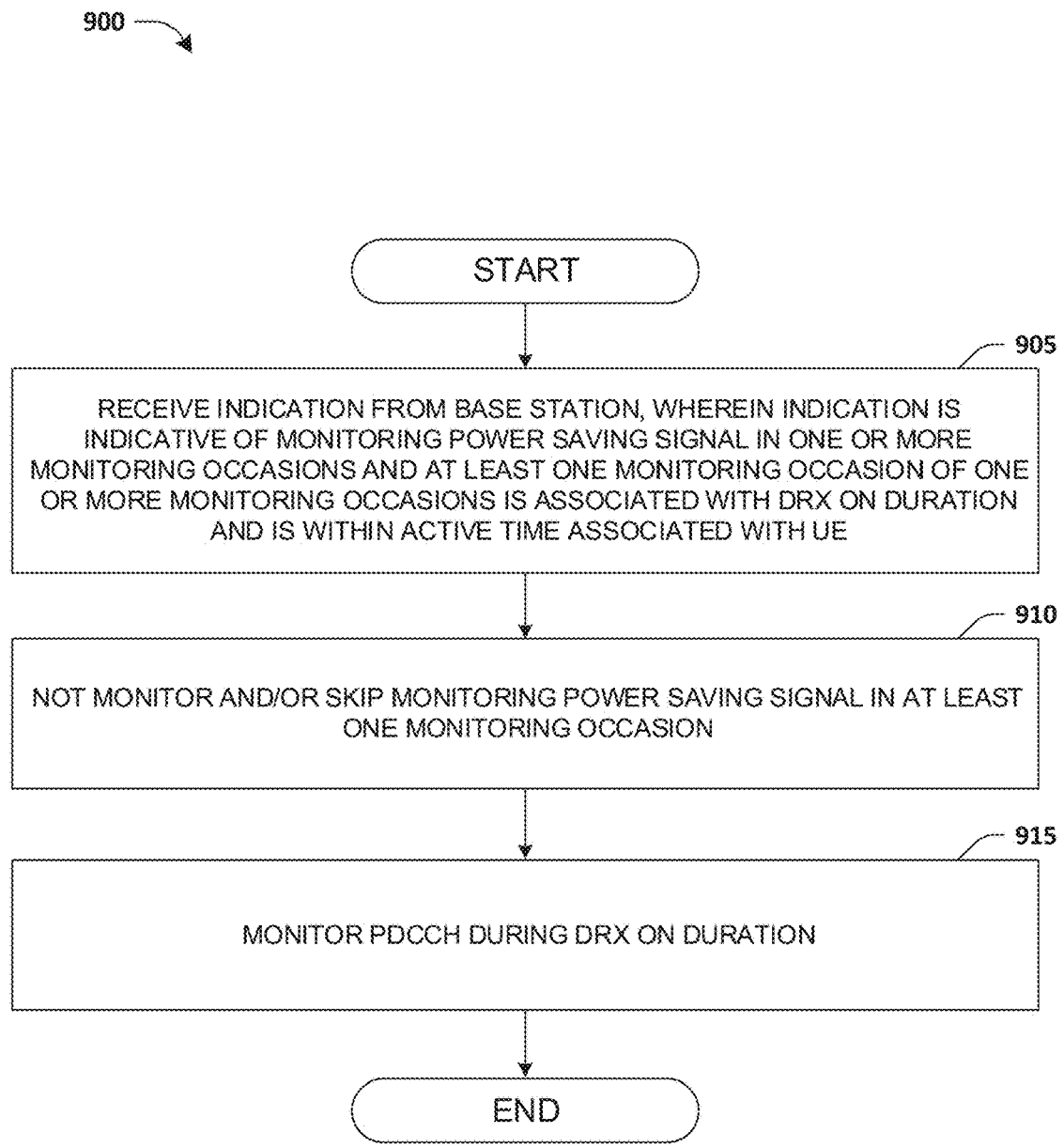
FIG. 9 is a flow chart according to one exemplary embodiment.

FIG. 9 is a flow chart 900 according to one exemplary embodiment from the perspective of a UE. In step 905, the UE receives an indication from a base station. The indication is indicative of monitoring a power saving signal in one or more monitoring occasions. At least one monitoring occasion of the one or more monitoring occasions is associated with a DRX ON duration and is within Active Time associated with the UE. In step 910, the UE does not monitor and/or skips monitoring the power saving signal in the at least one monitoring occasion. In step 915, the UE monitors PDCCH during (and/or for) the DRX ON duration.

In one embodiment, the at least one monitoring occasion associated with the DRX ON duration is (and/or comprises) all monitoring occasions that are associated with the DRX ON duration.

In one embodiment, the at least one monitoring occasion associated with the DRX ON duration is (and/or comprises) one monitoring occasion associated with the DRX ON duration.

In one embodiment, the at least one monitoring occasion associated with the DRX ON duration is (and/or comprises)

a subset of monitoring occasions that are associated with the DRX ON duration. Alternatively and/or additionally, the at least one monitoring occasion associated with the DRX ON duration is not all (and/or does not comprise all) monitoring occasions that are associated with the DRX ON duration.

In one embodiment, the DRX ON duration is after the at least one monitoring occasion and there is an offset between the DRX ON duration and the at least one monitoring occasion.

In one embodiment, the UE does not monitor and/or skips monitoring the power saving signal in the at least one monitoring occasion and/or the UE monitors PDCCH during the DRX ON duration responsive to a determination that the at least one monitoring occasion associated with the DRX ON duration is within the Active Time.

In one embodiment, if at least another monitoring occasion, other than the at least one monitoring occasion, associated with the DRX ON duration is not within Active Time associated with the UE, the UE monitors the power saving signal in the at least another monitoring occasion and/or the UE determines whether to monitor PDCCH during (and/or for) the DRX ON duration based on the power saving signal (e.g., the UE determines whether to monitor PDCCH during (and/or for) the DRX ON duration based on the power saving signal if the power saving signal is detected in the at least another monitoring occasion).

In one embodiment, the UE receives a second indication from the base station, wherein the second indication is indicative of monitoring a second power saving signal in one or more second monitoring occasions and at least one monitoring occasion of the one or more second monitoring occasions is associated with a second DRX ON duration and is not within Active Time associated with the UE. The UE may monitor the second power saving signal in the at least one monitoring occasion of the one or more second monitoring occasions. For example, the UE may monitor the second power saving signal in the at least one monitoring occasion of the one or more second monitoring occasions responsive to a determination that the at least one monitoring occasion of the one or more second monitoring occasions is not within Active Time associated with the UE. Alternatively and/or additionally, the UE may determining whether to monitor PDCCH during (and/or for) the second DRX ON duration based on the second power saving signal. For example, the UE may determine whether to monitor PDCCH during (and/or for) the second DRX ON duration based on the second power saving signal responsive to a determination that the at least one monitoring occasion of the one or more second monitoring occasions is not within Active Time associated with the UE.

In one embodiment, the UE does not receive the power saving signal.

In one embodiment, the UE determines whether to monitor PDCCH for the DRX ON duration based on a configuration from the base station of whether to wake up (e.g., the configuration may be indicative of the UE waking up or indicative of the UE not waking up).

In one embodiment, the UE receives a configuration from the base station, wherein the configuration is indicative of whether to wake up (e.g., the configuration may be indicative of the UE waking up or indicative of the UE not waking up). The UE may determine to monitor PDCCH during the DRX ON duration based on the configuration, wherein the monitoring PDCCH during the DRX ON duration is performed responsive to the determination to monitor PDCCH based on the configuration. For example, the determination to monitor PDCCH may be based on a determination that the configuration is indicative of the UE waking up (or not waking up).

Referring back to FIGS. 3 and 4, in one exemplary embodiment of a UE, the device 300 includes a program code 312 stored in the memory 310. The CPU 308 could execute program code 312 to enable the UE (i) to receive an indication from a base station, wherein the indication is indicative of monitoring a power saving signal in one or more monitoring occasions and at least one monitoring occasion of the one or more monitoring occasions is associated with a DRX ON duration and is within Active Time associated with the UE, (ii) to not monitor and/or skip monitoring the power saving signal in the at least one monitoring occasion, and (iii) to monitor PDCCH during (and/or for) the DRX ON duration. Furthermore, the CPU 308 can execute the program code 312 to perform one, some and/or all of the above-described actions and steps and/or others described herein.

Figure 10:
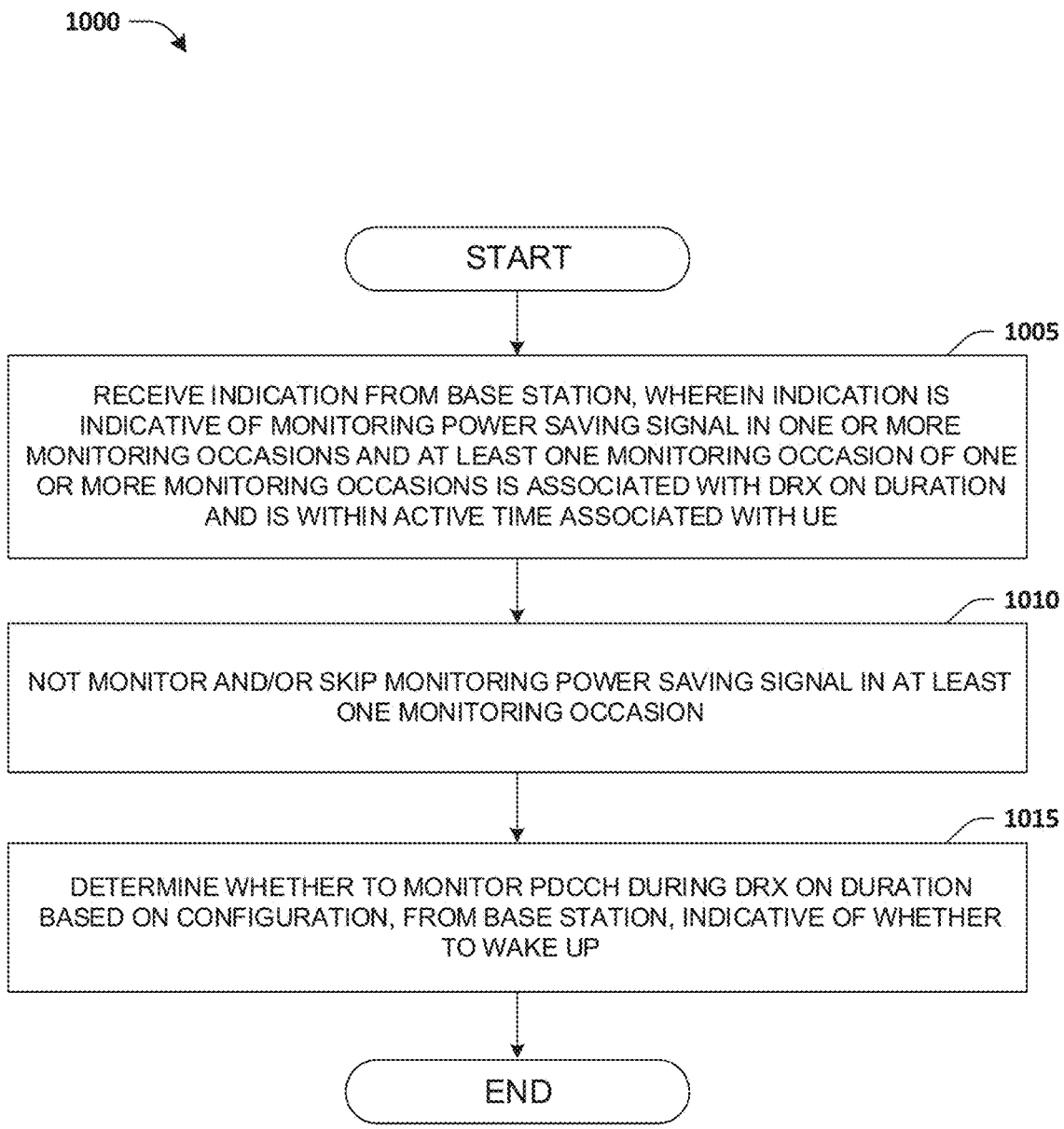
FIG. 10 is a flow chart according to one exemplary embodiment.

FIG. 10 is a flow chart 1000 according to one exemplary embodiment from the perspective of a UE. In step 1005, the UE receives an indication from a base station. The indication is indicative of monitoring a power saving signal in one or more monitoring occasions. At least one monitoring occasion of the one or more monitoring occasions is associated with a DRX ON duration and is within Active Time associated with the UE. In step 1010, the UE does not monitor and/or skips monitoring the power saving signal in the at least one monitoring occasion. In step 1015, the UE determines whether to monitor PDCCH during (and/or for) the DRX ON duration based on a configuration, from the base station, indicative of whether to wake up (e.g., the configuration may be indicative of the UE waking up or indicative of the UE not waking up).

In one embodiment, the UE may monitor PDCCH during (and/or for) the DRX ON duration based on a determination that the configuration is indicative of the UE waking up.

In one embodiment, the UE may monitor PDCCH during (and/or for) the DRX ON duration based on a determination that the configuration is indicative of the UE not waking up (and/or a determination that the configuration is indicative of the UE going to sleep).

In one embodiment, the UE may not monitor PDCCH during (and/or for) the DRX ON duration based on a determination that the configuration is indicative of the UE not waking up (and/or a determination that the configuration is indicative of the UE going to sleep).

In one embodiment, the UE may not monitor PDCCH during (and/or for) the DRX ON duration based on a determination that the configuration is indicative of the UE waking up.

In one embodiment, at least another monitoring occasion, other than the at least one monitoring occasion, associated with the DRX ON duration is not within Active Time associated with the UE. The UE monitors the power saving signal in the at least another monitoring occasion.

In one embodiment, the UE does not receive the power saving signal.

In one embodiment, the at least one monitoring occasion associated with the DRX ON duration is (and/or comprises) all monitoring occasions that are associated with the DRX ON duration.

In one embodiment, the at least one monitoring occasion associated with the DRX ON duration is (and/or comprises) one monitoring occasion associated with the DRX ON duration.

In one embodiment, the at least one monitoring occasion associated with the DRX ON duration is (and/or comprises) a subset of monitoring occasions that are associated with the DRX ON duration. Alternatively and/or additionally, the at least one monitoring occasion associated with the DRX ON duration is not all (and/or does not comprise all) monitoring occasions that are associated with the DRX ON duration.

In one embodiment, the DRX ON duration is after the at least one monitoring occasion and there is an offset between the DRX ON duration and the at least one monitoring occasion.

Referring back to FIGS. 3 and 4, in one exemplary embodiment of a UE, the device 300 includes a program code 312 stored in the memory 310. The CPU 308 could execute program code 312 to enable the UE (i) to receive an indication from a base station, wherein the indication is indicative of monitoring a power saving signal in one or more monitoring occasions and at least one monitoring occasion of the one or more monitoring occasions is associated with a DRX ON duration and is within Active Time associated with the UE, (ii) to not monitor and/or skip monitoring the power saving signal in the at least one monitoring occasion, and (iii) to determine whether to monitor PDCCH during (and/or for) the DRX ON duration based on a configuration, from the base station, indicative of whether to wake up. Furthermore, the CPU 308 can execute the program code 312 to perform one, some and/or all of the above-described actions and steps and/or others described herein.

Figure 11:
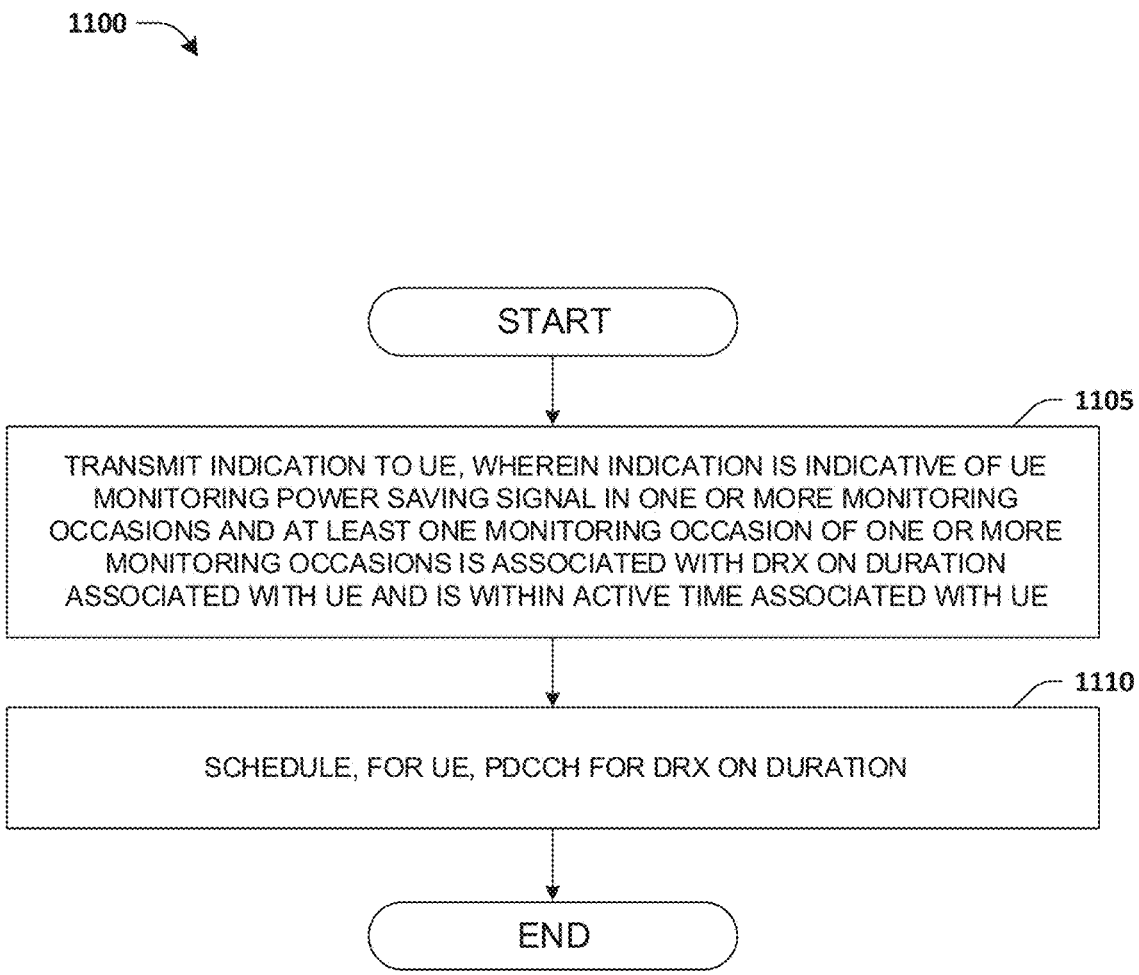
FIG. 11 is a flow chart according to one exemplary embodiment.

FIG. 11 is a flow chart 1100 according to one exemplary embodiment from the perspective of a base station. In step 1105, the base station transmits an indication to a UE. The indication is indicative of the UE monitoring a power saving signal in one or more monitoring occasions. At least one monitoring occasion of the one or more monitoring occasions is associated with a DRX ON duration associated with the UE and is within Active Time associated with the UE. In step 1110, the base station schedules, for (and/or to) the UE, PDCCH for the DRX ON duration.

In one embodiment, the base station schedules one or more PDCCH signals for the UE to monitor and/or receive during the DRX ON duration.

In one embodiment, the power saving signal is not monitored and/or received by the UE in the at least one monitoring occasion.

In one embodiment, the base station indicates to (and/or instructs) the UE, via the power saving signal, not to monitor PDCCH during (and/or for) the DRX ON duration.

In one embodiment, the power saving signal is indicative of the UE not monitoring PDCCH during (and/or for) the DRX ON duration. Alternatively and/or additionally, the power saving signal may be transmitted by the base station. The power saving signal may not be monitored and/or received by the UE.

In one embodiment, the at least one monitoring occasion associated with the DRX ON duration is (and/or comprises) all monitoring occasions that are associated with the DRX ON duration.

In one embodiment, the at least one monitoring occasion associated with the DRX ON duration is (and/or comprises) one monitoring occasion associated with the DRX ON duration.

In one embodiment, the at least one monitoring occasion associated with the DRX ON duration is (and/or comprises) a subset of monitoring occasions that are associated with the DRX ON duration. Alternatively and/or additionally, the at least one monitoring occasion associated with the DRX ON duration is not all (and/or does not comprise all) monitoring occasions that are associated with the DRX ON duration.

Referring back to FIGS. 3 and 4, in one exemplary embodiment of a base station, the device 300 includes a program code 312 stored in the memory 310. The CPU 308 could execute program code 312 to enable the base station (i) to transmit an indication to a UE, wherein the indication is indicative of the UE monitoring a power saving signal in one or more monitoring occasions and at least one monitoring occasion of the one or more monitoring occasions is associated with a DRX ON duration associated with the UE and is within Active Time associated with the UE, and (ii) to schedule, for (and/or to) the UE, PDCCH for the DRX ON duration. Furthermore, the CPU 308 can execute the program code 312 to perform one, some and/or all of the above-described actions and steps and/or others described herein.

A communication device (e.g., a UE, a base station, a network node, etc.) may be provided, wherein the communication device may comprise a control circuit, a processor installed in the control circuit and/or a memory installed in the control circuit and coupled to the processor. The processor may be configured to execute a program code stored in the memory to perform method steps illustrated in FIGS. 8-11. Furthermore, the processor may execute the program code to perform one, some and/or all of the above-described actions and steps and/or others described herein.

A computer-readable medium may be provided. The computer-readable medium may be a non-transitory computer-readable medium. The computer-readable medium may comprise a flash memory device, a hard disk drive, a disc (e.g., a magnetic disc and/or an optical disc, such as at least one of a digital versatile disc (DVD), a compact disc (CD), etc.), and/or a memory semiconductor, such as at least one of static random access memory (SRAM), dynamic random access memory (DRAM), synchronous dynamic random access memory (SDRAM), etc. The computer-readable medium may comprise processor-executable instructions, that when executed cause performance of one, some and/or all method steps illustrated in FIGS. 8-11, and/or one, some and/or all of the above-described actions and steps and/or others described herein.

It may be appreciated that applying one or more of the techniques presented herein may result in one or more benefits including, but not limited to, resolving a conflict between PDCCH for a power saving signal and one or more other types of PDCCH, such as in a scenario in which concurrently monitoring the power saving signal and PDCCH other than the power saving signal exceeds a UE capability of a UE.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Alternatively and/or additionally, in some aspects any suitable computer-program product may comprise a computer-readable medium comprising codes relating to one or more of the aspects of the disclosure. In some aspects a computer program product may comprise packaging materials.

While the disclosed subject matter has been described in connection with various aspects, it will be understood that the disclosed subject matter is capable of further modifications. This application is intended to cover any variations, uses or adaptation of the disclosed subject matter following, in general, the principles of the disclosed subject matter, and including such departures from the present disclosure as come within the known and customary practice within the art to which the disclosed subject matter pertains.

The invention claimed is:

1. A method of a User Equipment (UE) being configured for Discontinuous Reception (DRX) by a base station, the method comprising:
   receiving, from the base station, an indication for the UE to monitor a power saving signal in at least one monitoring occasion, wherein:
      the power saving signal is indicative of whether or not to monitor Physical Downlink Control Channel (PDCCH) in one DRX ON duration; and
      the at least one monitoring occasion is associated with a DRX ON duration and is within Active Time associated with the UE;
   determining not to monitor the power saving signal in the at least one monitoring occasion based on the at least one monitoring occasion being within Active Time;
   after receiving the indication for the UE to monitor the power saving signal in the at least one monitoring occasion, at least one of not monitoring or skipping monitoring the power saving signal in the at least one monitoring occasion despite the UE being configured to monitor the power saving signal in the at least one monitoring occasion according to the indication from the base station; and
   monitoring PDCCH during the DRX ON duration associated with the at least one monitoring occasion in which the UE is configured to monitor the power saving signal according to the indication from the base station.

2. The method of claim 1, wherein:
   the at least one monitoring occasion associated with the DRX ON duration is all monitoring occasions that are associated with the DRX ON duration.

3. The method of claim 1, wherein:
the at least one monitoring occasion associated with the DRX ON duration is one monitoring occasion associated with the DRX ON duration.

4. The method of claim 1, wherein:
the at least one monitoring occasion associated with the DRX ON duration is a subset of monitoring occasions that are associated with the DRX ON duration.

5. The method of claim 1, wherein:
the DRX ON duration is after the at least one monitoring occasion; and
there is an offset between the DRX ON duration and the at least one monitoring occasion.

6. The method of claim 1, wherein: the monitoring PDCCH during the DRX ON duration is performed responsive to a determination that the at least one monitoring occasion associated with the DRX ON duration is within the Active Time.

7. The method of claim 1, further comprising:
receiving a second indication from the base station, wherein:
the second indication is indicative of monitoring a second power saving signal in one or more second monitoring occasions; and
at least one monitoring occasion of the one or more second monitoring occasions is associated with a second DRX ON duration and is not within Active Time associated with the UE; and
at least one of:
monitoring the second power saving signal in the at least one monitoring occasion of the one or more second monitoring occasions; or
determining whether to monitor PDCCH during the second DRX ON duration based on the second power saving signal.

8. The method of claim 1, wherein:
the UE does not receive the power saving signal.

9. The method of claim 1, further comprising:
receiving a configuration from the base station, wherein the configuration is indicative of whether to wake up; and
determining to monitor PDCCH during the DRX ON duration based on the configuration, wherein the monitoring PDCCH during the DRX ON duration is performed responsive to the determination to monitor PDCCH based on the configuration.

10. The method of claim 1, wherein:
the power saving signal is carried on PDCCH without scheduling information.

11. A method of a User Equipment (UE) being configured for Discontinuous Reception (DRX) by a base station, the method comprising:
receiving, from the base station, an indication for the UE to monitor a power saving signal in at least one monitoring occasion, wherein:
the power saving signal is indicative of whether or not to monitor Physical Downlink Control Channel (PDCCH) in one DRX ON duration; and
the at least one monitoring occasion is associated with a DRX ON duration and is within Active Time associated with the UE;
determining not to monitor the power saving signal in the at least one monitoring occasion based on the at least one monitoring occasion being within Active Time;
after receiving the indication for the UE to monitor the power saving signal in the at least one monitoring occasion, at least one of not monitoring or skipping monitoring the power saving signal in the at least one monitoring occasion in which the UE is configured to monitor the power saving signal according to the indication from the base station; and
determining whether to monitor PDCCH during the DRX ON duration based on a configuration, from the base station, indicative of whether to wake up.

12. The method of claim 11, wherein:
the UE does not receive the power saving signal.

13. The method of claim 11, wherein:
the at least one monitoring occasion associated with the DRX ON duration is all monitoring occasions that are associated with the DRX ON duration.

14. The method of claim 11, wherein:
the at least one monitoring occasion associated with the DRX ON duration is one monitoring occasion associated with the DRX ON duration.

15. The method of claim 11, wherein:
the at least one monitoring occasion associated with the DRX ON duration is a subset of monitoring occasions that are associated with the DRX ON duration.

16. The method of claim 11, wherein:
the DRX ON duration is after the at least one monitoring occasion; and
there is an offset between the DRX ON duration and the at least one monitoring occasion.

17. The method of claim 11, wherein:
the power saving signal is carried on PDCCH without scheduling information.

18. A method of a base station, the method comprising:
configuring a User Equipment (UE) for Discontinuous Reception (DRX);
transmitting, to the UE, an indication for the UE to monitor a power saving signal in at least one monitoring occasion, wherein:
the power saving signal is indicative of whether or not to monitor Physical Downlink Control Channel (PDCCH) in one DRX ON duration; and
the at least one monitoring occasion is associated with a Discontinuous Reception (DRX) ON duration associated with the UE and is within Active Time associated with the UE; and
a determination to not monitor the power saving signal in the at least one monitoring occasion is based on the at least one monitoring occasion being within Active Time;
scheduling, for the UE, Physical Downlink Control Channel (PDCCH) for the DRX ON duration.

19. The method of claim 18, wherein:
the power saving signal is at least one of not monitored or not received by the UE in the at least one monitoring occasion despite the indication for the UE to monitor the power saving signal in the at least one monitoring occasion.

20. The method of claim 18, wherein:
the power saving signal is indicative of the UE not monitoring PDCCH during the DRX ON duration.

21. The method of claim 18, wherein:
the at least one monitoring occasion associated with the DRX ON duration is all monitoring occasions that are associated with the DRX ON duration.

22. The method of claim 18, wherein:
the at least one monitoring occasion associated with the DRX ON duration is one monitoring occasion associated with the DRX ON duration.

23. The method of claim 18, wherein:
the power saving signal is carried on PDCCH without scheduling information.

\* \* \* \* \*